US006745168B1

(12) United States Patent
Enomoto

(10) Patent No.: US 6,745,168 B1
(45) Date of Patent: Jun. 1, 2004

(54) INTENTION ACHIEVEMENT INFORMATION PROCESSING APPARATUS

(75) Inventor: Hajime Enomoto, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/321,599

(22) Filed: May 28, 1999

Related U.S. Application Data

(63) Continuation-in-part of application No. 09/145,032, filed on Sep. 1, 1998, now abandoned.

(30) Foreign Application Priority Data

Jan. 28, 1998 (JP) .......................................... 10-016205
Jan. 28, 1999 (JP) .......................................... 11-020617

(51) Int. Cl.[7] ................................................ G06F 17/00
(52) U.S. Cl. .......................... 706/11; 719/316; 719/317
(58) Field of Search ................................ 709/200–203, 709/310–320; 717/106–119; 700/90–93, 103–104; 706/11–14; 719/310–320

(56) References Cited

U.S. PATENT DOCUMENTS 4,975,865 A * 12/1990 Carrette et al. ............... 700/10
5,682,542 A 10/1997 Enomoto et al.
5,895,459 A 4/1999 Enomoto
6,125,383 A * 9/2000 Glynias et al.

FOREIGN PATENT DOCUMENTS

| | | |
|---|---|---|
| JP | A-5-233690 | 9/1993 |
| JP | A-7-295929 | 11/1995 |
| JP | A-9-297684 | 11/1997 |

OTHER PUBLICATIONS

U.S. patent application Ser. No. 08/929/087, Enomoto, filed Sep. 15, 1997.

* cited by examiner

*Primary Examiner*—St. John Courtenay, III
(74) *Attorney, Agent, or Firm*—Staas & Halsey LLP.

(57) ABSTRACT

An intention achievement information processing apparatus, having an object network as a language processing function and a common platform as a function of interfacing with a client, includes a unit for defining a target area of an intention of a client and an attribute of the target area; a unit for defining an operable structure of the target area; a unit for defining a supporting function for achieving the intention; a unit for determining and defining a strategy and tactics for achieving the intention through the defined operable structure and supporting function; and a unit for performing a concrete process for achieving the intention of the client based on the determined and defined strategy and tactics.

37 Claims, 62 Drawing Sheets

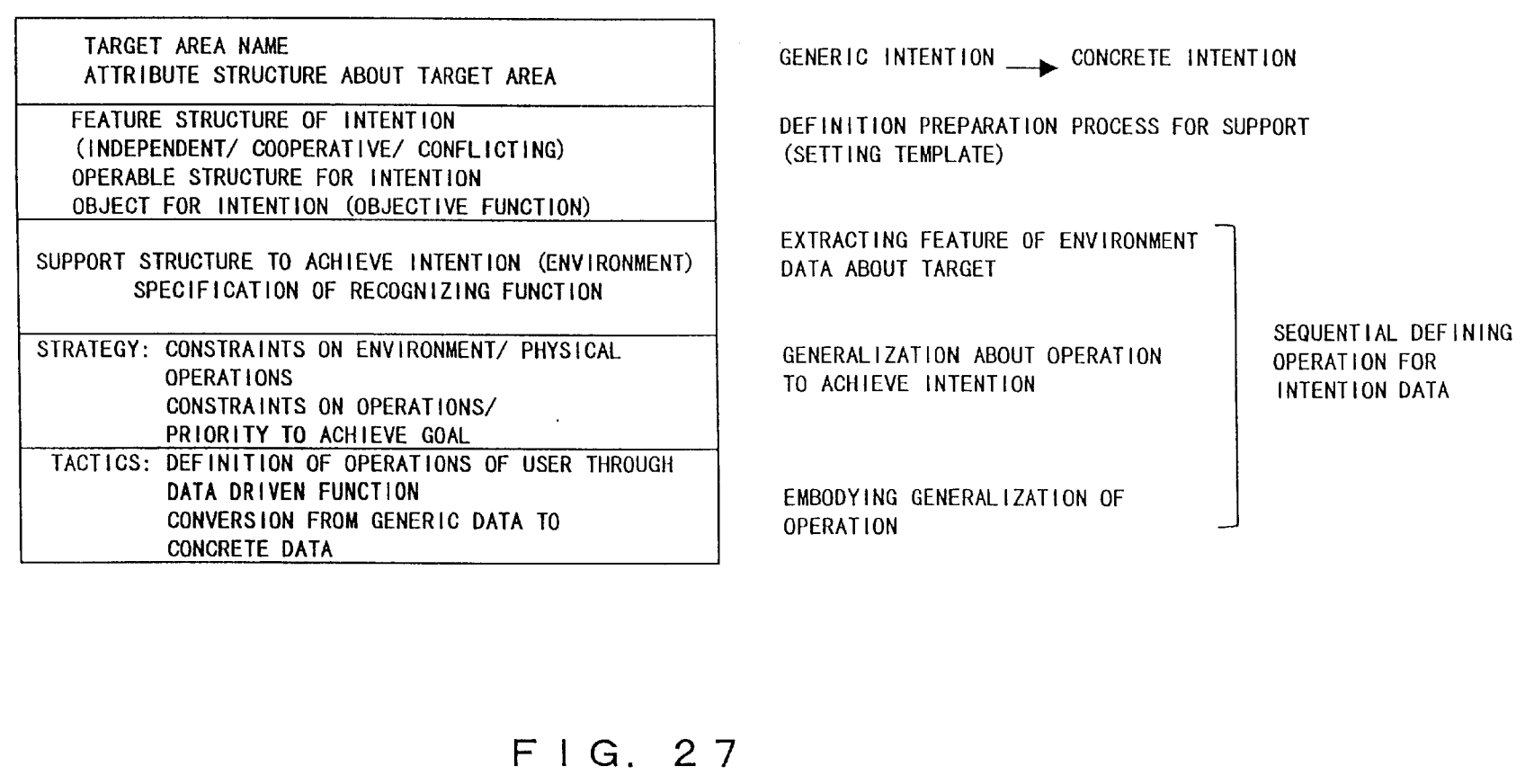

| | |
|---|---|
| TARGET AREA NAME<br>ATTRIBUTE STRUCTURE ABOUT TARGET AREA | GENERIC INTENTION → CONCRETE INTENTION |
| FEATURE STRUCTURE OF INTENTION<br>(INDEPENDENT/ COOPERATIVE/ CONFLICTING)<br>OPERABLE STRUCTURE FOR INTENTION<br>OBJECT FOR INTENTION (OBJECTIVE FUNCTION) | DEFINITION PREPARATION PROCESS FOR SUPPORT<br>(SETTING TEMPLATE) |
| SUPPORT STRUCTURE TO ACHIEVE INTENTION (ENVIRONMENT)<br>SPECIFICATION OF RECOGNIZING FUNCTION | EXTRACTING FEATURE OF ENVIRONMENT DATA ABOUT TARGET |
| STRATEGY: CONSTRAINTS ON ENVIRONMENT/ PHYSICAL OPERATIONS<br>CONSTRAINTS ON OPERATIONS/<br>PRIORITY TO ACHIEVE GOAL | GENERALIZATION ABOUT OPERATION TO ACHIEVE INTENTION |
| TACTICS: DEFINITION OF OPERATIONS OF USER THROUGH DATA DRIVEN FUNCTION<br>CONVERSION FROM GENERIC DATA TO CONCRETE DATA | EMBODYING GENERALIZATION OF OPERATION |

SEQUENTIAL DEFINING OPERATION FOR INTENTION DATA (covering: EXTRACTING FEATURE OF ENVIRONMENT DATA ABOUT TARGET; GENERALIZATION ABOUT OPERATION TO ACHIEVE INTENTION; EMBODYING GENERALIZATION OF OPERATION)

F I G. 27

(NATURAL LANGUAGE : NONE → *Define* → DOMAINE)

DOMAIN=Define(NONE)

'DOMAIN' has value of I.D.,domain_name,component_name, environment_name in the template.

'NONE' has empty value of cell in every template.

'Define' is a generic_function.

'Define a domaine' is a actual function : defining a constraint.

- A domaine_name is defined.
- A component_name is defined.

FIG. 59

(LOGIC SPECIFICATION :
NONE → *Define* → DOMAINE)

DOMAIN=[[λPλx(P(x))](NONE')](Define')

[^has(^N(^value'(^in'(^λP∃y[∀x[template'(x)⇔x=y]∧P(y)]))))]

(DOMAIN')

N= {I.D.', domain_name', component_name', environment_name'}

[^¬has'(^cell'(^value'(^in'(^λP∃y[∀x[template'(x)⇔x=y]∧

P(y)]))))](NONE')

[λz∃x(G_func'(x)∧z=x)](Define')

[λz∃x(A_func'(x)∧z=x)](Define a domaine')

[^define'(^λQ∃x[constraint'(x)∧Q(x)])](A_func')

- [^define'(^λQ∃x[domaine_name'(x)∧Q(x)])](A_func')

- [^define'(^λQ∃x[component_name'(x)∧Q(x)])](A_func')

FIG. 60

INTENTION ACHIEVEMENT INFORMATION PROCESSING APPARATUS

CROSS REFERENCE TO RELATED APPLICATION

The application is a continuation-in-part application of U.S. patent application Ser. No. 09/145,032 filed on Sep. 1, 1998, now abandoned, which is incorporated by reference in this application.

BACKGROUND OF THE INVENTION

1. Field of the Invention

The present invention relates to an information processing apparatus for achieving a cooperative intention of clients to avoid a crash when, for example, they try to avoid a crash against each other while they are driving different cars on a two-way road, and more specifically to an intention achievement information processing apparatus operated using a software architecture for achieving the intention.

2. Description of the Related Art

An intention can be an independent, cooperative, or conflicting intention. An independent intention refers to an intention which can be achieved independently of other people's intentions, in such a case that animation films can be produced by integrating images, voice, etc. generated using, for example, computer graphics technology.

A cooperative intention refers to an intention which can be achieved by people cooperating with each other, in such a case that two drivers are driving different cars in opposite directions with intentions to avoid a crash with each other. On the other hand, conflicting intentions refer to an intention of a bird flying in the sky to catch and eat a fish in the sea and an intention of the fish to swim away from the bird.

Producing animation films with the above described independent intentions has conventionally required intensive labor, a long time, and a large amount of resources. Therefore, it is quite difficult for a small amateur group to produce them. Under such circumstances, it is earnestly demanded to develop a user-friendly computer graphics production support system for easily producing realistic animation films.

A technology for realizing the above described system, which defines a model of an object network of data as a drawing object and various operations for the data, is disclosed by the official gazette Tokukai-hei 5-233690 (Language Processing System through an object network) and the corresponding U.S. Pat. No. 5,682,542.

Another information processing apparatus is disclosed by the official gazette Tokukai-hei 7-295929 (Interactive Information Processing Apparatus using the function of a common platform). The information processing apparatus is provided with a common platform as an interface having various windows for use in displaying an instruction and data from a user and displaying computer processed results through the object network.

Furthermore, the technology of realizing a system for easily developing a visible, interactive, and cooperative application using the above described object network and the common platform is disclosed in the official gazette Tokukai-hei 9-297684 (Information Processing Apparatus through an object network).

To easily draw realistic images in, for example, animation films, the intention of a person who is producing the films should be achieved by the computer. However, an intention of person, that is, what a person is thinking about, is complicated, and it requires labor intensive work to appropriately instruct the computer to achieve the intention.

The applicants carefully considered this and have already filed an application about an intention achievement information processing apparatus which uses computer architecture for easily realizing an intention of a user through a computer (Japanese Patent Application No. 10-016205, U.S. patent application Ser. No. 09/145,032 now abandoned.

However, there is room for improvement in the above described application.

SUMMARY OF THE INVENTION

The present invention aims at providing an intention achievement information processing apparatus which uses computer architecture for easily realizing an intention of a user through a computer, an intention achievement information process concurrent operation system, an intention achievement information processing method, and a computer-readable storage medium storing an intention achievement information processing program.

The intention achievement information processing apparatus includes a target area definition unit, an operable structure definition unit, a support structure definition unit, a strategy/tactics definition unit, and a process execution unit.

According to the first aspect of the present invention, the target area definition unit defines the attribute of the target area of the intention of a client. The operable structure definition unit defines an operable structure of the target area whose attribute is defined relating to the above described intention. The support structure definition unit defines a support function for realizing the above described intention. The strategy/tactics definition unit determines and defines the strategy and tactics for realizing the above described intention using the defined operable structure and support function. The process execution unit performs a concrete process for realizing the intention of the client based on the determined and defined strategy and tactics.

BRIEF DESCRIPTION OF THE DRAWINGS

The present invention will be more apparent from the following detailed description, when taken in conjunction with the accompanying drawings in which:

FIG. 27 shows a process of defining an intention;

FIG. 59 shows an example of a source code of the definition of a domain in a semi-natural language;

FIG. 60 shows an example of a source code of the definition of a domain in a logic specification;

DESCRIPTION OF THE PREFERRED EMBODIMENTS

The present invention is described below in detail by referring to the attached drawings.

Figure 1:
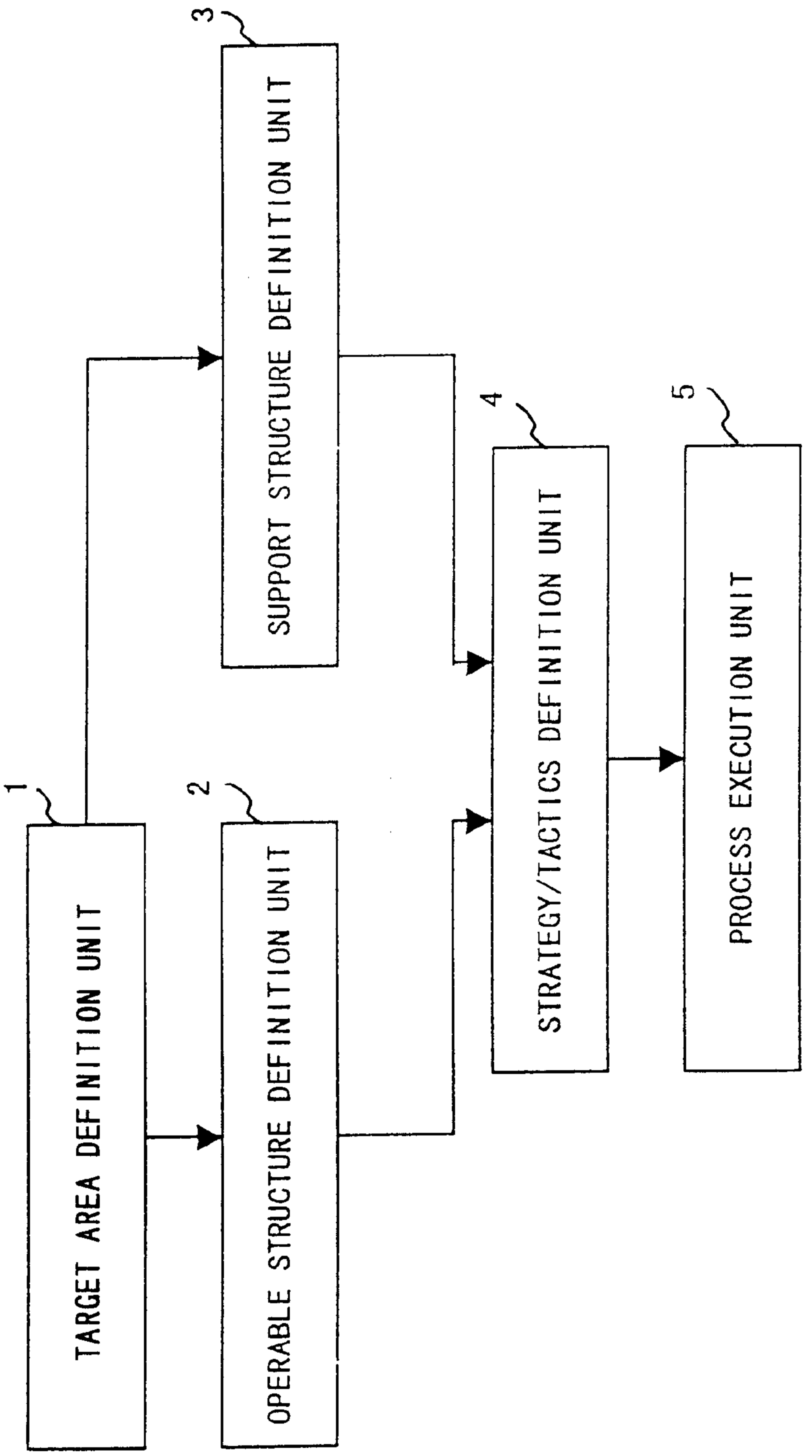
FIG. 1 is a block diagram showing the configuration according to the principle of the present invention.

FIG. 1 is a block diagram showing the configuration according to the principle of the present invention. That is, FIG. 1 is a block diagram showing the configuration according to the principle of the intention achievement information processing apparatus provided with a common platform as an interface between an object network, which has the language processing function, and a client.

Figure 32:
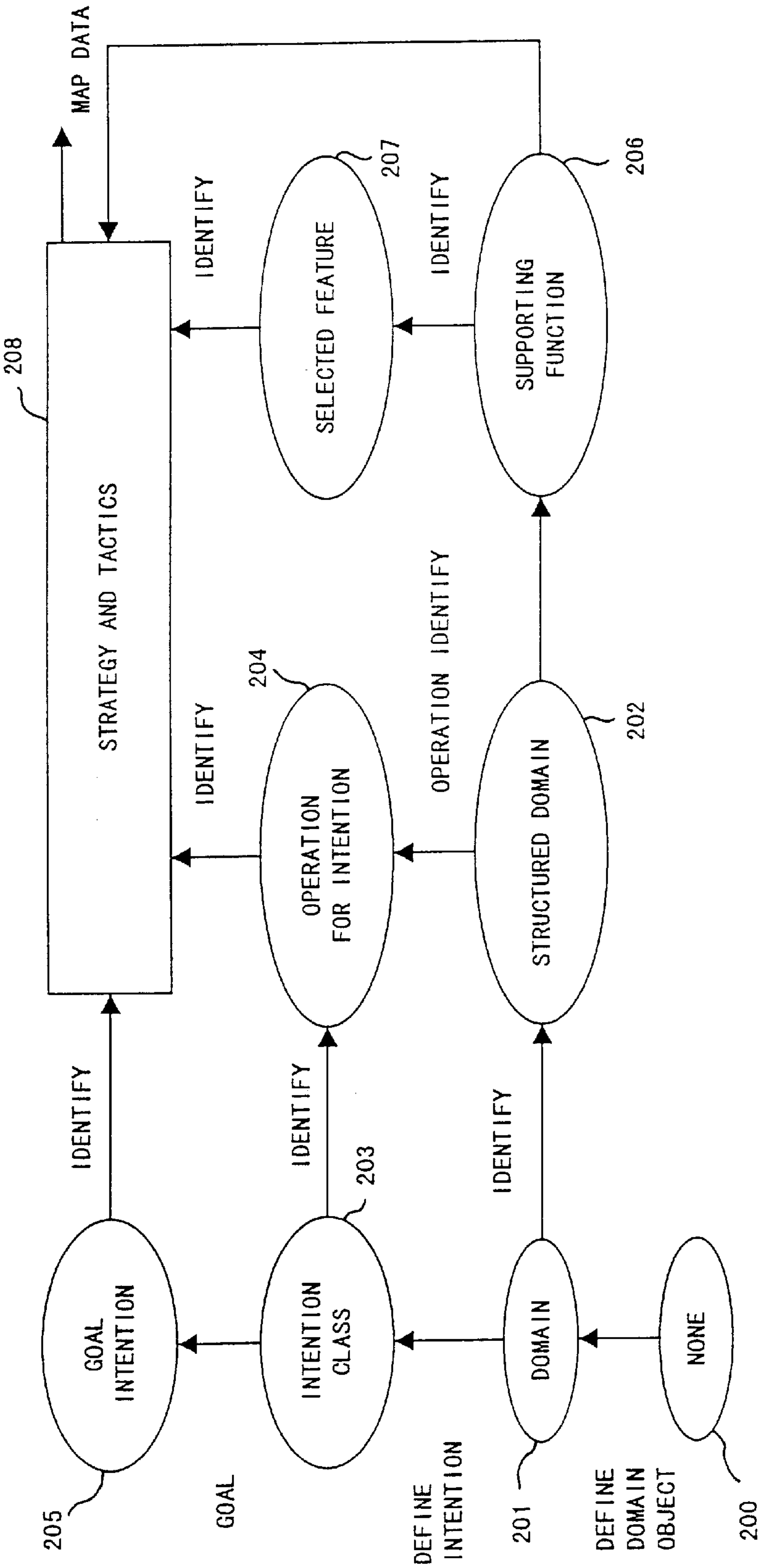
FIG. 32 shows the entire generic object network for finally determining strategy and tactics for achieving an intention.

Described below are the specific terms used in the present invention.

intention: In animation, the intentions of a person who performs independent, cooperative, and conflicting operations on an object are respectively referred to as independent, cooperative, and conflicting intentions. Furthermore, when an object performs independent, cooperative, and conflicting operations at the stage when a program has been executed, the intentions of the object itself are referred to as independent, cooperative, and conflicting intentions.

environment: In a target area, the party recognizes as an environment what is obtained by the supporting function shown in FIG. 32 about the data of the vicinity of the party. The important data of the environment is identified as selected features to be transmitted to a strategy and tactics unit as environment data.

strategy: a unit for setting a generic algorithm which satisfies a goal intention shown in FIG. 32 through a generic object network tactics: a unit for converting a generic action into a concrete action such that an intention can be satisfied with consistent constraints using, as a generic object network, a generic verb object in the generic object network for defining a strategy.

consistent constraints: The relationship between objects is defined as a constraint condition.

The present invention realizes an intention achievement information process using an object-oriented representing and realizing unit for processing a data model, an object model, a role model, and a process model in a hierarchical structure.

In FIG. 1, a target area definition unit 1 defines a target area of an intention of a client and the attribute of the area. If the intention of the client is a cooperative intention to, for example, protect a car from a crash while driving the car, then the target area is a two-way road, and the attributes of the area are the number of paths of a road, the width of a road, etc.

The operable structure definition unit 2 defines an operable structure based on the consistent constraints on a target area whose attribute is defined in association with an intention. If a target area refers to a two-way road traffic service, the operable range of a unit for defining the role functions such as a handle, a brake, etc. of a car, that is, a set of object network is defined as an operable structure.

A support structure definition unit 3 defines the function of supporting the achievement of an intention, for example, the function of obtaining environment data including the position of two cars.

A strategy/tactics definition unit 4 determines and defines the strategy and tactics to achieve the intention of a client using the operable structure defined by the operable structure definition unit 2 and the supporting function defined by the support structure definition unit 3. For example, when cars are driven on a two-way road, tactics are determined and defined corresponding to the smooth operation as a strategy.

A process execution unit 5 performs a concrete process for achieving the intention of a client according to the strategy and tactics determined and defined by the strategy/tactics definition unit 4.

If the intention of a client is an independent intention achievable by the client independent of the other people's intentions, then the target area definition unit 1 extracts the independent intention in the target area from a database based on the name of the target area specified by the client. The attribute structure of the target area is retrieved, and the attribute of the target area is defined. Then, the operable structure definition unit 2 displays the object network for the target area on the common platform, and the operable structure is defined at an instruction of the client.

If the intention of a client is a cooperative intention achievable by the cooperation between the client and another person, then the target area definition unit 1 defines the attribute related to the other person cooperating with the client, the support structure definition unit 3 defines the supporting function of extracting environment data containing the operation of the cooperative person, and the strategy/tactics definition unit 4 determines and defines the practical tactics based on the characteristics of the environment data extracted by the supporting function.

If the intention of a client is an intention conflicting with the intention of another person, then the target area definition unit 1 defines the attribute also related to the other person having the conflicting intention, the support structure definition unit 3 defines the supporting function of extracting the environment data including the operation of the other person having the conflicting intention, and the strategy/tactics definition unit 4 achieves the intention of the client based on the characteristics of the environment data extracted by the supporting function, thereby appropriately determining tactics to suppress the intention of the other person.

According to a further embodiment of the present invention, the above described intention achievement information processing apparatus includes one or more object networks as agent role servers for performing the primary role functions of achieving an intention of the client, and a common platform, and forms an intention achievement information process concurrent operation system together with a specific role server for performing a function of supporting the operations of the agent role server, which performs a primary role function, by partial recognition environment data.

As described above, according to the present invention, the information processing apparatus comprising an object network having a language processing function and a common platform functioning as an interface with a client determines the strategy and tactics for finally achieving the intention of a client, and performs a practical process based on the strategy and tactics.

In the information processing apparatus comprising an object network having a language processing function and a common platform functioning as an interface between, for example, a user and a server, the present invention relates to an intention achievement information processing apparatus for achieving an intention of a client, for example, a user. First described below are the object network and the common platform as the basic components.

Figure 2:
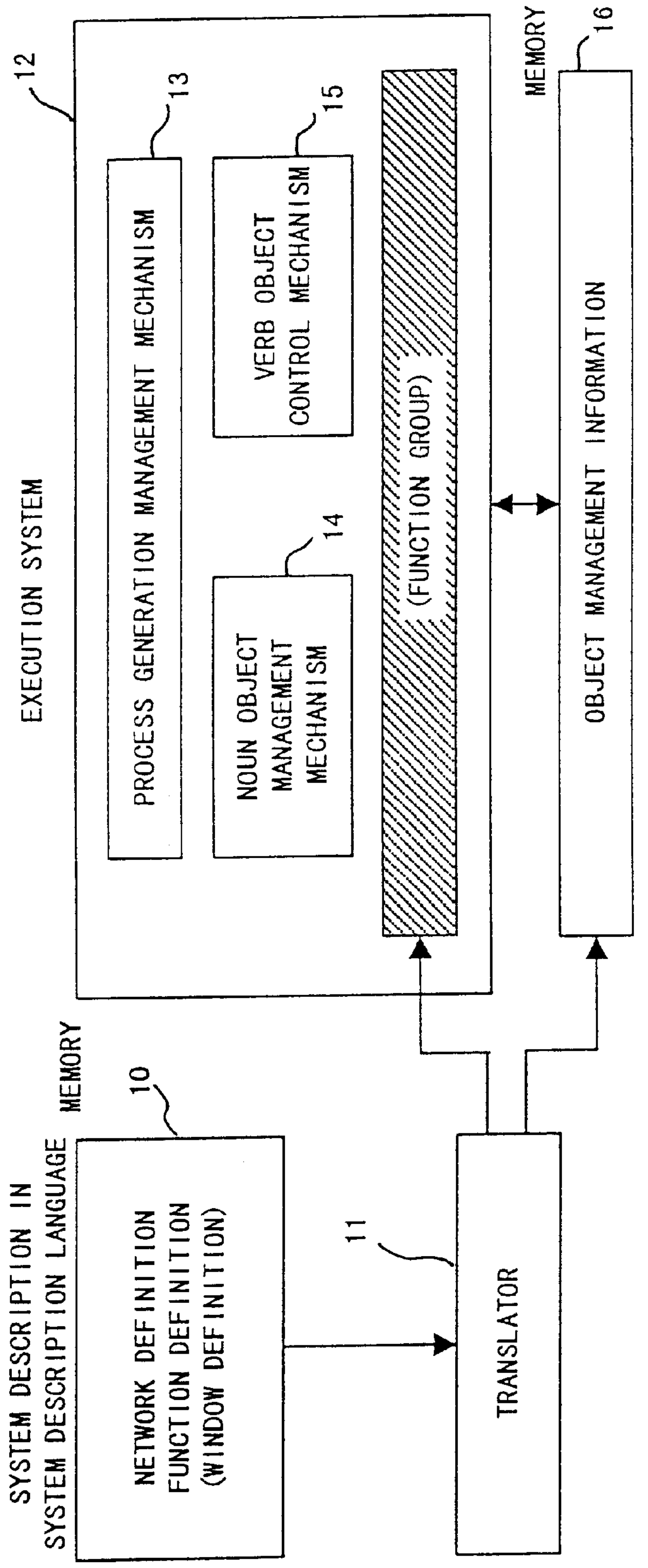
FIG. 2 is a block diagram showing the basic configuration of the information processing apparatus in an object network.

FIG. 2 is a block diagram showing the basic configuration of the information processing apparatus using an object network. In FIG. 2, the information processing system comprises memory 10 for storing the system description written in the field description language; a translator 11 for analyzing a syntax in response to the input of the system description and generating data for an execution system 12; and the memory 16 for storing the management information about the object network in the data generated by the translator 11.

The memory 10 containing the system description written in the field description language stores the definition of an object network, the definition of necessary functions, the definition of windows, etc. Windows are explained in relation to the common platform described later.

The execution system 12 comprises a process generation management mechanism 13 for controlling concurrent processes, etc.; a noun object management mechanism 14 for managing the noun object in the objects forming an object network; and a verb object control mechanism 15 for controlling the execution of a verb object.

Figure 3A:
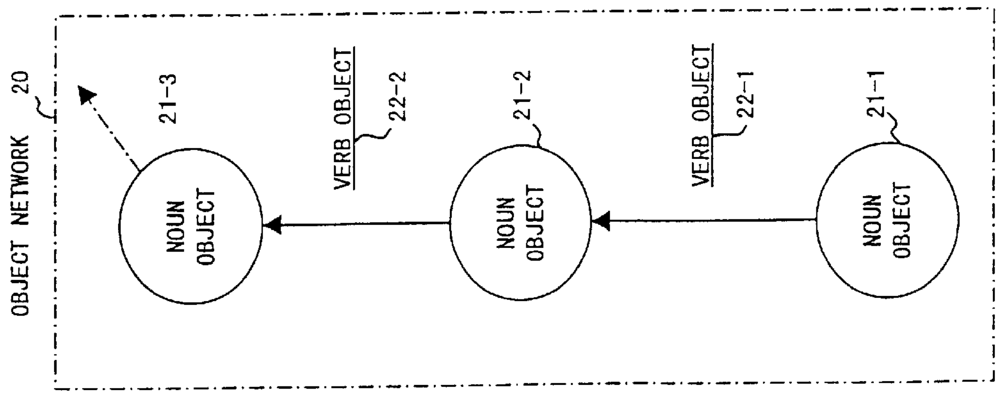
FIG. 3A shows a common object network.
Figure 3B:
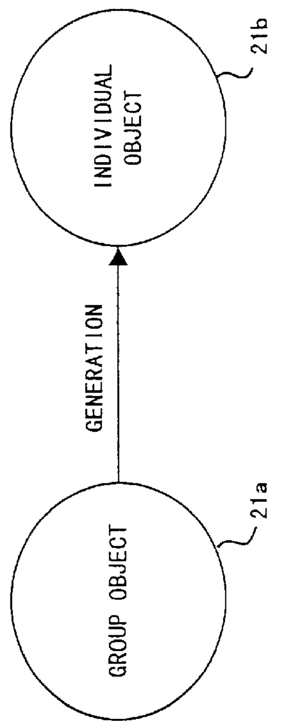
FIG. 3B shows a noun object in an object network.
Figure 3C:
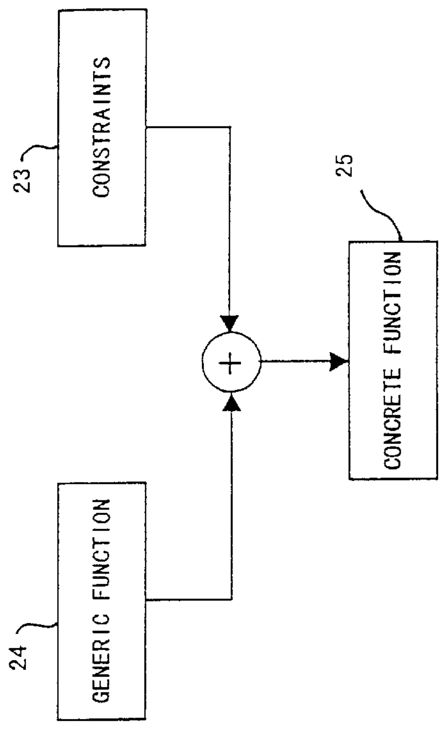
FIG. 3C shows a verb object in an object network.

FIGS. 3A, 3B, and 3C show common object networks. An object network manages the data in an information processing apparatus and the operation means for the data as objects. Objects can be divided into two groups, that is, noun objects and verb objects. As shown in FIG. 3A, an object network 20 is generated with a noun object represented as a node and a verb object represented as a branch. When the contents of the function corresponding to a verb object as a branch is processed on a noun object as a node in this object network, a network is generated such that a noun object at the end of the branch corresponding to the verb object can be obtained as a target.

As shown in FIG. 3B, a noun object 21 can be a group object 21*a* corresponding to a common noun and an individual object 21*b* corresponding to a proper noun. The individual object 21*b* is generated from the group object 21*a*.

As shown in FIG. 3C, a verb object can be a generic function 24 or a concrete function 25. When a noun object is obtained as a target, an executing process can be actually performed on a noun object using the concrete function 25. The concrete function 25 can be obtained by adding constraints 23 to the generic function 24. The conversion from the generic function 24 to the concrete function 25 is controlled by the verb object control mechanism 15.

Figure 4A:
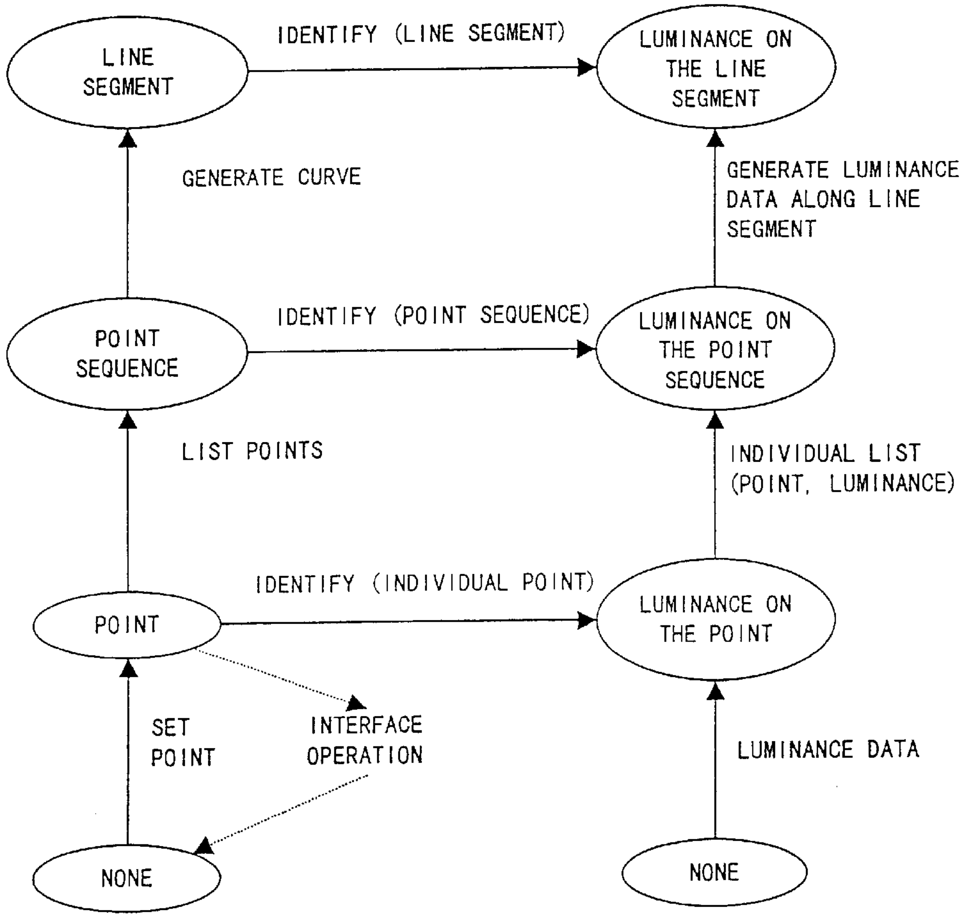
FIG. 4A shows a practical example of an object network.
Figure 4B:
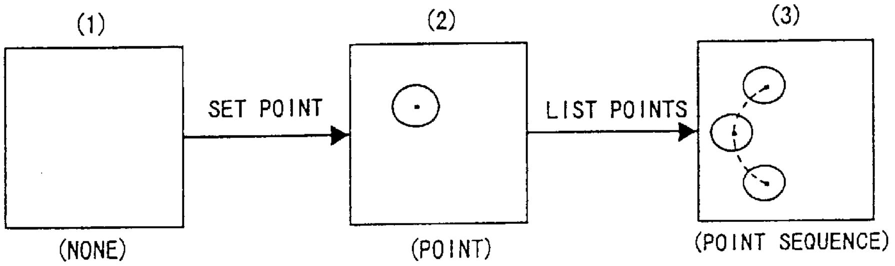
FIG. 4B shows an example of a generating process of an object network.

FIGS. 4A and 4B are practical examples of object networks. In this network, the field of a system description written in the field description language stored in the memory 10 shown in FIG. 2 relates to an image field, and the network is an object network through which images can be drawn. In FIG. 4A, an item network is shown on the left and an attribute network is shown on the right. An object network is generated by these two networks.

First, the item network shown on the left in FIG. 4A is described below by referring to FIG. 4B. As shown in FIG. 4B, when an image is drawn, nothing is drawn on the initial screen (1). For example, an operation is performed on a verb object 'set point' by a user specifying a point on the display using a Intention Achievement Information Processing Apparatus mouse, etc. Thus, a noun object 'point' is obtained in (2). For example, a plurality of points corresponding to the set point are drawn in an interface operation with the user. A noun object 'point sequence' in (3) is obtained by performing an operation corresponding to the verb object. Then, a line segment, for example, a noun object corresponding to a line can be obtained by operating a verb object 'generate curve'.

Described below is the attribute network shown on the right in FIG. 4A.

The attribute network shown on the right in FIG. 4A is used to color the image corresponding to the item network on the left. Each of the noun objects in the network is identified by the noun object corresponding in the item network. In the attribute network, a noun object of the luminance on the point, which specifies the intensity of each point, can be obtained on the screen on which nothing is drawn by operating the verb object of luminance data. Then, a noun object 'luminance on the point sequence' can be obtained by operating for the above described noun object an object specifying a list of points 'individual list' and the luminance of the points. Furthermore, a noun object 'luminance on the line segment' can be finally obtained by operating a verb object 'generate luminance data along line segment'.

Figure 5:
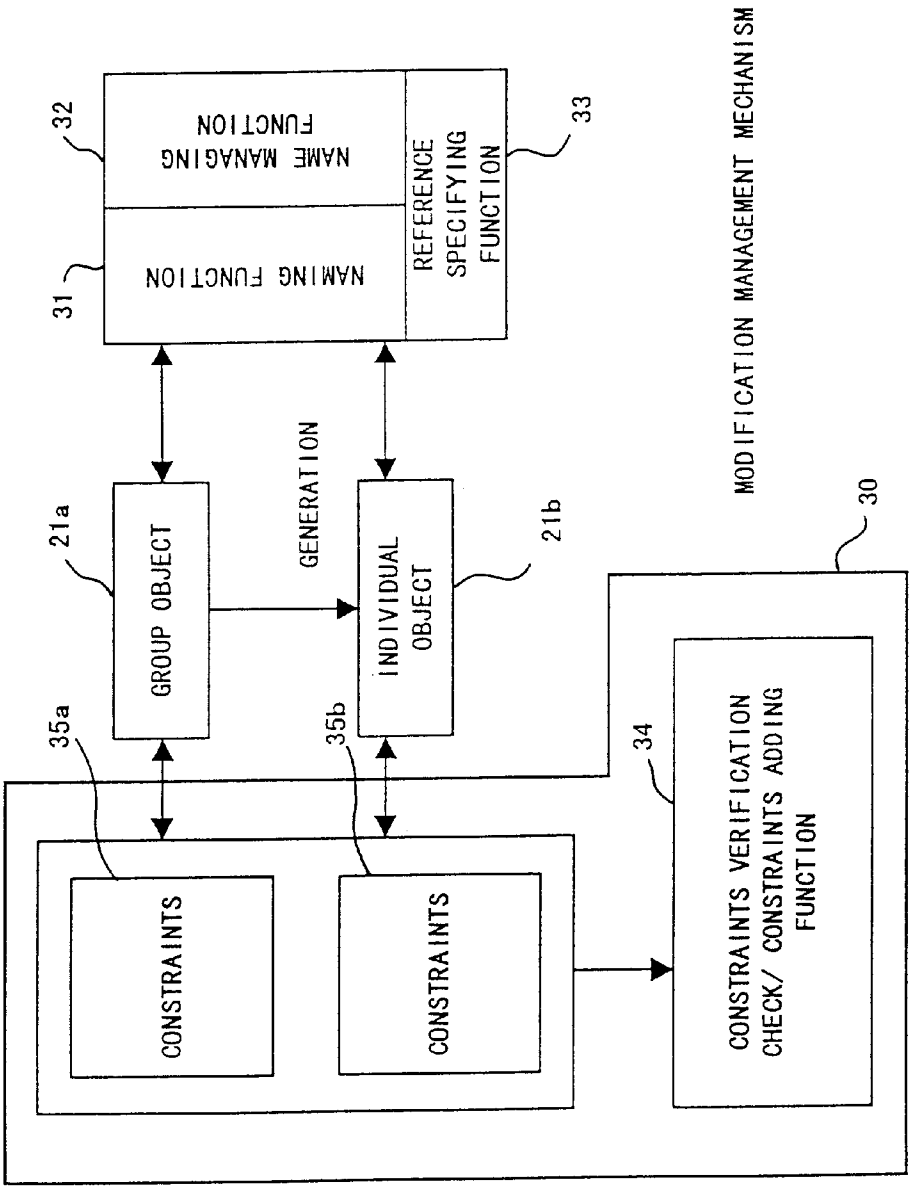
FIG. 5 is a block diagram showing the detailed configuration of a noun object management mechanism.

FIG. 5 is a block diagram showing the detailed configuration of the noun object management mechanism 14 shown in FIG. 2. In FIG. 5, the noun object management mechanism 14 comprises a modification management mechanism 30; a naming function 31; a name managing function 32; and a reference specifying function 33, and manages the group object 21*a* and the individual object 21*b*.

The noun object management mechanism 14 comprises the modification management mechanism 30. The modification management mechanism 30 is provided with the constraints for each of the group object 21*a* and the individual object 21*b*, for example, the constraints 35*a* and 35*b* as adjectives modifying noun objects, and has a constraints verification check/constraints adding function 34 for determining the validity of these constraints.

The naming function 31 allows a user or a system to name, for example, the individual object 21*b*. The name managing function 32 manages the name. The reference specifying function 33 can refer to, for example, a specific individual object 21*b* by distinguishing it from other objects.

Figure 6:
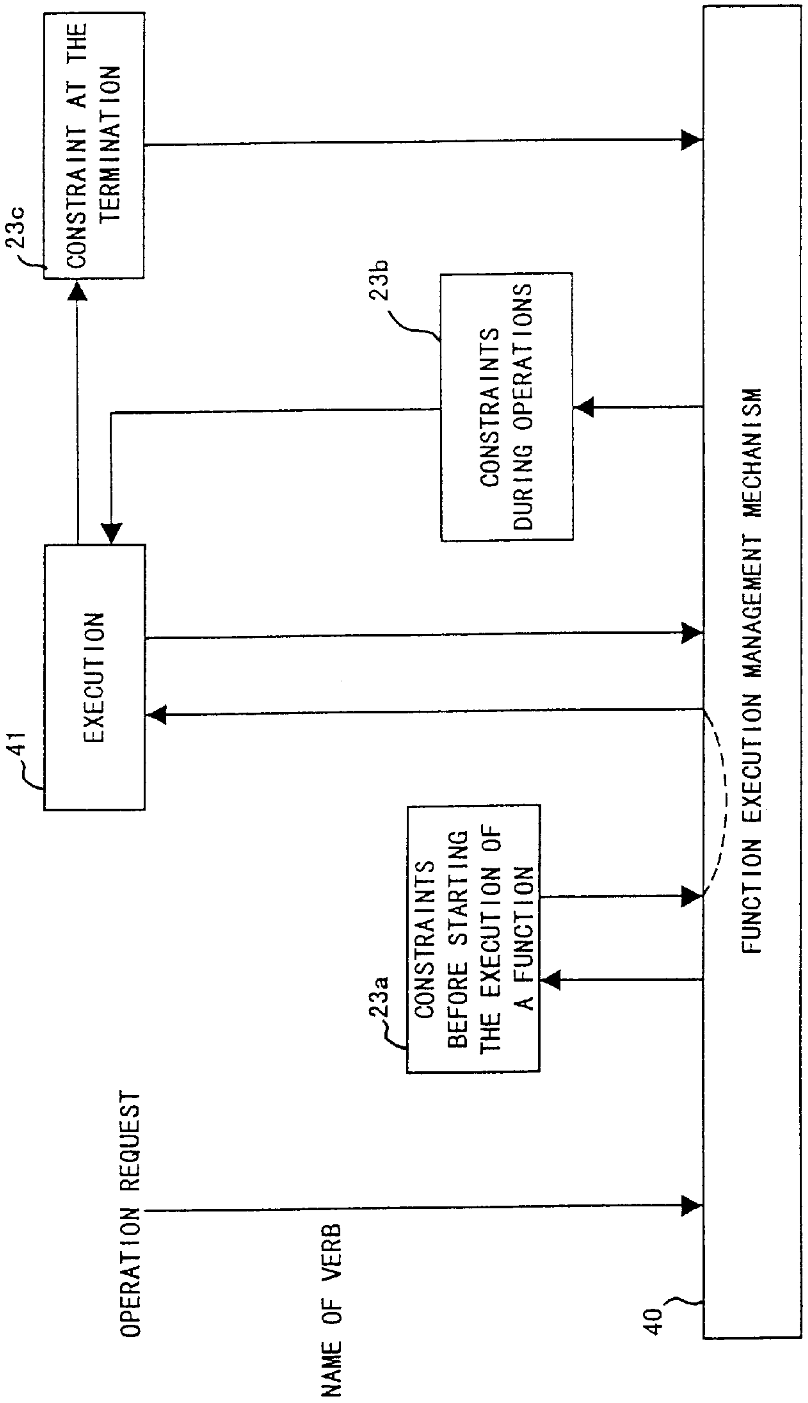
FIG. 6 shows the execution management of a function corresponding to a verb object.

FIG. 6 shows the execution management of a concrete function corresponding to a verb object. In FIG. 6, the execution management of a function is performed by a function execution management mechanism 40 not shown in FIG. 2.

When the function execution management mechanism 40 practically executes a function corresponding to a specified verb object, it manages execution 41 of a concrete function based on constraints 23*a* before starting the execution of the function, constraints 23*b* during the operations, and constraints 23*c* at the termination. That is, in response to a function operation request, the function execution management mechanism 40 checks the constraints 23*a* before starting the execution of a function with other constraints, practically performs the execution 41 of a concrete function, checks the constraints 23*b* during the operations of functions, and checks the constraints 23*c* after the termination of the execution.

For example, when an arc is to be drawn, it is necessary to set at least three coordinate values. If only two coordinates are set, it is not possible to execute the function of drawing an arc. However, the function execution management mechanism 40 can preliminarily check the above described constraints by checking the constraints 23*a* before starting the execution of a function, and can automatically activate a function of requesting the user to input the coordinates of the third point as necessary.

Figure 7:
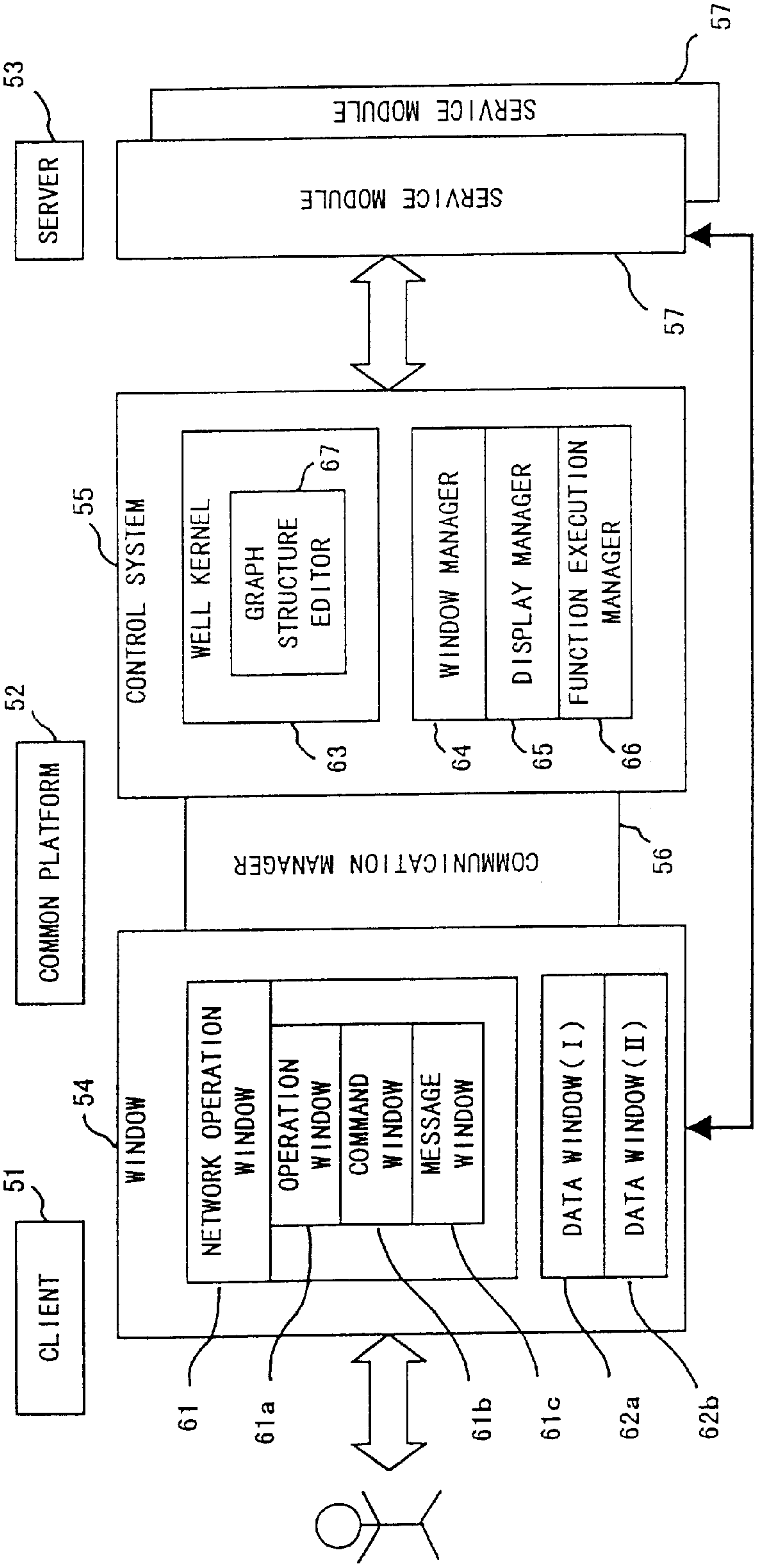
FIG. 7 is a block diagram showing the basic configuration of an information processing apparatus having a common platform as an interface with a user.

Described below is a common platform. FIG. 7 is a block diagram showing the basic configuration of the information processing apparatus having a common platform 52 as an interface between a client 51, for example, a user and a server 53 for performing a process specified by the client 51. In FIG. 7, the common platform 52 comprises a window 54 for inputting/outputting data to and from the client 51; a control system 55; and a communications manager 56 for matching the data representation format between the window 54 and the control system 55. The server 53 normally comprises a plurality of service modules 57.

The window 54 comprises a network operation window 61 and a data window 62. An operation window 61*a* in the network operation window 61 displays an image and a character capable of directing various operations from, for example, the client 51. A command window 61*b* displays an image and a character capable of specifying various commands from the client. A message window 61*c* displays a message, for example, from a system to a client. The data window 62 also comprises a data window (I) 62*a* for displaying a process result and a data window (II) 62*b* for displaying constraint data, etc. required for processes.

The communications manager 56 converts the representation format of the data exchanging between the client 51 and the server 53 through the window 54. The conversion in this representation format is described later.

The control system 55 is, for example, a part of the WELL system described later, and comprises a WELL kernel 63 for controlling the process corresponding to an object network; a window manager 64 for controlling the selection of various windows in the window 54; a display manager 65 for controlling the data display in the window; and a function execution manager 66 for controlling the execution of a function corresponding to a verb object in the object network. Furthermore, the WELL kernel 63 comprises a graph structure editor 67 for processing the graph structure of a network with an object network regarded as a type of data.

When a specification of a process target is received from the client 51 in FIG. 7, the server 53 invokes the object network representing the area of the process target. The graph structure editor 67 stores the object network in the work area of the WELL kernel 63. Based on the storage result, the object network is displayed in the operation window 61*a* through the control by the window manager 64 through the communications manager 56.

The client 51 specifies all or a part of the nodes in the object network displayed on the operation window 61*a*, and gives an instruction to the system. In response to this system, the communications manager 56 interprets the contents of the instruction, and makes the server 53 invoke the template corresponding to the specified noun object. The template is described later.

For example, constraint data corresponding to the noun object, etc. is displayed in the data window (II) 62*b*. The client 51 selects the constraint data. Based on the selection result, the server 53 performs the process specified by the client 51, and the process result is displayed in the data window (I) 62*a*, and is evaluated by the client 51. Then, the subsequent instruction is issued.

In the information processing apparatus using the common platform shown in FIG. 7, the data is represented in the format optimum to the user as the client 51 in the window 54, and the data is converted on the common platform 52 into the data format for use in the process in the data processing device. Thus, the user can easily user the system.

Graph or image data is more comprehensible to a user as a client 51 than data in a text format, and an instruction can be more easily given with graph or image data than with text data. Particularly, it is desired that dots and lines are specified directly in the data window 62 or using a mouse.

On the other hand, for a higher performance, the computer in the server 53 numerically represents a point using coordinates (x, y), and represents a line in a format of a list of picture elements from the starting point to the ending point.

That is, it is desired that data indicating dots and lines can be specified while being referred to by displaying them as entities between the common platform 52 and the client 51. On the other hand, it is desired that, between the common platform 52 and the server 53, the data can be specified in an index format, and the data obtained as a result of the instruction from the client 51 can be collectively transferred or processed in association.

The common platform 52 displays graphic and image data as entities to the client 51 so that the client 51 can issue a specification using the graphics and images. The common platform 52 displays data to the server 53 in a list structure or a raster display.

The common platform 52 enables data elements to be specified by the name in the communications with the client 51, and by the name header in the communications with the server 53.

In the information processing apparatus including the common platform 52 and the server 53 shown in FIG. 7 according to the embodiment of the present invention, a WELL system based on a functional language 'WELL' (window based elaboration language) is adopted. In this WELL system, data and a process performed on the data are handled as objects, and information is processed through an object network in which the above described data and the process performed on the data are represented in a graph.

Figure 8:
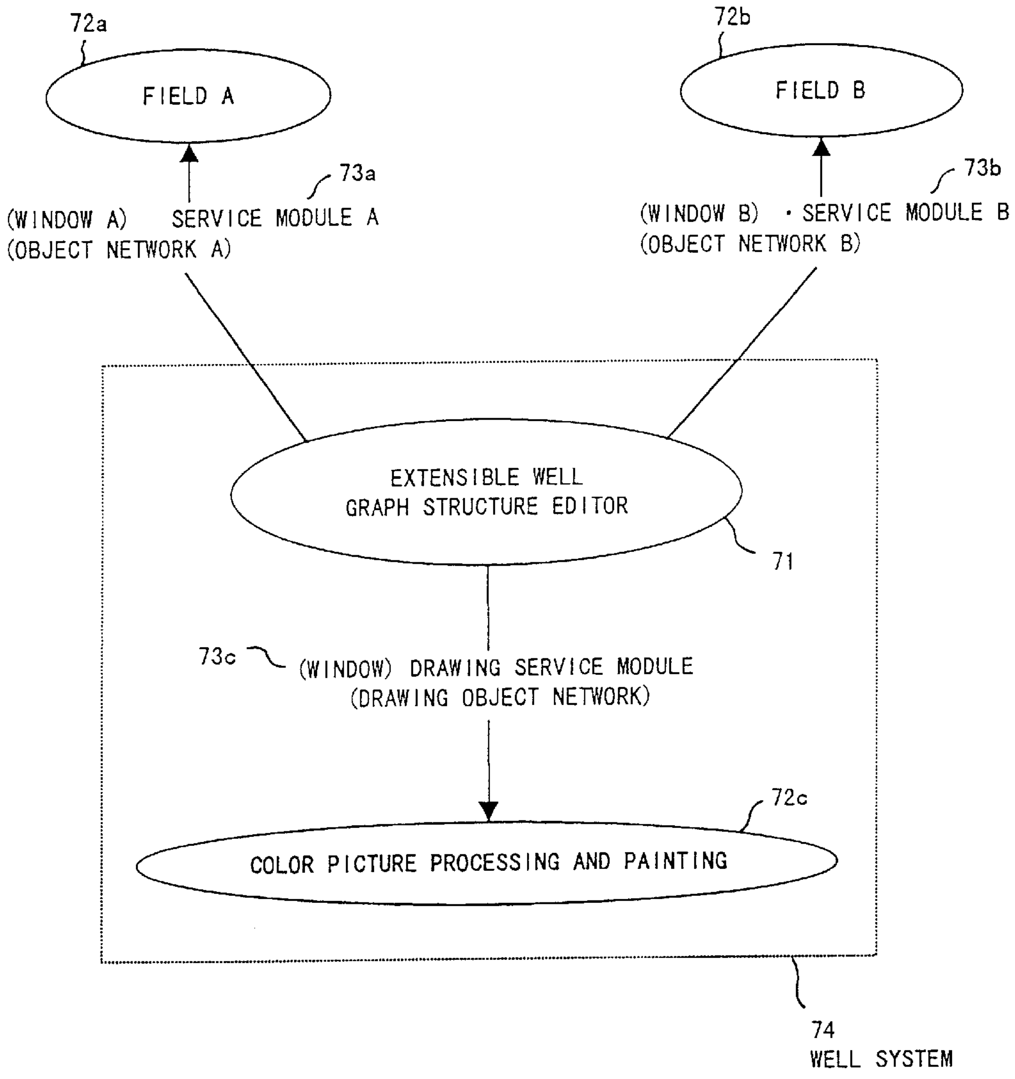
FIG. 8 shows a WELL (Windows-based Elaboration Language) system for use in a color image generating process and a coloring process.

FIG. 8 shows the relationship between the WELL system and the object network. In FIGS. 8, 72*a*, 72*b*, and 72*c* are specific process fields. Particularly, 72*c* is a color image generating and coloring process field. 73*a*, 73*b*, 73*c* are object networks corresponding to the fields 72*a*, 72*b*, and 72*c*. Especially, 73*c* is an object network used with a drawing service module to draw images. A graph structure editor 71 is used in an extensible WELL system applicable to various object networks.

When an object network corresponding to a specific field is given to the functional language WELL, the process of the object network is performed without a program. This is a window-oriented language, and a client-server model can be realized using a window as an interface with a client.

In FIG. 8, a WELL system 74 can be generated corresponding to the color image generating/coloring process field 72*c* by combining a window required for the color image generating/coloring process field 72*c* and the object network 73*c* corresponding to the service module for performing a corresponding process. Another WELL system corresponding to the field 72*a* or 72*b* can be generated by combining the object network 73*a* or 73*b* corresponding to another field.

Figure 9:
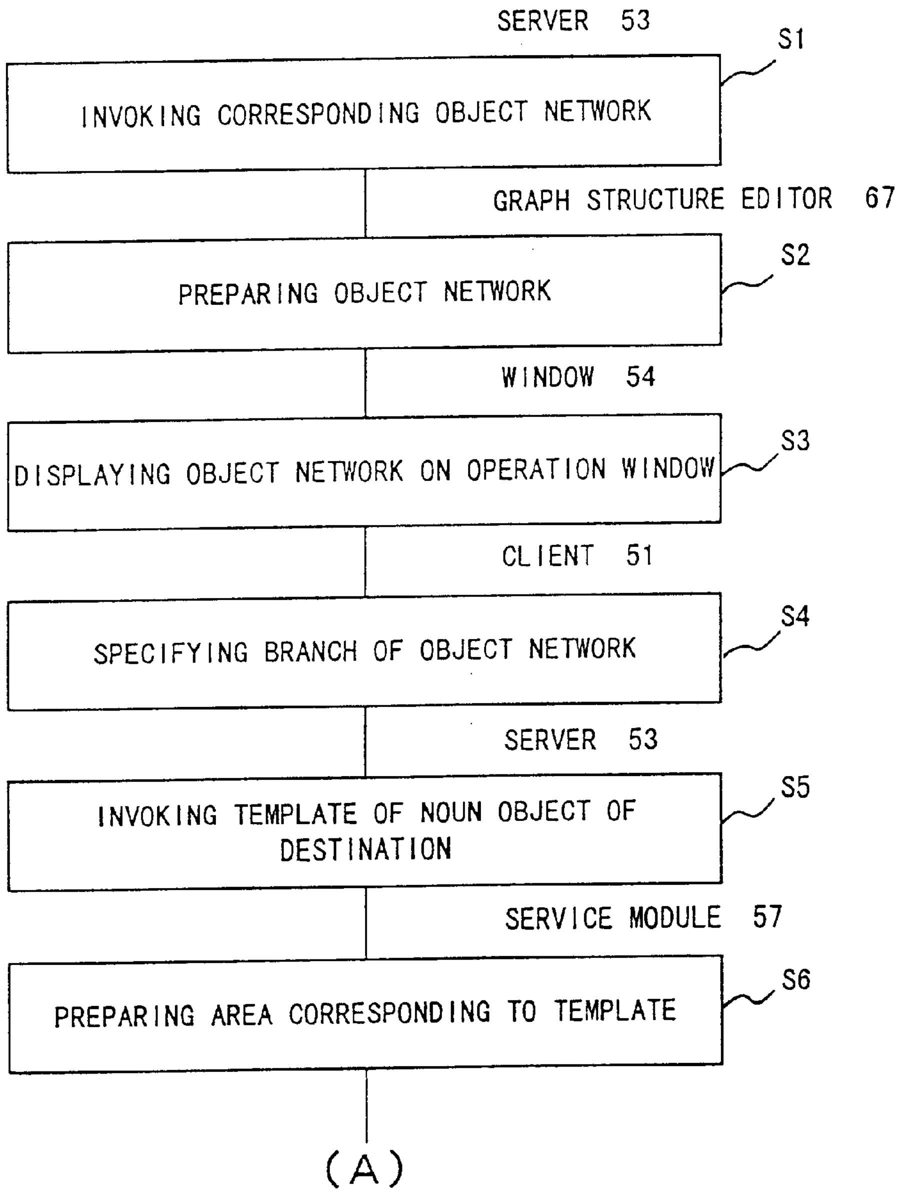
FIG. 9 is a flowchart (1) showing the data process through an object network.
Figure 10:
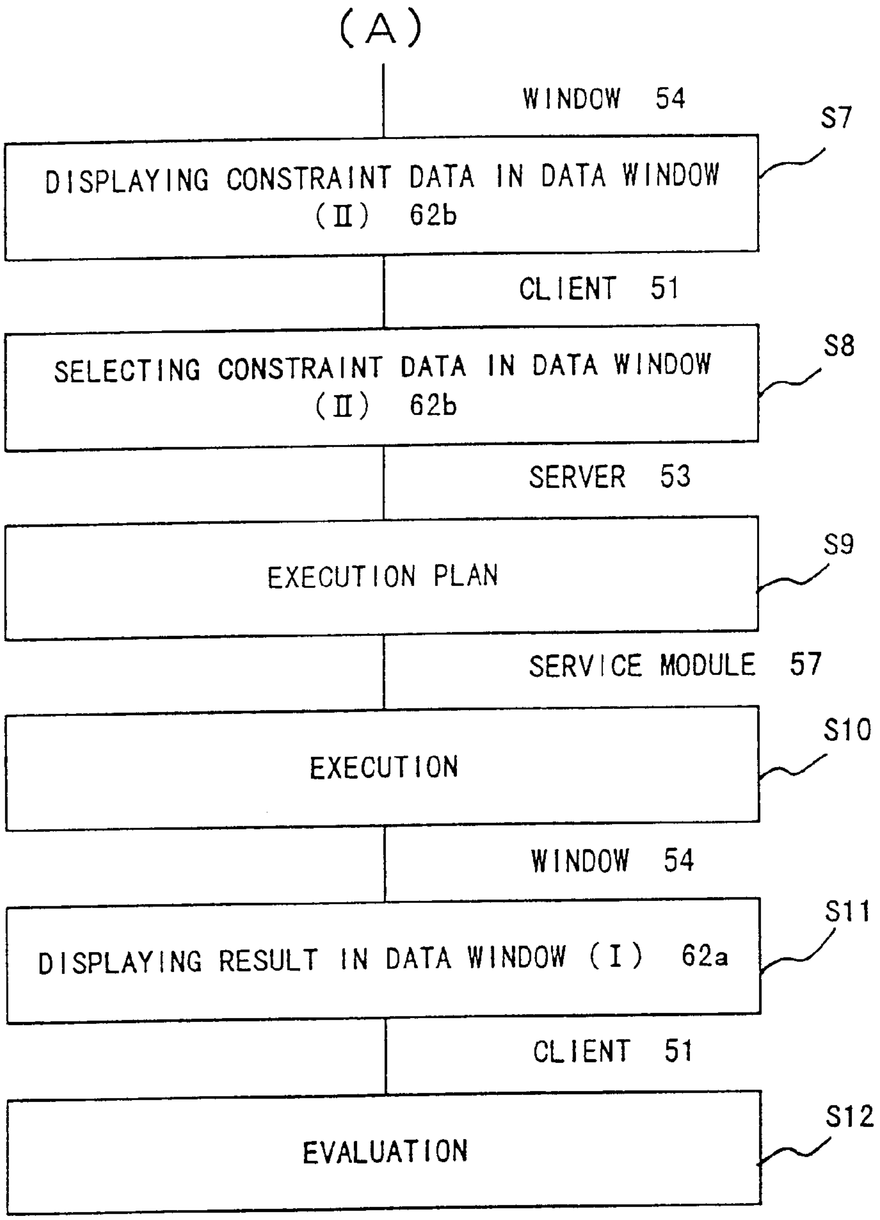
FIG. 10 is a flowchart (2) showing the data process through an object network.

FIGS. 9 and 10 are flowcharts of data processes through an object network. When a process starts as shown in FIG. 9, a corresponding object network is invoked by the server 53 shown in FIG. 7. For example, when a process is performed in the color image generating/coloring process field, the object network shown in FIG. 4A is invoked. The invoked object network is stored in a work area in the WELL kernel 63 by the graph structure editor 67 in step S2. In step S3, the WELL kernel 63 activates the window manager 64 and the display manager 65, and the object network is displayed on the operation window 61*a* through the communications manager 56.

The client 51 issues an instruction to the system by specifying a part of the object network displayed in step S4, for example, a branch. The specified item is identified by the communications manager 56. In step S5, the server 53 invokes through the WELL kernel 63 the template of the destination node, that is, the noun object at the end of the branch. In step S6, an area corresponding to the template is prepared by the service module 57.

Then, in step S7 shown in FIG. 10, the constraint data for the template is extracted by the common platform 52 and displayed in the data window (II) 62*b*. In step S8, the client 51 selects specific constraints data from among the constraint data displayed in the data window (II) in step S7. The selection result is identified by the communications manager 56, transmitted to the server 53 through the WELL kernel 63, thereby generating an execution plan in step S9.

According to the generated execution plan, the service module 67 performs a user-specified process, for example, a process of drawing a line, coloring an image, etc. in step S10. In step S11, the result is displayed on the data window (I) 62*a*, and the client 51 evaluates the process result in step S12. Then, the subsequent instruction is issued.

Figure 11:
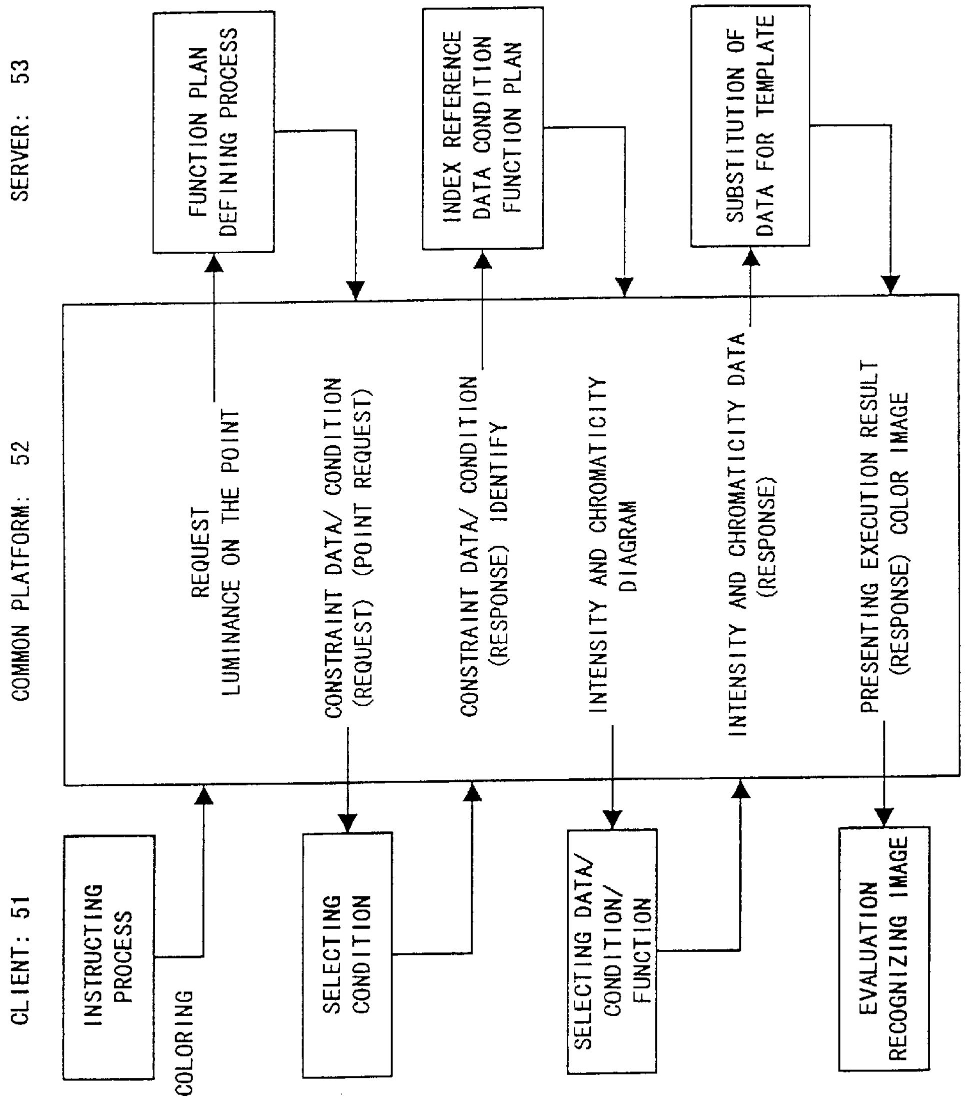
FIG. 11 shows the system of a color image generating process and a coloring process.

FIG. 11 shows the system of performing a color image generating/coloring process by the information processing apparatus provided with a common platform.

Described below is the 'luminance on the point' generating process for assigning intensity to a point in the attribute network on the right of the object network described by referring to FIG. 4A.

When the client 51 transmits a request to generate the 'luminance on the point' as a specification of a process to the server 53 through the common platform 52, the server 53 issues a request for information about which point is to be assigned intensity as the constraints data/conditions required for a plan of an executable function. The client 51 identifies a point as condition selection. When the point is specified, that is, identified, it is recognized by the server 53 referring to the index of the template described later through the common platform 52, and the client 51 is requested to select the intensity data to be assigned to the point as data necessary in planning the execution of a function.

The request is issued to the client 51 as an intensity/chromaticity diagram, and the client 51 returns to the server 53 the intensity/chromaticity data to be assigned to the point on the intensity/chromaticity diagram as the data/condition/function selection. The server 53 performs a process by substituting the data for the template. The color image obtained as a result of the execution is submitted to the client 51 through the common platform 52, and the client 51 evaluates the execution result by recognizing an image. Then, control is passed to the next specification of a process.

Figure 12:
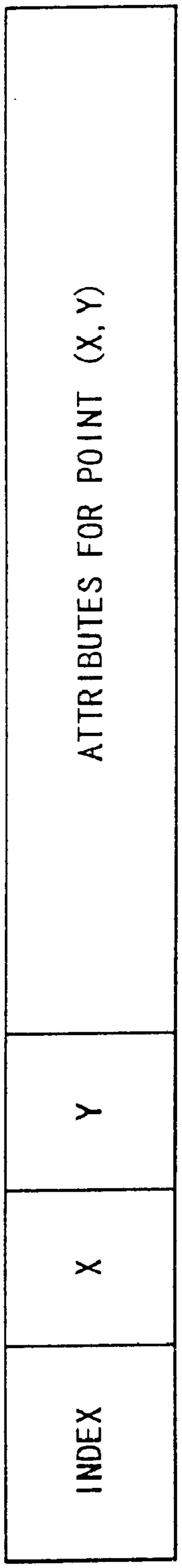
FIG. 12 shows an example of a template.

FIG. 12 shows an example of the template used in the process performed by the server 53. This template corresponds to the noun object of the point shown in FIG. 4A, and stores the X and Y coordinates of the point on the display screen; the index for specifying the point without using coordinates on the system side; and the attribute data of the point, for example, the intensity, chromaticity, etc.

Figure 13:
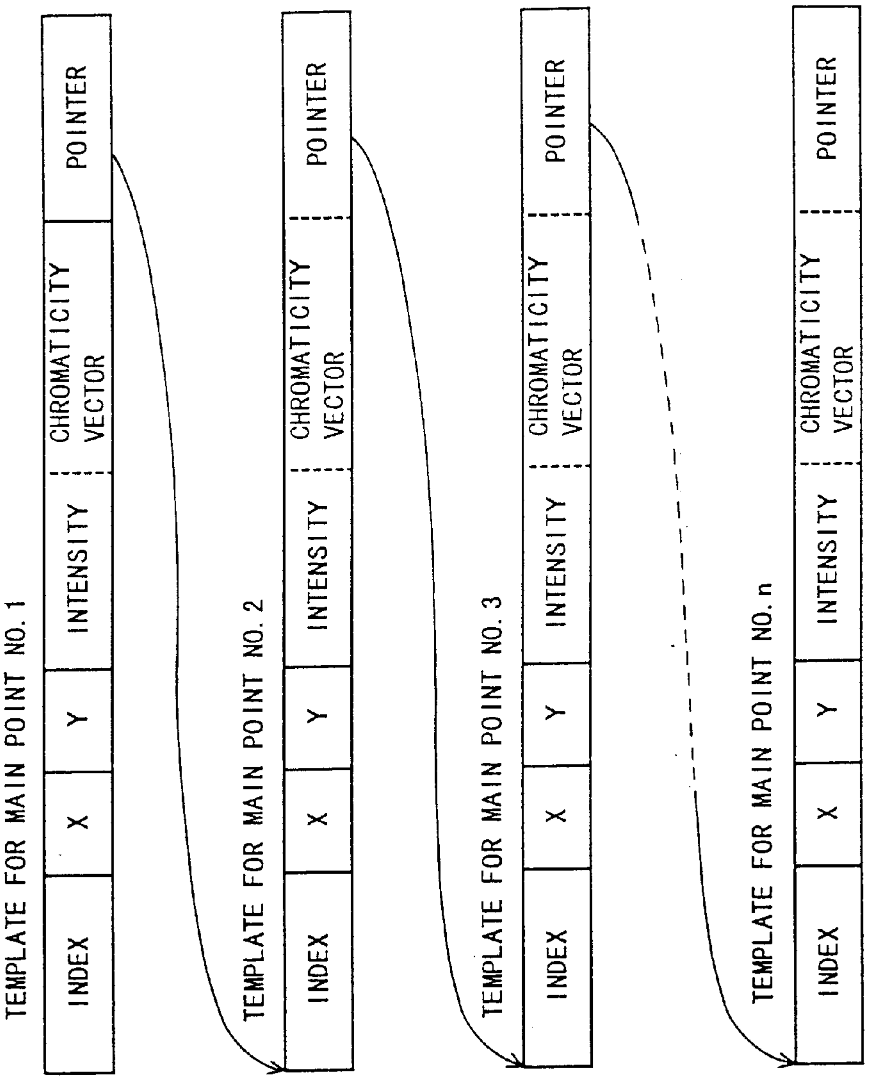
FIG. 13 shows an example of a template for a line segment.

FIG. 13 shows an example of the template corresponding to the noun object 'line segment' shown in FIG. 4A. In the template for a line segment, the attribute data storage area on the template for each of the main points No. 1, No. 2, . . . , No. n forming the line segment stores the intensity and the chromaticity vector of each point, and a pointer specifying another point for each of the main points. These pointers define the entire template corresponding to one line segment.

Figure 14:
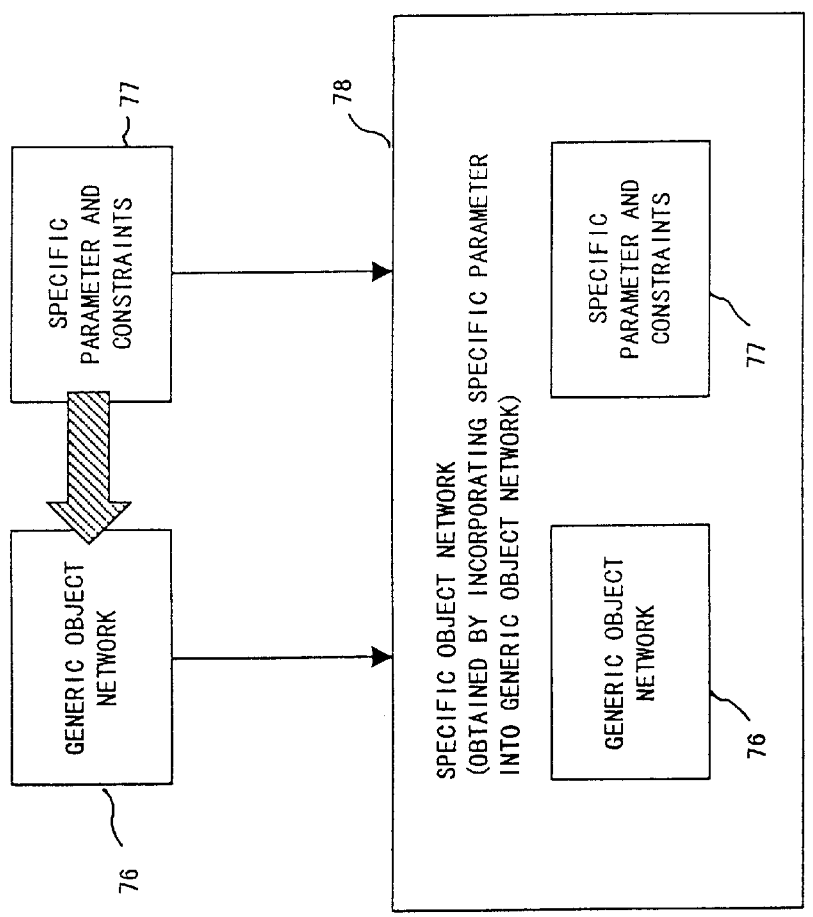
FIG. 14 shows a method of generating a specific object network from a typical generic object network.

FIG. 14 shows the method of generating a specific object network in which a specific process is performed from a common generic object network. For example, as a formula obtained by generalizing variables is given in mathematics, a generic object network 76 obtained by generalizing a parameter and constraints is provided. Then, a specific object network 78 for performing a specific process can be generated by incorporating a parameter for the specific process and constraints 77 into the generic object network 76.

Figure 15:
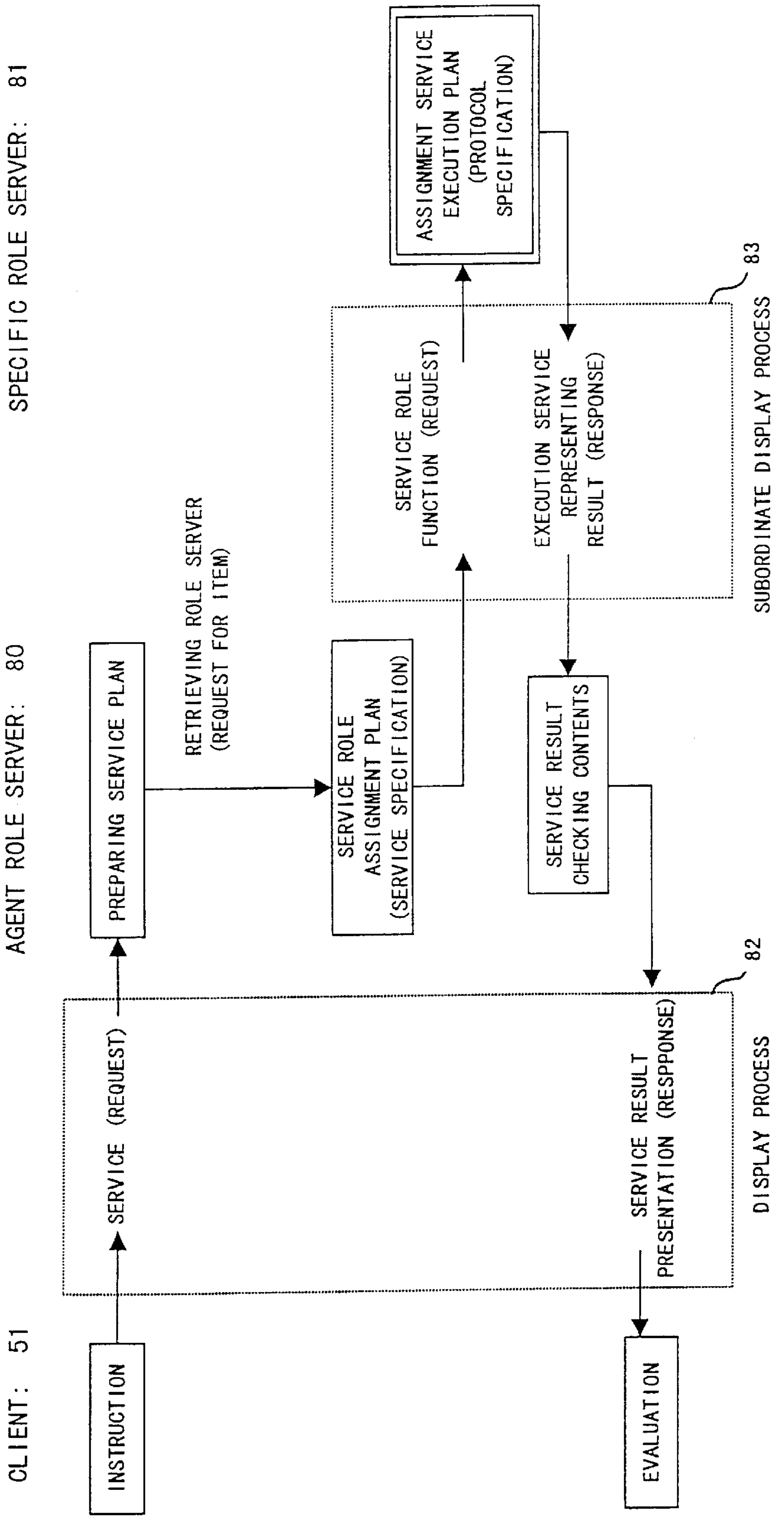
FIG. 15 is a block diagram showing the configuration of the information processing apparatus having an agent.

FIG. 15 is a block diagram showing the configuration of the information processing apparatus having an agent. This device is different from the device shown in FIG. 7 in that it has an agent role server 80 between the client 51 and a specific role server 81 corresponding to the server 53 shown in FIG. 7. In FIG. 15, the agent role server 80 is provided to function as, for example, a travel agent between the client 51 and the specific role server 81 for actually performing a concrete process.

A display process 82 and a subordinate display process 83 are display processes for displaying data required between the client 51 and the agent role server 80, and between the agent role server 80 and the specific role server 81. Between the client 51 and the agent role server 80, a service request and a response to the request are issued using the display process 82.

The agent role server 80 prepares a service plan according to an instruction from the client 51, retrieves a server for performing the role, that is, the specific role server 81, generates a service role assigning plan, and requests the specific role server 81 to perform the role function through the subordinate display process 83.

The specific role server 81 performs a process for an assigned service executing process, and presents the process result to the agent role server 80 through the subordinate display process 83. The agent role server 80 checks the contents of the service result, and then submits the result to the client 51 through the display process 82.

The display process 82 and the subordinate display process 83 shown in FIG. 15 are realized in the common platform format described in FIG. 7. The agent role server 80 can be considered to be realized as one of the service modules 57.

Figure 16:
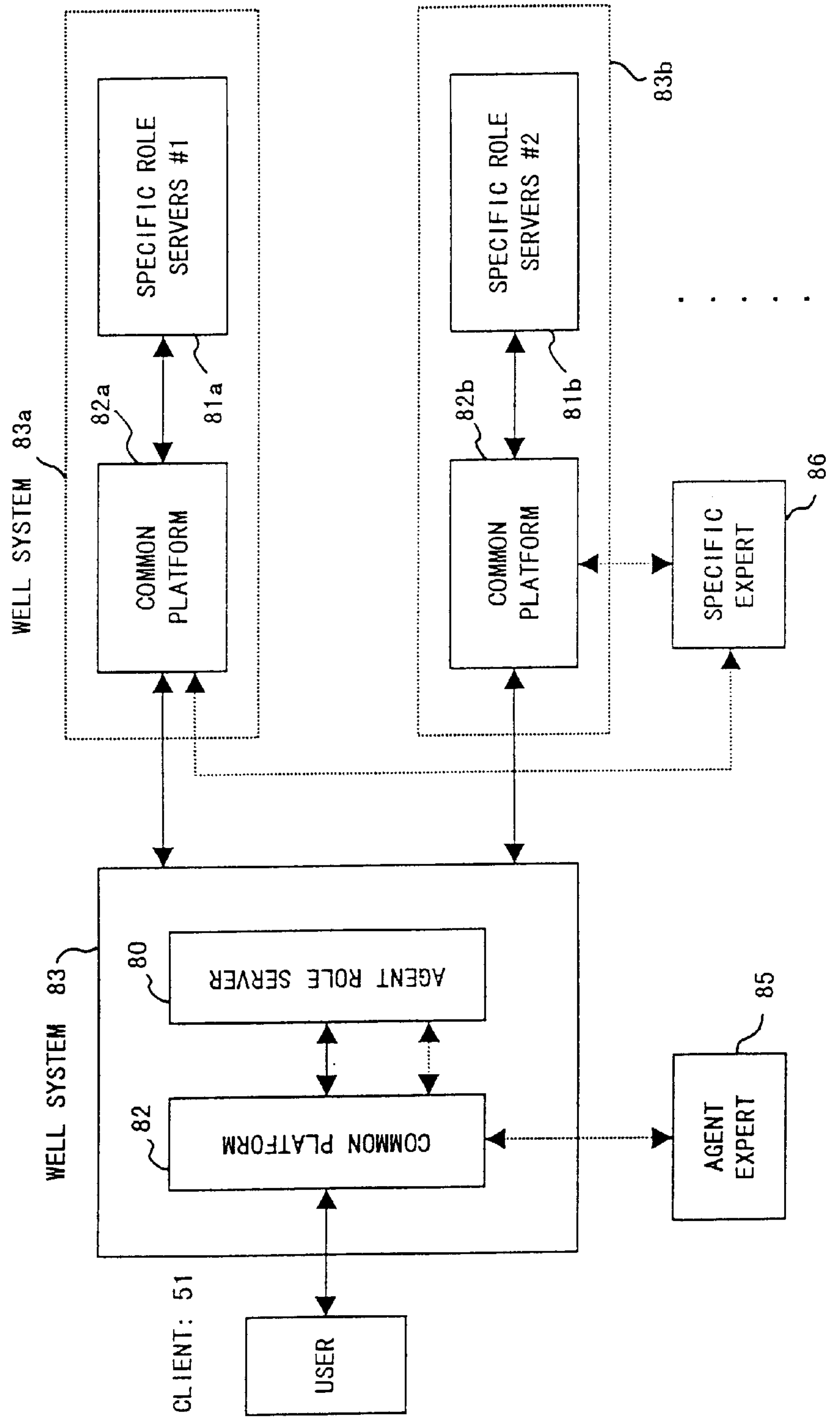
FIG. 16 is a block diagram showing the configuration of the information processing apparatus with the existence of an expert taken into account.

FIG. 16 is a block diagram showing the configuration of the information processing apparatus with the existence of an expert taken into account. In FIG. 16, unlike the configuration shown in FIG. 15, a plurality of specific role servers 81*a*, 81*b*, . . . are provided as specific role servers. Each of the specific role servers individually performs an assigned specific service. The agent role server 80 integrates the results, and performs a process according to an instruction from the client 51. The agent role server 80 forms part of the WELL system 83 together with the display process 82, and, for example, the specific role server 81*a* forms part of a WELL system 83*a* together with a common platform 82*a*, and then the specific role server 81*b* forms part of a WELL system 83*b* together with a common platform 82*b*.

In FIG. 16, an agent expert 85 supports the exchange of information between the client 51 and an agent role server 80. A specific expert 86 supports the exchange of information between the agent role server 80 and a plurality of specific role servers 81*a*, 81*b*, . . .

The client 51 is normally a user. However, the agent expert 85 and the specific expert 86 are not limited to a human being, but can be a processing unit having intelligent abilities.

In general, there are two kinds of clients whose roles are classified as expert and user. The role of expert is to prepare the service planning and executing system for the defined service. User has a role of processing of services which are arranged by the expert.

In FIG. 16, the client 51 requests the agent role server 80 to solve a specific problem. When the request is issued, the agent expert 85 acts as an expert for establishing a generic object network corresponding to a process to be performed by the agent role server 80, generating normally a plurality of specific object networks into which a specific parameter and constraints are actually incorporated, and supporting the agent role server 80 preparing a service plan.

Similarly, the specific expert 86 supports the specific role servers 81*a*, 81*b*, . . . by, for example, designing an object network for realizing a service assigned to each of the specific role servers 81*a*, 81*b*, . . . and a template related to the network based on the service plan prepared by the agent role server 80.

Figure 17:
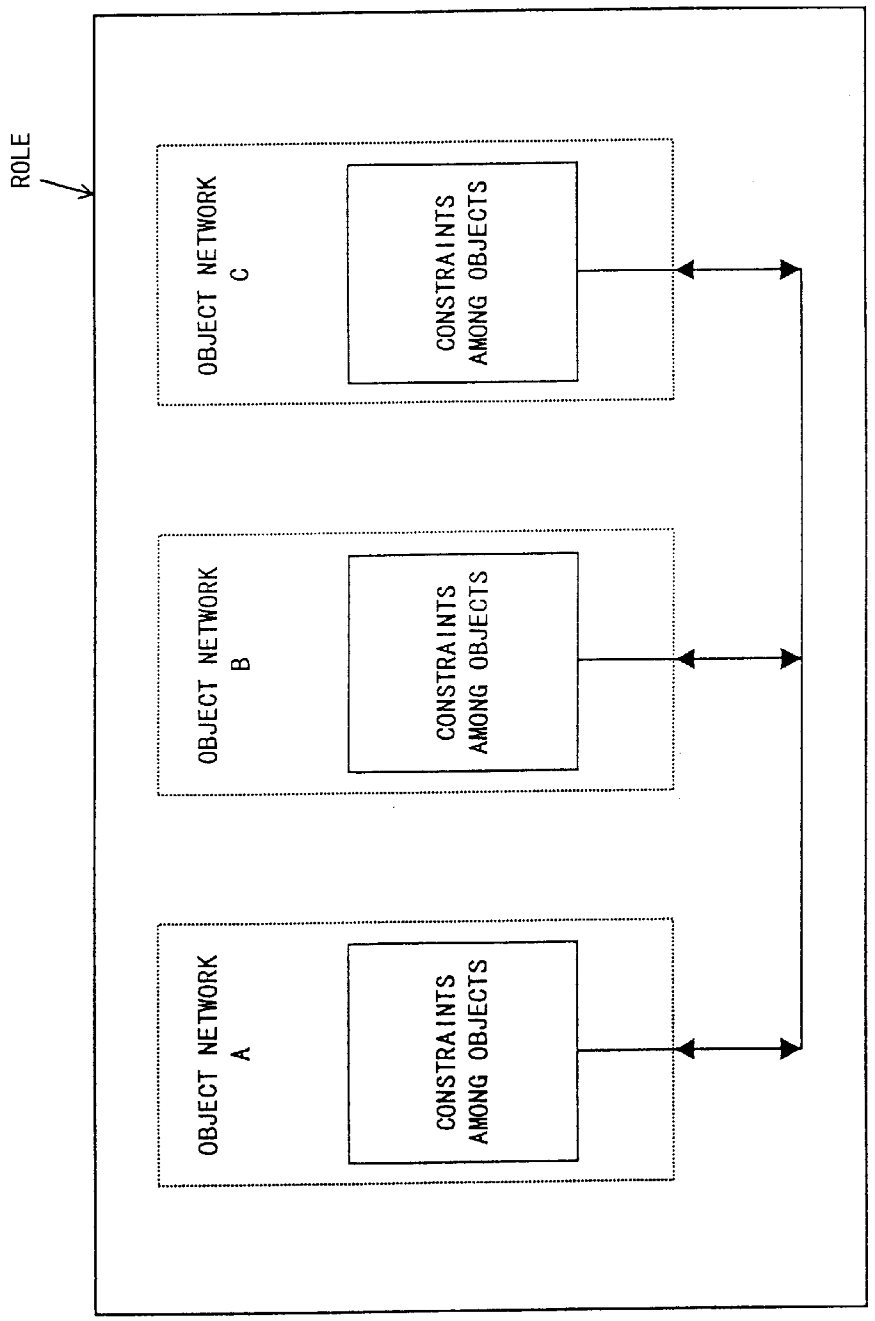
FIG. 17 shows the definition of roles.

Described below are the role functions and the interactive functions of the information processing apparatus using an object network and a common platform. As shown in FIG. 17, a role is defined as a structure of an object network, and operated as an executable process unit. A role is assigned its name so that it can be referred to by the name inside and outside of the system.

The relationship among a plurality of object networks in a role is regulated as a relational expression of attribute values of objects forming each object network corresponding to the constraints defined for the objects. A role can include only one object network.

In the information processing apparatus according to the present invention, role should cooperate with each other to satisfy an instruction from the user as a whole by performing a plurality of roles. To attain this, the roles should have interactive functions and free communications systems. Furthermore, to satisfy a request from the user, an efficient interactive function is required between the user (can be considered to be one supporting role) and a service system. As described above, the interface function between the user and the system can be realized by a common platform.

In the above described data processing device, two types of efficient interactive functions, that is, event driven and data driven functions, are used between the user and a system, or among a plurality of roles.

First, in the event driven function, for example, a client requests a system to realize a noun object on a common platform. A server in the system receives the request through the common platform, and returns a process result to the client.

In the data driven function, for example, when a value corresponding to an attribute is not defined in a template corresponding to the noun object being processed in the system, the system requests the client to set the attribute value. When the request is issued, the information that the attribute value has not been defined yet is displayed in a data window, and the client is requested to define a necessary attribute value.

Figure 18:
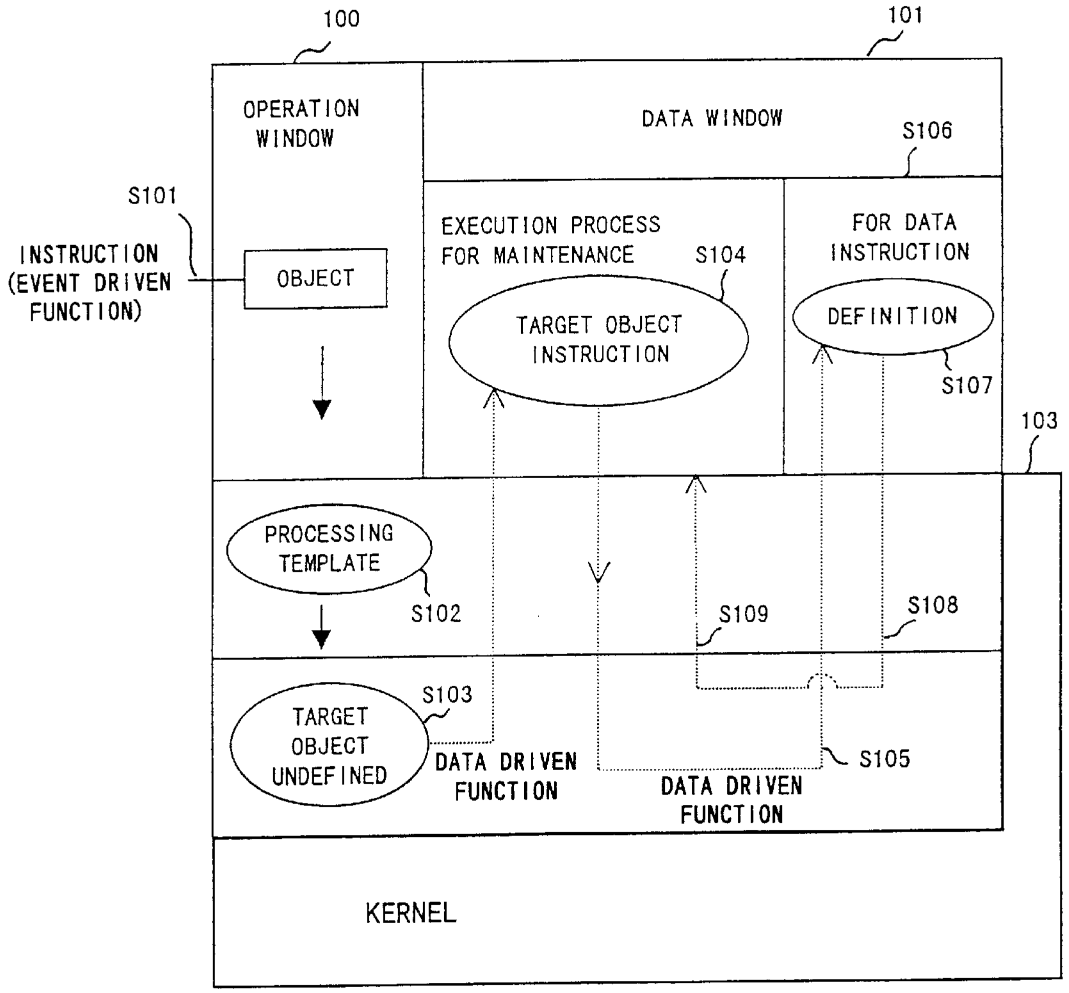
FIG. 18 shows the operation of the process in the WELL system for realizing the interactive function.
Figure 19:
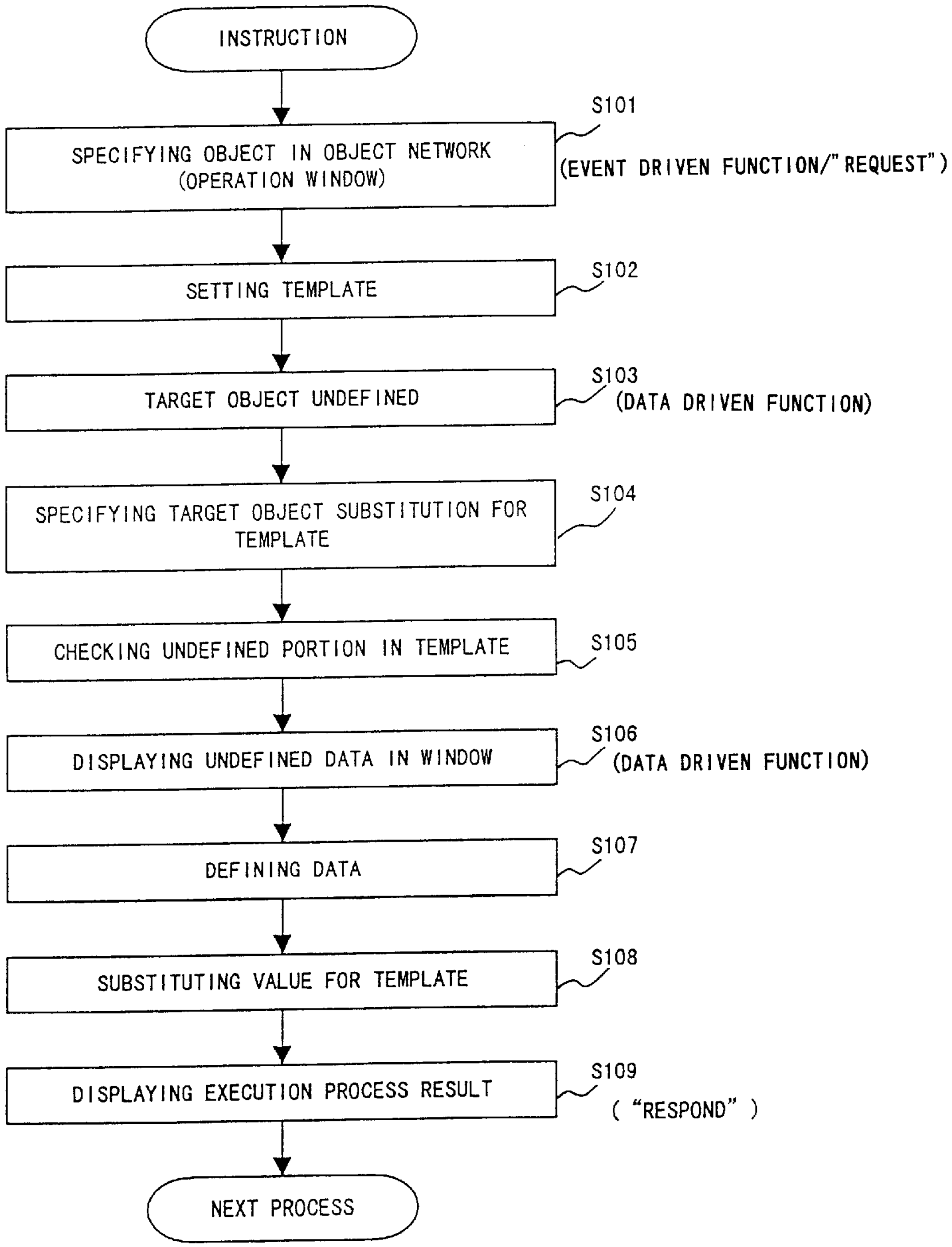
FIG. 19 is a flowchart showing the process of an interactive function.

FIG. 18 shows the process in the WELL system to explain the interactive function based on the above described event driven and data driven functions. FIG. 19 is a flowchart showing the process of the interactive functions based on the event driven and the data driven functions shown in FIG. 18. The process based on the event driven and the data driven functions is explained below by referring to FIGS. 18 and 19.

First, in step S101 shown in FIG. 19, a client, for example, a user specifies, as a request to the system, one object in the object network displayed in an operation window 100 on the common platform shown in FIG. 18. This corresponds to the event driven function. In response to the user's specification, a template corresponding to the object is set in step S102.

When a concrete name, etc. of a target object corresponding to the set template has not been defined yet, it is determined by a kernel 103 of the WELL system, and the client is requested to specify a target object in the data driven function in step S103. This corresponds to the case where the name of an object in a specific object network corresponding to an object forming part of a generic object network is not defined as described by referring to FIG. 14.

The client specifies a target object in a data window 101. The target object is substituted for the template in step S104. Then, the kernel 103 checks in step S105 whether or not there is an attribute value not defined in the template. When there is an undefined attribute value, the kernel 103 displays a message in step S106 on the data window 101 a message to prompt the client to enter the attribute value to define it.

The client defines the undefined attribute value in the data window 101, and the data definition is received by the system in step S107. In step S108, the attribute value is substituted for the template. The WELL system performs a process using the template for which an attribute value is substituted, and displays a process result in the data window 101 in step S109, thereby terminating the process in response to the specification of the client.

Thus, an efficient and user-friendly interface can be realized between a user and a system through the interactive function based on the above described event driven and data driven functions. Furthermore, among a plurality of roles, for example, between an agent role server and a specific role server, a communicating function can be realized to support the cooperation among role functions. Additionally, a software architecture for various systems, especially personal computer systems can be available by realizing the interactive function using the kernel of the WELL system.

When a cooperative operation is performed among a plurality of roles, it is desired that an interactive function is provided based on common data between a primary role for performing a primary role function and a supporting role for providing a service function for supporting the primary role. The primary role is operated in the environment related to the primary role, and the environment data related to this environment should be constantly monitored. When the supporting role shares the environment data with the primary role, and there is a change in the environment data, the primary role can function as matching the change in the environment only if the primary role can be informed of as an interruption the characteristic of the change.

Figure 20:
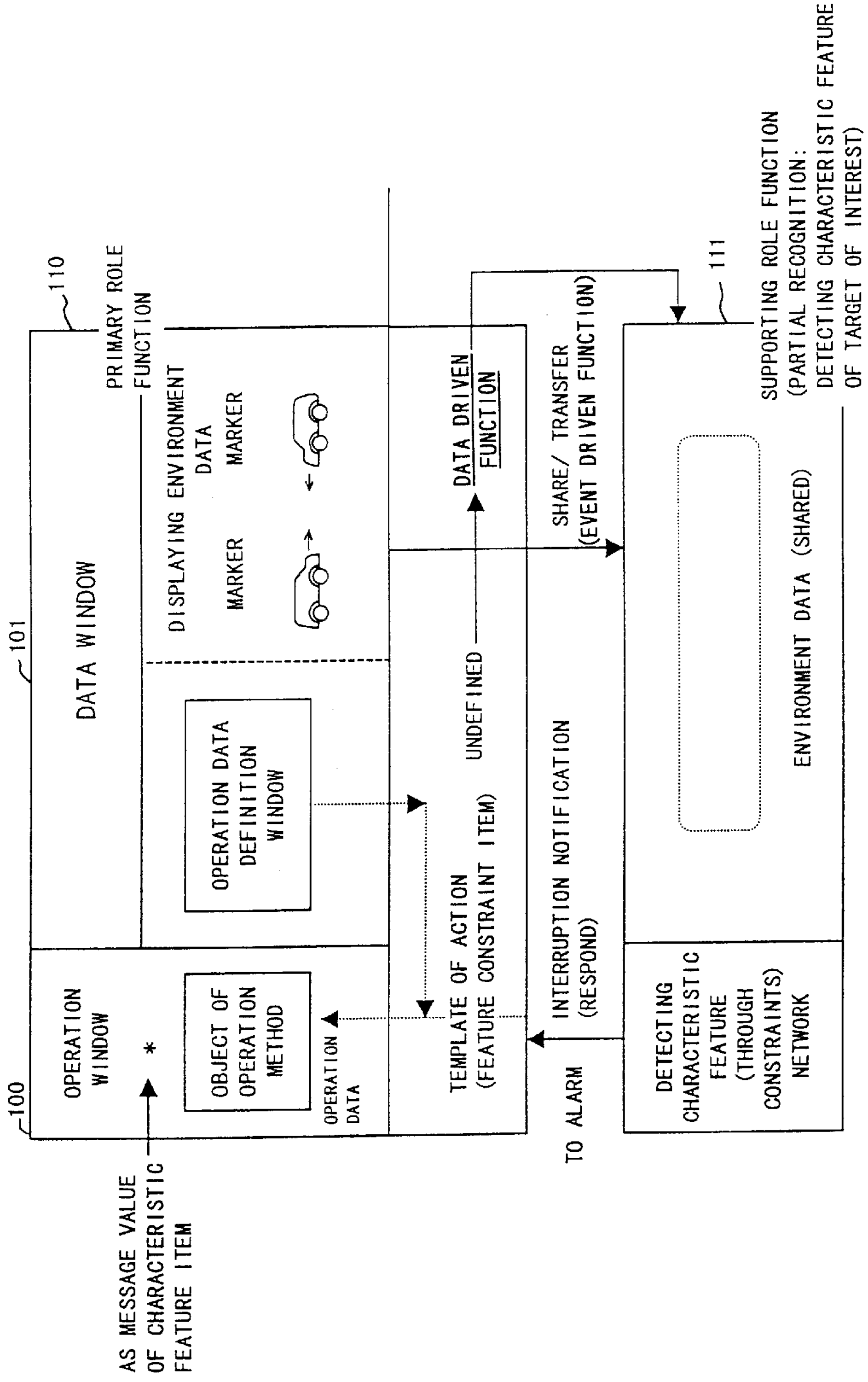
FIG. 20 shows the interactive function between the primary role function and the supporting role function.

FIG. 20 shows the interactive function between the primary role function and the supporting role function based on the environment data. In FIG. 20, assume that two cars can be semi-automatically driven. Each car has its own system and is driven along a course having the possibility of a crash against each other.

A primary role function 110 incorporated into one car is provided with an object of a semi-automatic driving method. The object of this driving method is displayed in the operation window 100 on a common platform. The environment data is displayed in the data window 101.

When the displayed environment data is changed, it is transferred to a supporting role function 111 as event driven function. The supporting role function 111 detects the characteristic feature of the environment data through the characteristic feature detecting object network provided in the supporting role function 111.

If a characteristic feature that the two cars approach each other such that they cannot avoid a crash against each other, the supporting role function 111 notifies as an interruption the primary role function 110 of the detection, thereby returning a response. In response to the interruption, the primary role function 110 sets an action template corresponding to an object of a driving method.

When there is an undefined portion in the action template, for example, when it is not defined how much and in which directions the cars are to be moved, a request is issued to set the undefined data through the data driven function. When the semi-automatic driving method is not available, the user, that is, the driver, is requested to set the undefined data. In this example, the semi-automatic driving method is available, and the supporting role function 111 is requested to set the undefined data. The supporting role function 111 detects necessary characteristic feature from the environment data, and provides the requested data based on the detection result. When the data is substituted for the action template, the primary role function 110 starts the interaction with the user to allow the user to actually drive the car using a driving method object as a driving guide.

Furthermore, for a smooth cooperation among a plurality of roles, it is necessary to establish a one-to-multiple broadcast from a primary role function for performing a role to a subordinate role function for performing a role related to the above described role.

Figure 21:
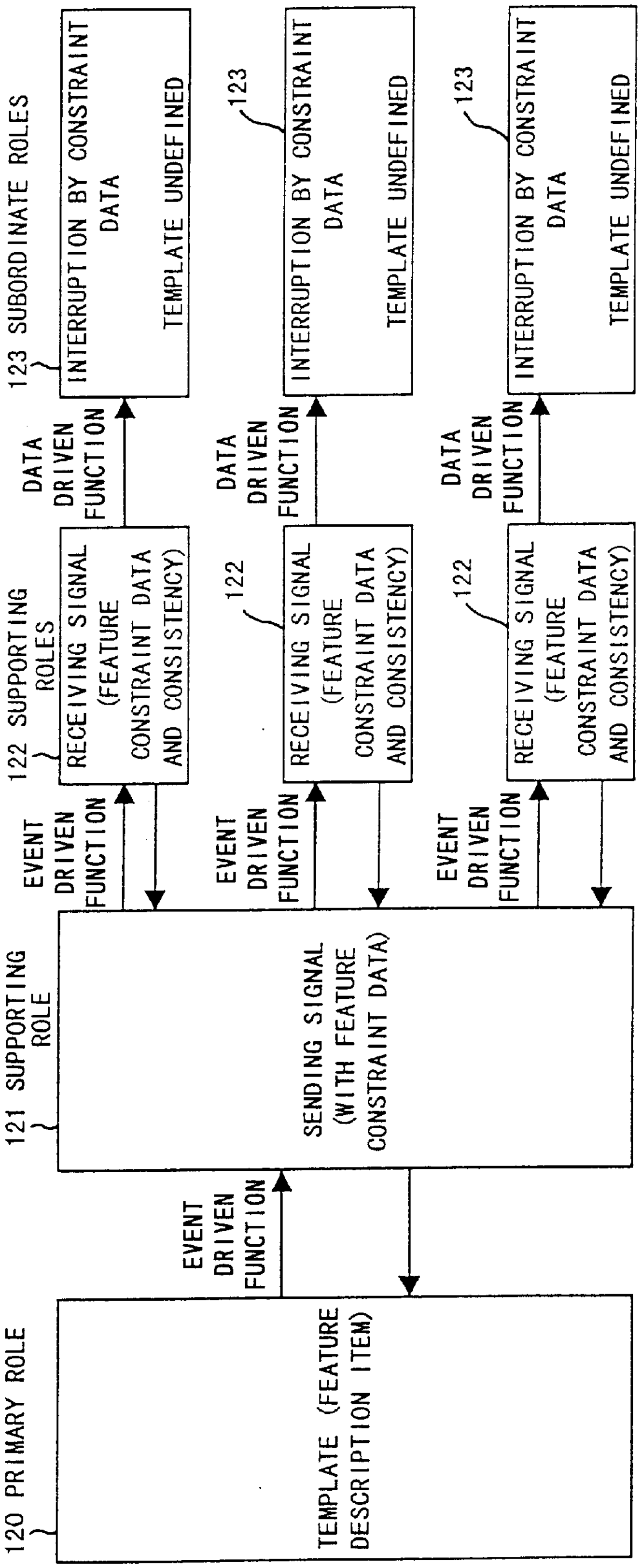
FIG. 21 shows the one-to-multiple broadcast from a primary role function to a subordinate role function.

FIG. 21 shows the one-to-multiple broadcast from the primary role function to the subordinate role function. In FIG. 21, it is assumed that a primary role 120 and a plurality of subordinate roles 123 cooperate with each other in the system. The primary role 120 controls the operations of the subordinate roles 123 by performing a one-to-multiple broadcast to the subordinate roles 123. To attain this, a supporting role 121 broadcasts a signal with characteristic constraint data to a plurality of supporting roles 122 based on the event driven function from the primary role 120. The supporting roles 122 receive the broadcast and extract the name of the broadcasting role function and the constraint data.

The subordinate roles 123 has a template containing an undefined portion, receives the constraint data from the supporting roles 122 through an interruption based on the data driven function, and performs a subordinate role function to the primary role 120 according to the constraint data.

Figure 22:
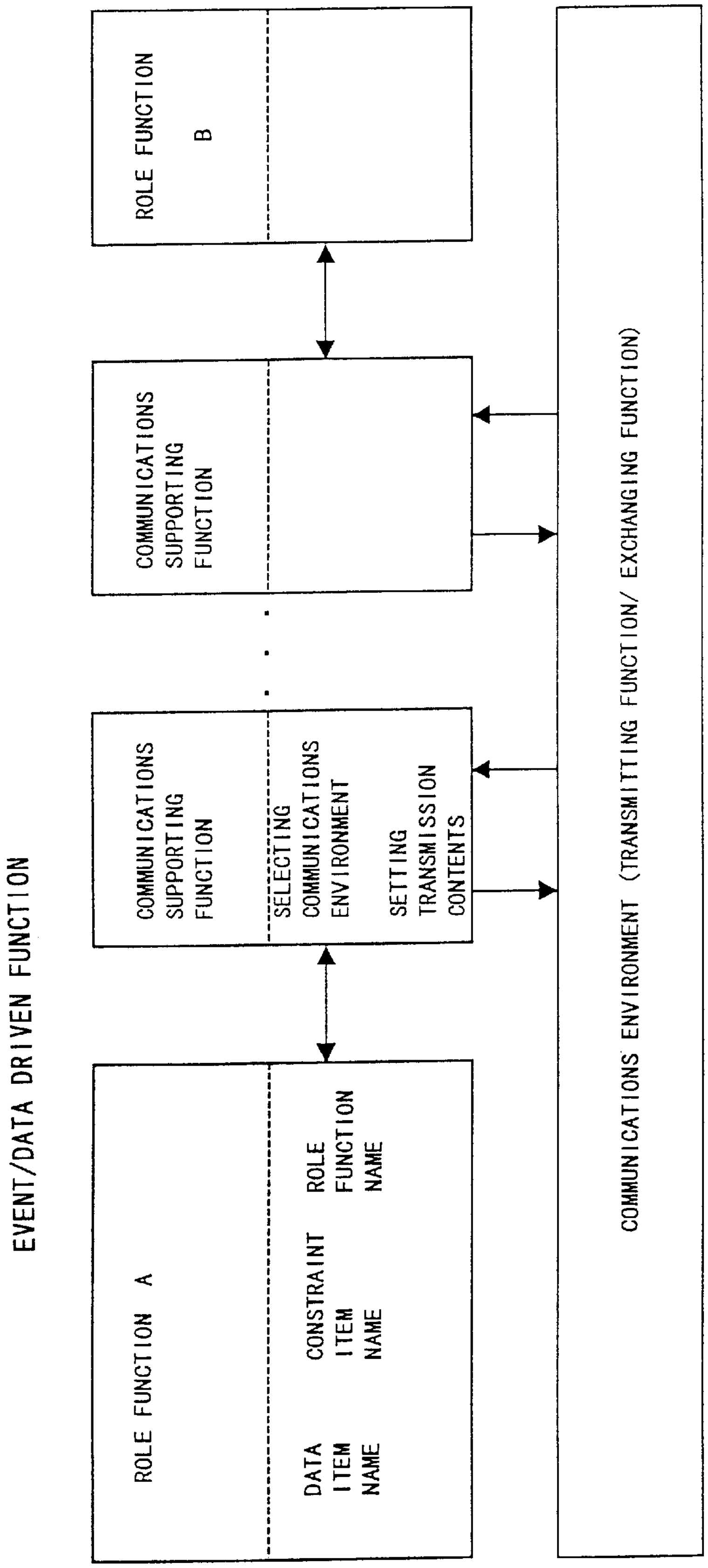
FIG. 22 shows the communications between defined roles.

FIG. 22 shows the communications between role functions. In FIG. 22, the role function A, the role function B, and a plurality of role functions not shown in FIG. 22 can communicate with each other through communications environment. A communications supporting function for supporting the communications is provided among the role function A, the role function B, and the communications environment. The communications among them are established through the interactive function based on the event driven and the data driven functions.

For example, the role function B is specified by the role function A as a partner role function. The information such as a data item name, a constraint item name, etc. are transmitted to the role function B through the communications supporting function, and the execution process of the role function is controlled. The communications supporting function is used to select communications environment, set transmission contents, etc. Among role functions, a partner role function can be optionally selected for communications.

Described above are the object network and the common platform, and the intention achievement information processing apparatus is described below.

An intention to be processed according to the present invention does not refer to a partial or a relatively small instruction such as to draw a point on the screen, to generate a point sequence, etc. as described above by referring to FIGS. 4A and 4B. It actually refers to a relatively large intention such as an intention of a user, that is, a driver, when he or she drives a semi-automatic car and tries to avoid a crash against a car running in the opposite direction as described above by referring to FIG. 20.

There can be three types of the intention, that is, a cooperative intention, a conflicting intention, and an independent intention. First, the cooperative intention refers to an intention normally indicated by two clients of two different systems, for example, drivers who drive their cars in a semi-automatic driving method and try to avoid a crash against each other.

Conflicting intentions refer to an intention of a bird flying in the sky to find, catch, and have a fish in the sea and an intention of the fish, against the intention of the bird, to swim away from the bird. Another example is a play between a gorilla and an owl. A gorilla plays a trick on, but does not hurt, an owl according to the movement of the owl, and achieves common learning while the owl also learns the method for flying away from the gorilla based on the mutual movements. They can be considered to have conflicting intentions. However, the strategy of the gorilla is not to capture or kill the owl. It only aims to stop its trick before it is too serious, and set the owl back in the original state. This can be realized by the supporting role function of the gorilla grasping that the reaction of the owl has reached the utmost level as characteristic constraints.

Unlike cooperative intentions and conflicting intentions, an independent intention refers to an intention of a person acting with a specific purpose regardless of other system users, for example, other people's intentions. The independent intention can be recognized in a person who is drawing a picture, generating animation by integrating multimedia information, etc.

It is natural that the intention of a person appearing in the animation is not limited to an independent intention, but can be a cooperative or conflicting intention. In this case, a process is performed through an object network such that, for example, a cooperative intention can be realized.

That is, when the animation is produced, an object network is defined based on the cooperative intention of a person appearing in the animation, and, for example, data is transmitted by driving data to an object to generate an image depending on the class of the object therein. As a result, it is possible to save the trouble of generating animation images one by one. To attain this, the intention achievement information processing apparatus can be used.

Figure 23:
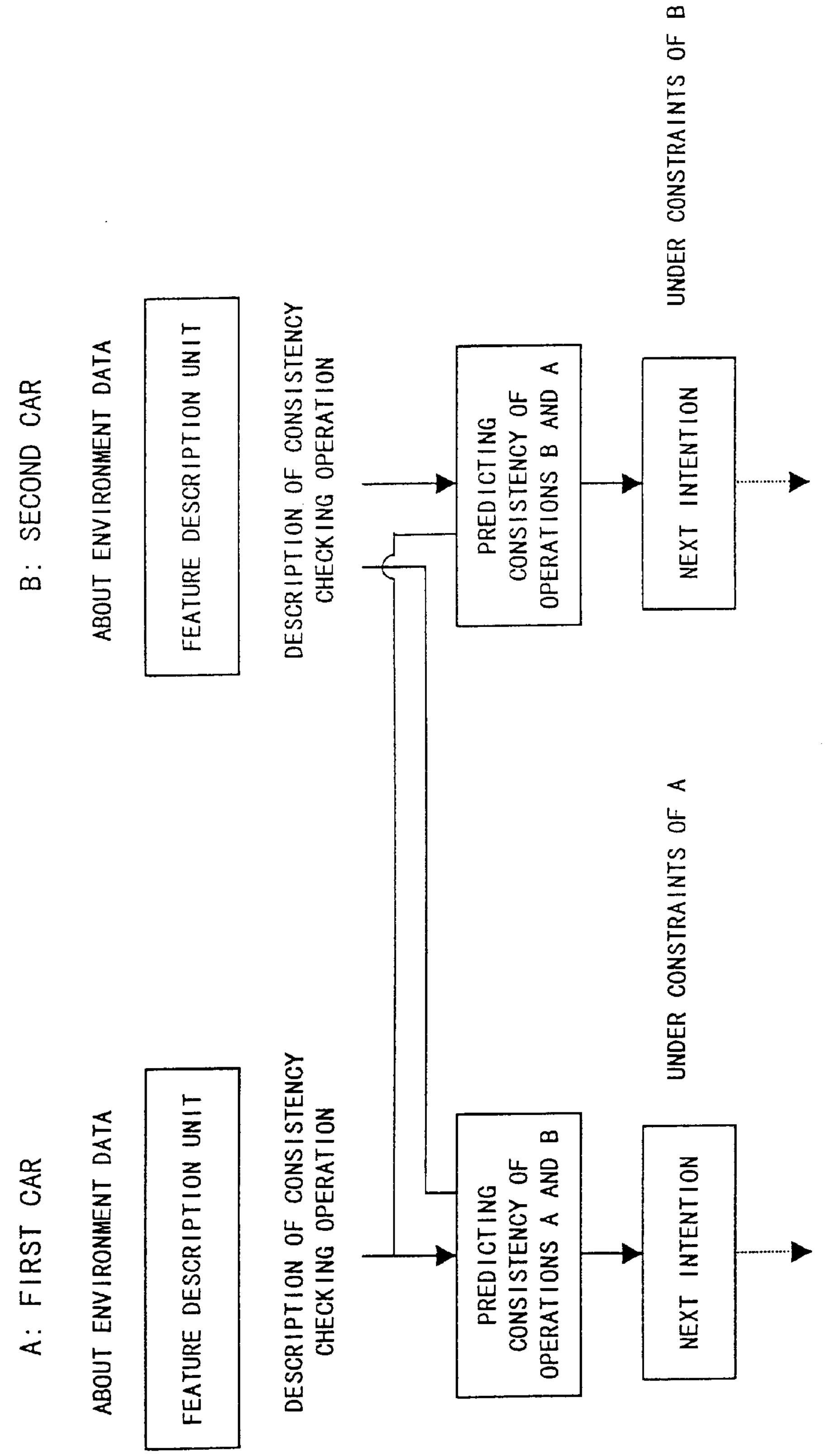
FIG. 23 shows the consistency predicting process for a cooperative intention.

FIG. 23 shows the consistency predicting process in which a user A driving a first car A and a user B driving a second car B have cooperative intentions to drive the cars in semi-automatic driving systems and try to avoid a crash against each other. In FIG. 23, the users A and B predict the operation of each other's car from the result of the characteristic description about the environment data, and take consistent actions as subsequent operations to avoid a crash defined by constraints.

Figure 24:
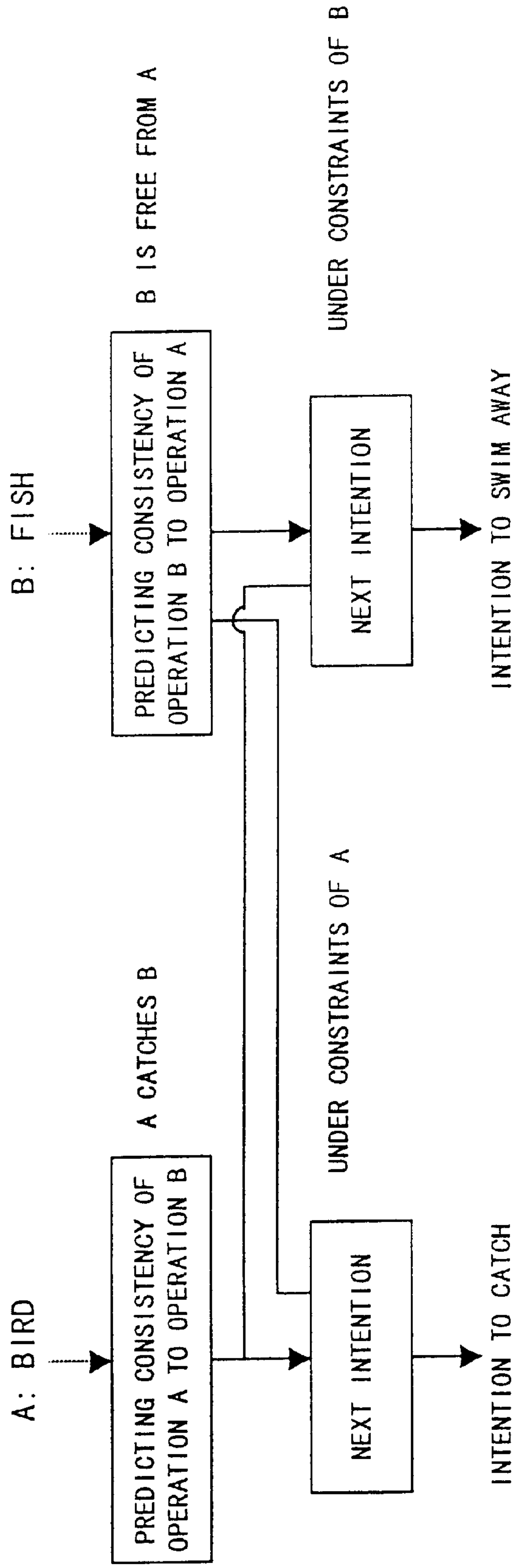
FIG. 24 shows the consistency/inconsistency predicting process for a conflicting intention.

FIG. 24 shows the consistency/inconsistency prediction with conflicting intentions of the above described bird and fish. In FIG. 24, the bird tries to catch the fish, and the fish tries to swim away from the bird. At this time, the bird predicts the swimming path of the fish while the fish predicts the approaching path of the bird, thereby taking an action to unfulfill each other's prediction. However, their subsequent actions are taken under the respective constraints, that is, the bird tries to catch the fish, and the fish tries to swim away from the bird.

Figure 25:
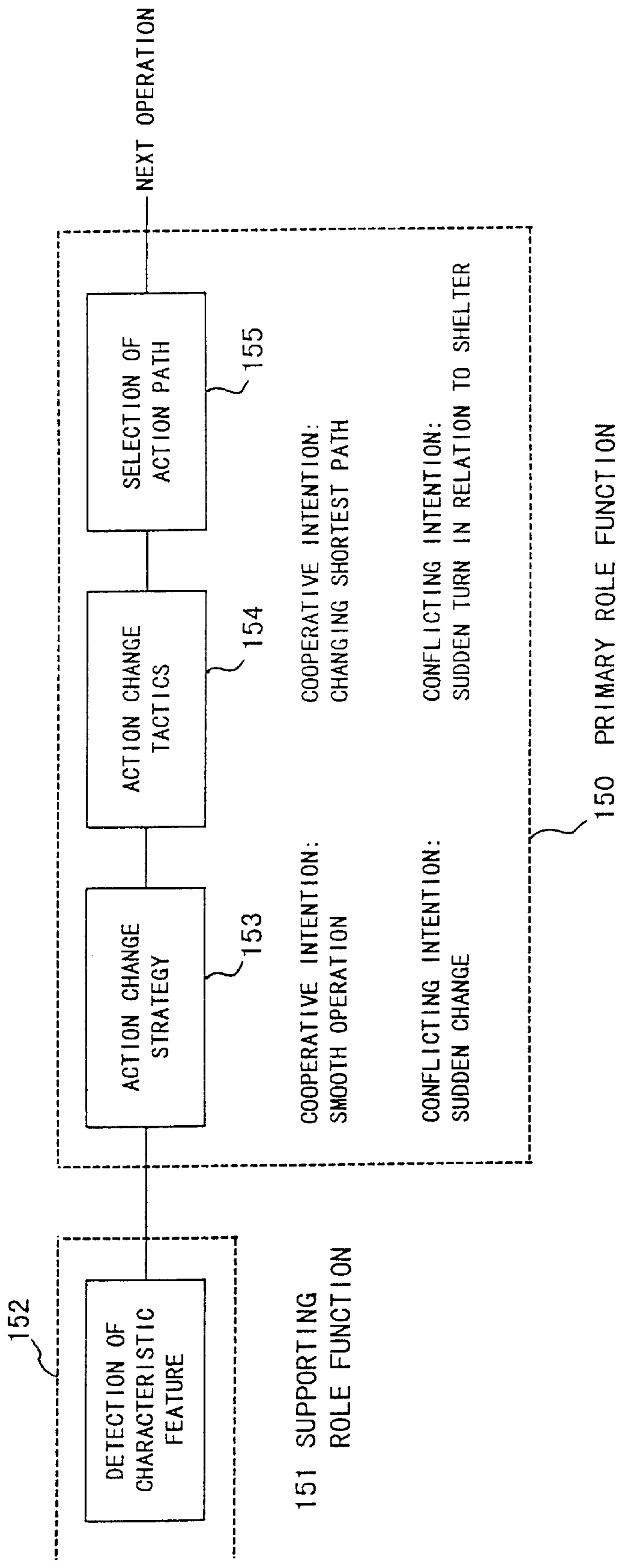
FIG. 25 shows a change of operations based on the strategy and tactics relating to cooperative intentions and conflicting intentions.

In the intention achievement information processing apparatus, it is extremely important to determine the strategy and tactics for the subsequent operations to be performed based on the detection result of the characteristic features of, for example, the conditions of the road, that is, the constraints in order to avoid a crash between two cars. FIG. 25 shows the change of an action which is determined as the next operation based on the strategy and tactics for the cooperative intentions of the above described two cars to avoid a crash, and the conflicting intentions of the bird and the fish.

In FIG. 25, the subsequent operations are determined by the strategy and tactics by a primary role function 150. The characteristic features of environment data, etc. are detected by a supporting role function 151 having a supporting role. First, the supporting role function 151 performs detection 152 of characteristic features, for example, the state of a road, the speed of the car to be regarded, etc. The detection result is transmitted to the primary role function 150. The primary role function 150 first determines an action change strategy 153. When cooperative intentions to avoid a crash between two cars are indicated, the action change strategy 153 tries to keep the smoothest possible operations in changing an action. In the case of conflicting intentions in which a bird tries to catch a fish, a sudden change of an action is adopted as a strategy to unfulfill the prediction of the opposite intention.

Then the primary role function 110 determines action change tactics 154. For cooperative intentions, the action change tactics 154 tries to minimize the change of a path to avoid, for example, a shock to passengers. For conflicting intentions, the action change tactics 154 tries to make a sudden change of an action relating to a shelter so that, for example, a fish can swim away behind the shelter such as a rock, etc. According to the above described strategies, selection 155 is made for an appropriate action path, thereby determining a subsequent operation.

Figure 26:
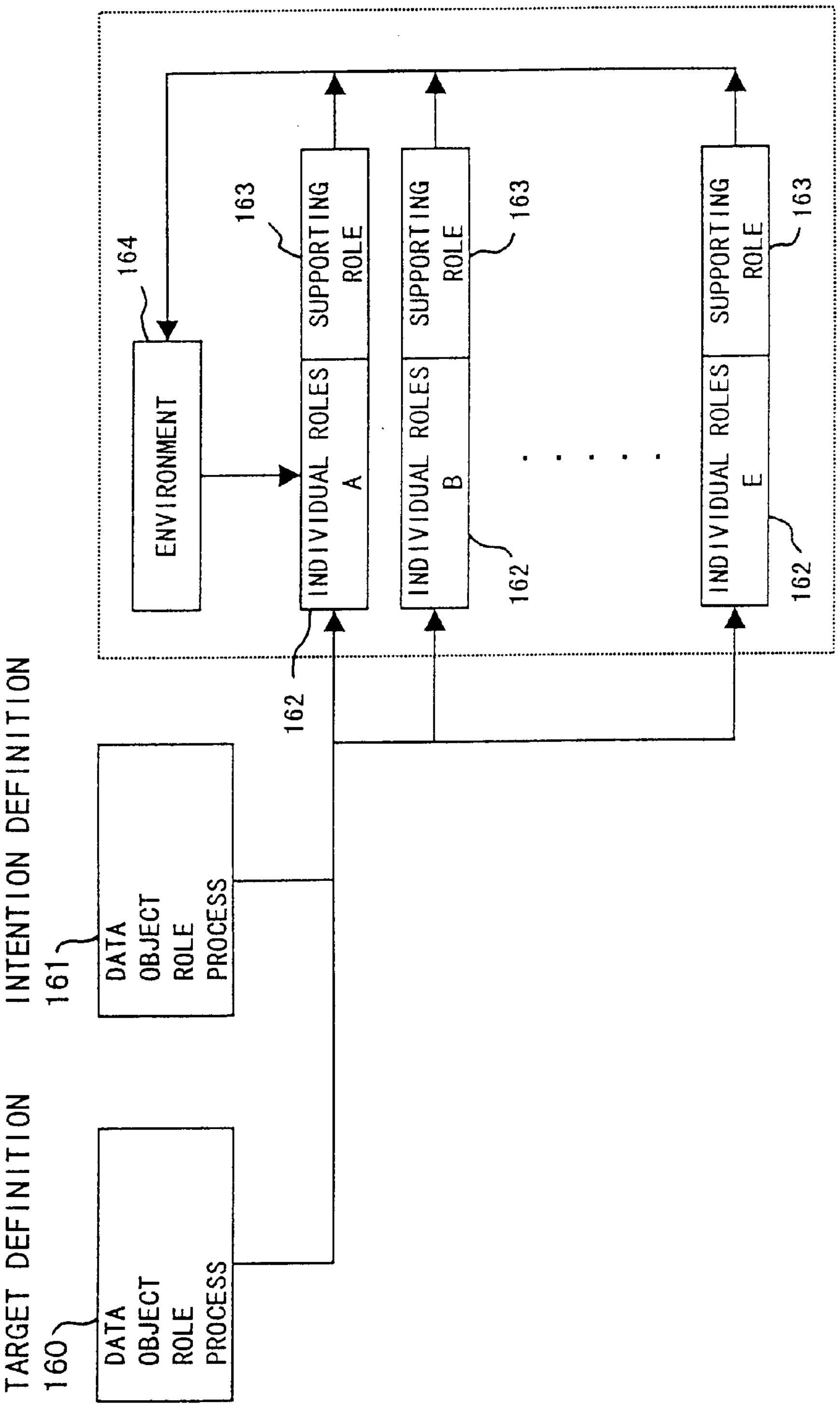
FIG. 26 is a block diagram showing the outline of the entire structure of the intention achievement information processing apparatus.

FIG. 26 is a block diagram showing the general structure of the intention achievement information processing apparatus. In FIG. 26, a target definition 160 and an intention definition 161 are first defined. The target definition 160 can be, for example, two bicycles running in the opposite directions. The contents of the intention definition 161 are to drive the bicycles in the semi-automatic method and to avoid a crash against each other. Each definition can be defined using a data model in a format of the above described template, etc.; an object model as a noun object, a verb object, and an object network; a role model as a group of a plurality of object networks as described by referring to FIG. 17; and a process model indicating a number of integrated roles.

According to the contents of the target definition 160 and the intention definition 161, a process is performed to realize an intention by a plurality of individual roles 162 and supporting roles 163 for supporting respective individual roles. Each of the supporting roles 163 detects characteristic features by, for example, observing an environment 164, and provides the detection result as constraints to the individual roles 162.

FIG. 27 shows the definition process of an intention. The definition process is described later in relation to the structure of an object network. The definition process is generally explained here. In the first step of the definition process, the attribute structure is defined for the name of a target area and the target area itself. In the example of the above described two cars, the target area is a two-way road. The attribute structure of a target area can be a priority road, a one-path road, two-path road, etc. By defining the target area, a generic intention corresponding to a generic object network can be converted into a concrete intention corresponding to a specific object network.

In the second step, in relation to an intention, the characteristic structure of an intention (independent intention, cooperative intention, or conflicting intention), the operable structure of an intention, for example, the operable range of a brake and handle for prevention of a crash, and prevention of a crash as the purpose (objective function) of an intention are defined. In this step, a template for an operable structure is set as a definition preparation process for support.

In the third step, the specification of a partially-recognizing function for extracting the characteristic of the environment data of a target, for example, the environment data as to whether or not there is a curve in the road, etc. is defined as the definition of a supporting structure to achieve an intention.

In the fourth step, a strategy is defined. A strategy is a generic name of the operations for achieving an intention. The constraints for an environment and physical operations are defined. Furthermore, the operations for attaining a goal, the priority constraints, etc. are defined.

In the final step, tactics are defined. Tactics are obtained by concretely representing the generic operations as a strategy. Generic representation can be converted into specific representation by receiving an operation instruction from a user through the data driven function. As described above, in the definition of a two-way road, the hierarchical relationship is defined according to the table shown in FIG. 27 which starts with the definition of a target area.

Figure 28:
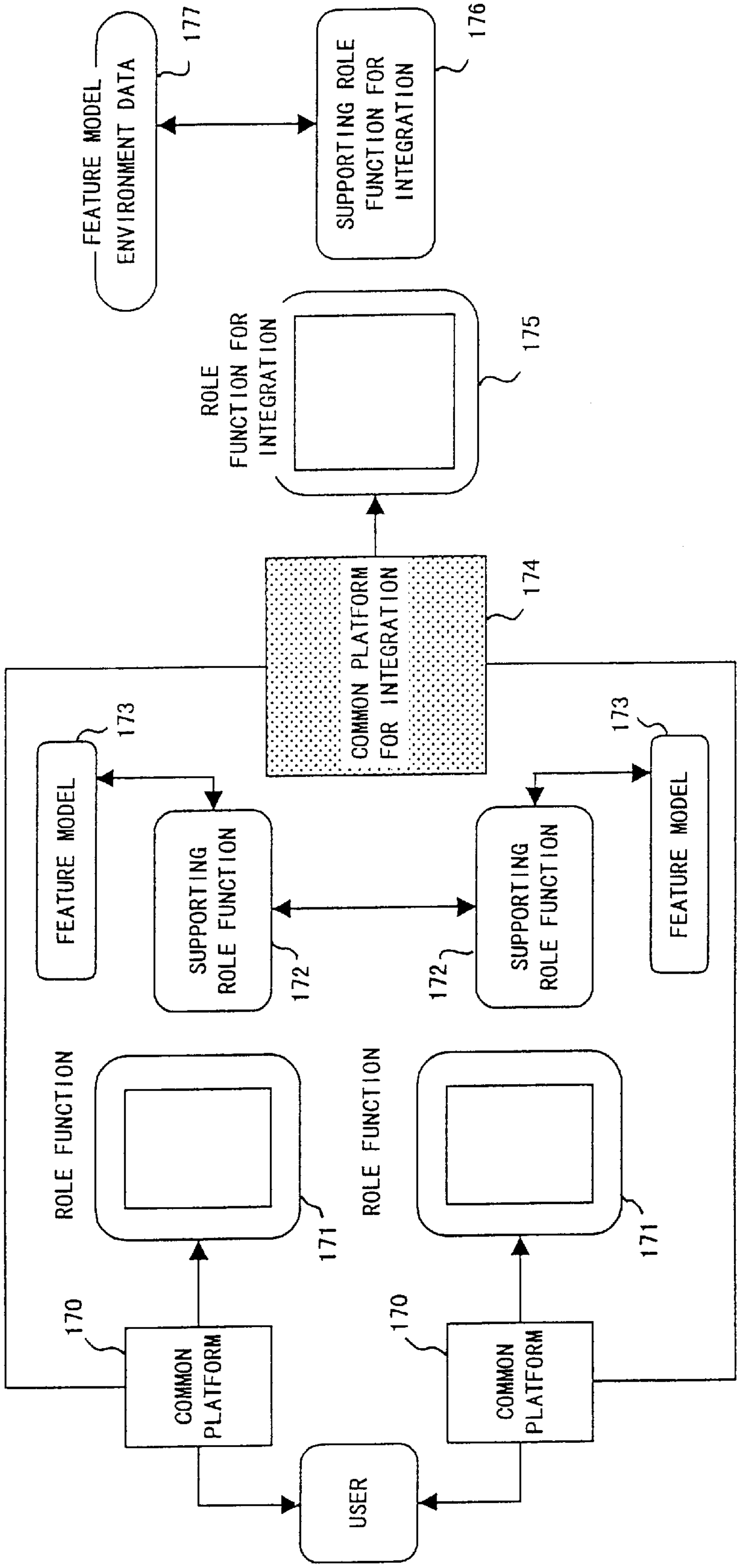
FIG. 28 shows the achievement of a cooperative intention by integrating roles in a cooperative process.

FIG. 28 shows the achievement of a cooperative intention by the integration of roles for performing a cooperative process. In FIG. 28, it is assumed that the above described cooperative process is performed to avoid a crash of cars against each other. Each of two cars has corresponding common platforms 170, and primary role functions 171. The primary role functions 171 operate using environment data as a feature model 173 obtained by a supporting role function 172, and the operation results are integrated by a common platform 174 for integration and a role function 175 for integration. In the integrating process, feature model environment data 177 is used by a supporting role function 176 for integration.

Figure 29:
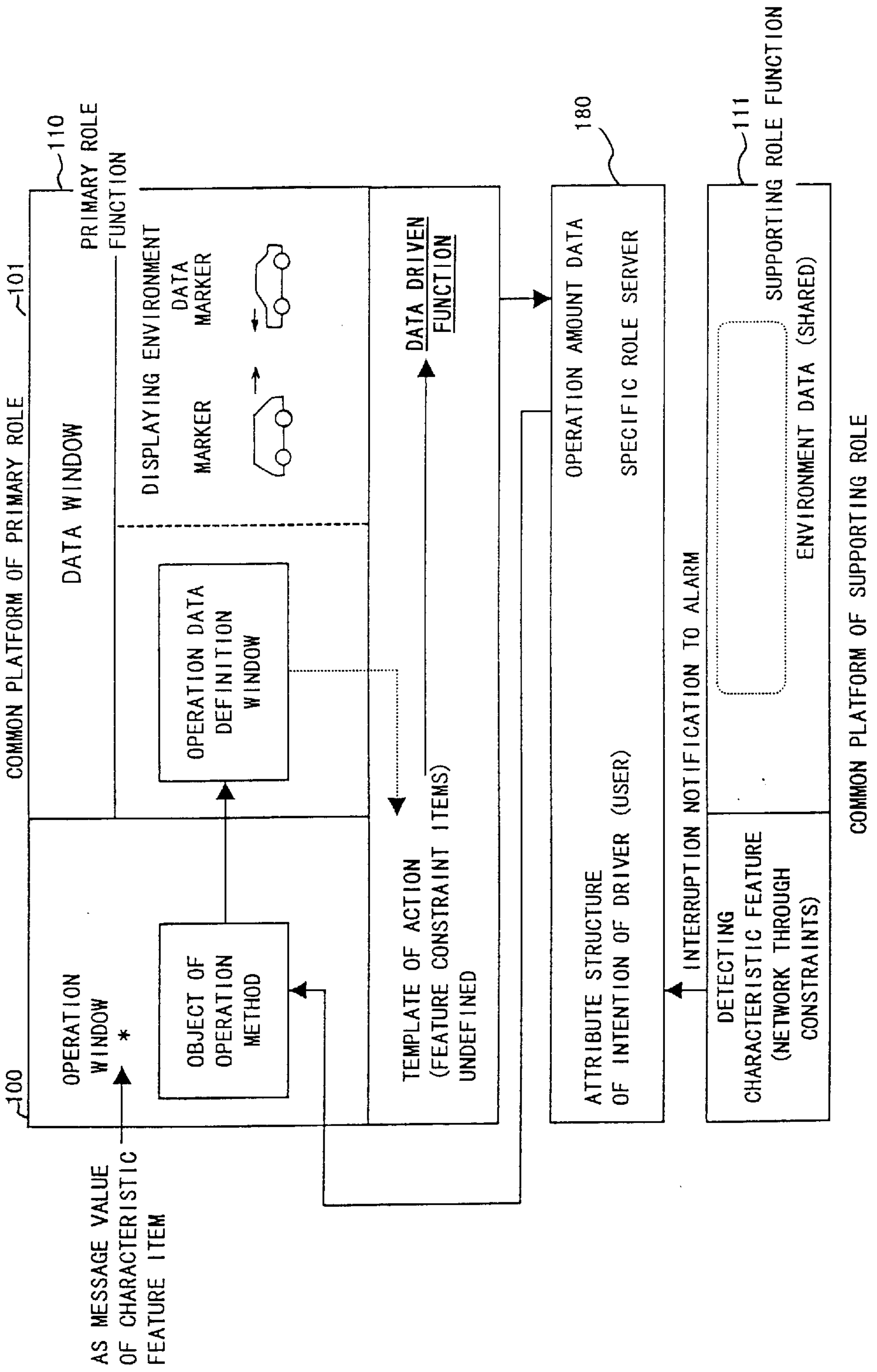
FIG. 29 shows the process of driving data to achieve an intention.

FIG. 29 shows a process performed through the data driven function to achieve an intention. In FIG. 29, there is, for example, a specific role server 180 provided for functioning as a user role in addition to the primary role function 110 and the supporting role function 111 as shown in FIG. 20. The operation amount data as data driven function, that is, the operation amount data of a brake and a handle corresponding to an operable structure described by referring to FIG. 27, is requested from the primary role function 110 corresponding to an agent role server to the specific role server 180. Then, the operation amount data is provided to the primary role function 110 corresponding to the attribute structure of the intention of a driver.

Figure 30:
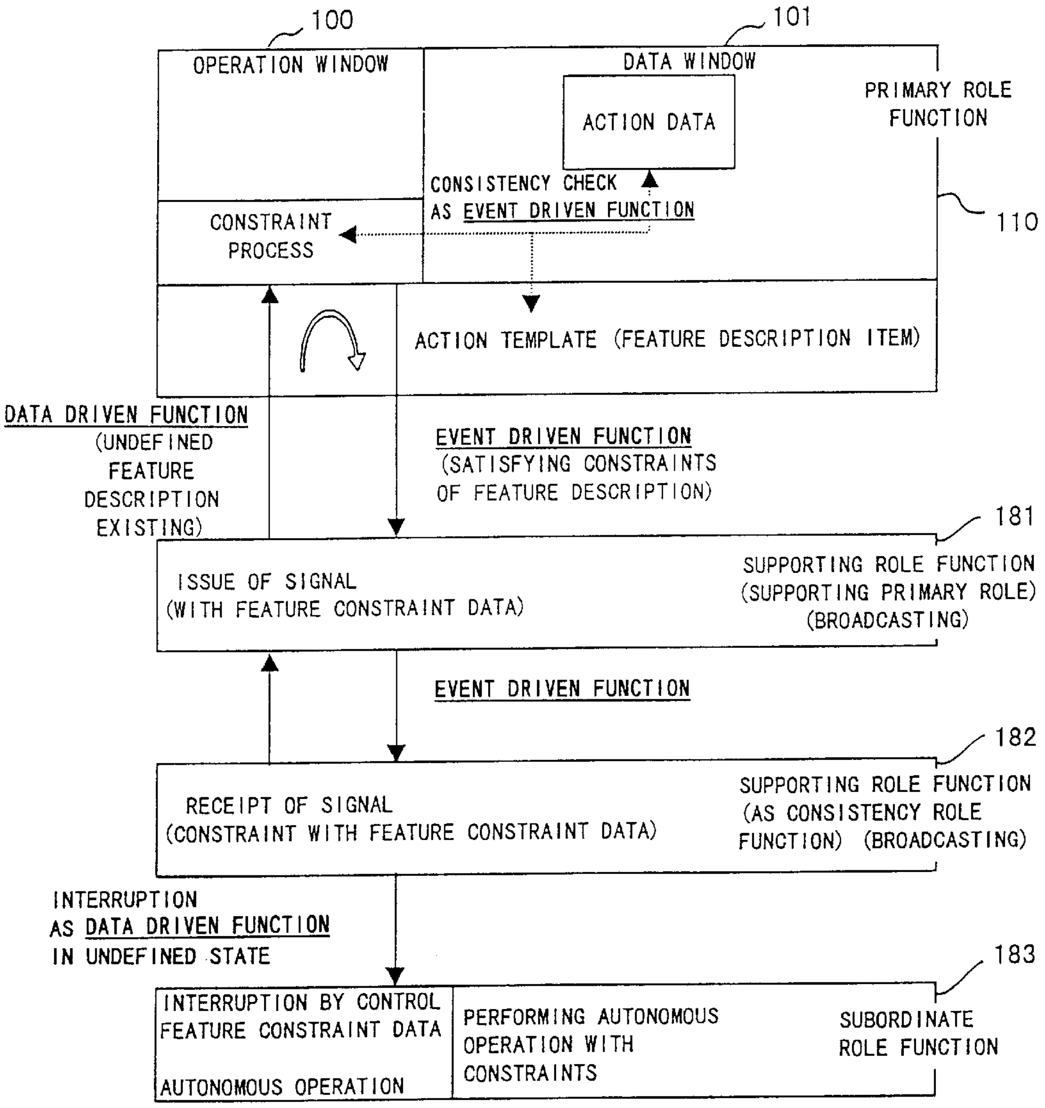
FIG. 30 shows the hierarchical structure while driving an event in a cooperative process performed by a broadcasting function.

FIG. 30 shows the hierarchical structure for the event driven function in the cooperative process performed by the broadcasting function. In FIG. 30, a supporting role function 181 broadcasts information for supporting the primary role function 110, and a supporting role function 182 receives the broadcast and controls the function of a subordinate role function 183. The event driven function from the primary role function 110 to the supporting role function 181, and the event driven function from the supporting role function 181 to the supporting role function 182 form a hierarchical structure.

Figure 31:
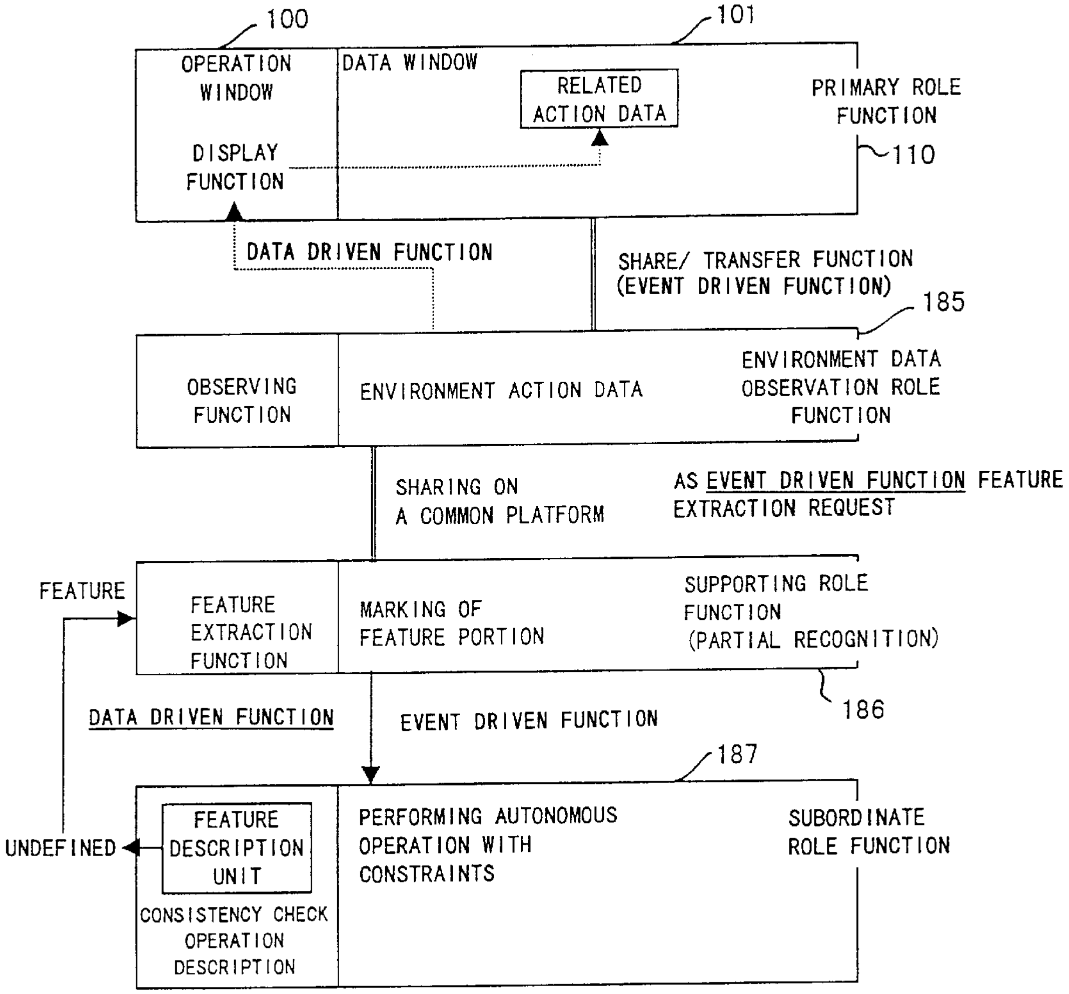
FIG. 31 shows a cooperative process performed by an environment data partially-recognizing function.

FIG. 31 shows the cooperative process by the partially-recognizing function of environment data. In FIG. 31, the entire environment data is observed by an environment data observation role function 185. Furthermore, a supporting role function 186 is provided to recognize a partial movement, etc. so that the environment data can be partially recognized. The supporting role function 186 performs event driven function, etc. for a subordinate role function 187 as necessary.

The operation network for achieving an intention, and the connections between servers, etc. are furthermore explained below by referring to an example of avoiding a crash between the above described two cars. FIG. 32 shows the entire configuration of a generic object network for determining the strategy and tactics for finally achieving an intention.

In FIG. 32, the process start with a state NONE 200 in which the user has no intention at all. Then, a target of the interest of the user, that is, a domain 201, is specified as a target area. In this case, since a concrete target area is not defined, a list of target areas which can be provided by the system is displayed on the common platform in the data driven function format, and an attribute structure for the user-selected target area, that is, a structured domain 202 is defined. The definition of the attribute structure is planned and performed by the agent expert 85 described by referring to FIG. 16. When a two-way road is selected as the domain 201, for example, two cars are defined as the attributes of the structured domain 202.

When the user defines an intention class 203 in the operation window as event driven function, the system inquires whether an intention is an independent intention, a cooperative intention, or a conflicting intention as data driven function. The user selects one of them in the data window. In this example, a cooperative intention is selected.

From the intention class 203 and the structured domain 202, the user determines the operable ranges of the above described accelerator, brake, handle, etc. as the contents of the operable structure in response to an intention, that is, an operation for intention 204, in the method of supplementing data not defined in the template. Then, an intention to cooperatively avoid a crash is defined as a goal intention 205. However, a concrete object is to represent the intention as the passage of two cars in the opposite directions with the minimum allowable space, and display the contents in the message window as a message from the system.

To achieve an intention, environment data is required as described above. That is, it is necessary to have a role of extracting the feature amount from the environment data and supporting the definition of the amount of operations. The supporting role function applicable to a target area is selected by the user as a supporting function 206. For example, in the case of a two-way road, the function can refer to a motor road map by the GPS, a car driving direction prediction system as a camera system, etc. Then, a supporting role function of displaying on the GPS in vector an enlarged map of roads and the driving data of the car to pass by is selected. A supporting structure for achieving an intention, and the specification of a recognizing function are also defined. Furthermore, data is substituted for the driving features of two cars not defined on the template structure in the data driven function by a selected feature 207.

The operation for intention 204 defines the amount of controllable operations with constraints, and the operation level of a handle is added, based on the driving speed of the cars, as one of the constraints for a two-way road. Then, strategy and tactics 208 are determined by entering data from the goal intention 205, operation for intention 204, the supporting function (map data) 206, and selected feature 207. The strategy and tactics are described by referring to FIG. 33.

Figure 33:
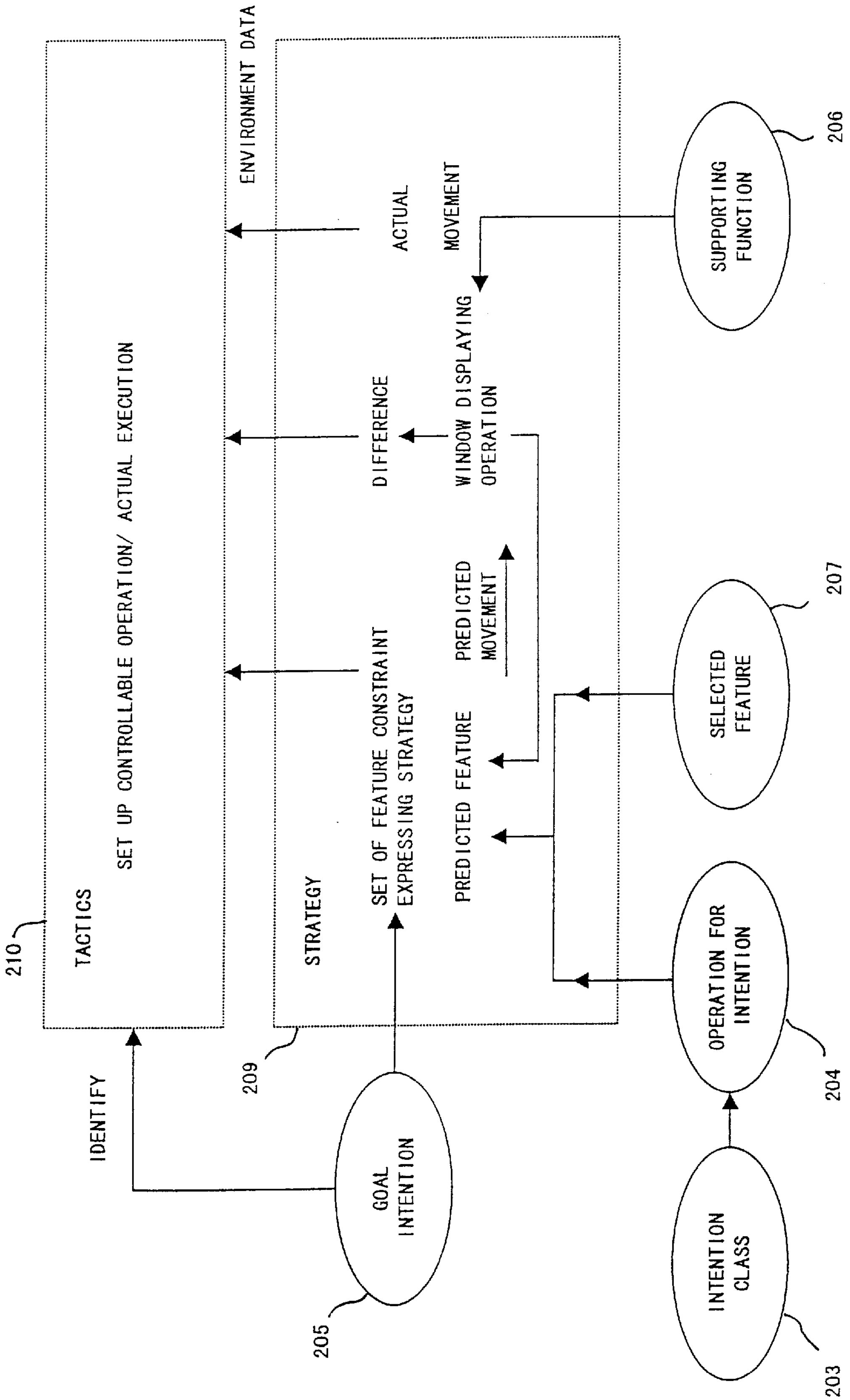
FIG. 33 shows a generic object network for strategy and tactics.

FIG. 33 shows the generic object network about the strategy and tactics. In FIG. 33, the constraints of an environment and physical operations and the constraints of priority are a set of feature constraint expressing strategy 209. The strategy is defined to perform a smooth operation with a good cooperative relationship between two parties to attain a goal, and with less constraints data to allow the operation of one party to be easily predicted by the other party.

In FIG. 33, the predicted operation data as predicted features based on the operation for intention 204, the selected feature 207, etc. is compared with the actual operation data displayed in the data window. The difference, the goal intention 205, etc. are used to determine tactics 210. The tactics 210 determine the amount of concretely controllable operations using the set of feature constraint expressing strategy 209, the environment data, the difference between predicted operations and actual operations, and determine a concrete executable process to achieve an intention.

Figure 34:
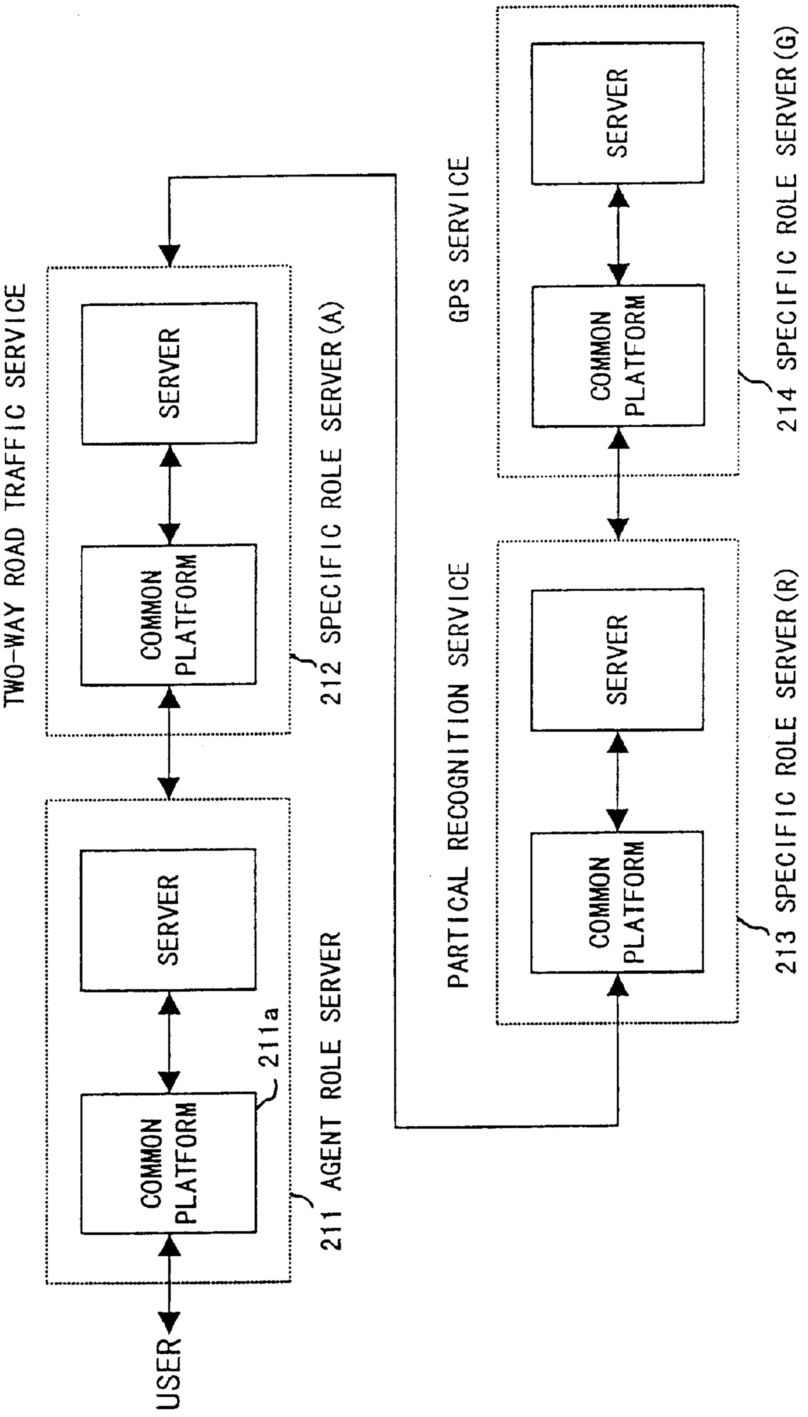
FIG. 34 shows the structure for connecting servers for achieving an intention.

FIG. 34 shows the connections among servers for achieving an intention. In FIG. 34, an agent role server 211, a specific role server (A) 212 for realizing a two-way road traffic service, a specific role server (R) 213 for realizing a partial recognition service, and a specific role server (G) 214 for performing a GPS service are connected.

On a common platform 211*a* of the agent role server 211, a generic object network defined by an agent expert is displayed. This network is represented as a graph using a generic noun object and a generic verb object. To convert the network into a concrete specific object network, it is necessary to concrete the parameter of the changeable portion represented as generic, and the user is requested to convert a generic name to a concrete name. As a result, for example, a two-way road is selected as a target area for two cars.

The agent role server 211 selects the specific role server (A) 212 capable of realizing a two-way road traffic service from a database, and connects it to the agent role server 211. Then, the specific role server (A) 212 sets a template corresponding to the operation amount data in response to a user's specification of an operation from the intention class 203 to the operation for intention 204.

Similarly, when the supporting function 206 is identified on the common platform 211*a* of the agent role server 211, a list of selectable items is displayed on the common platform 211*a*. If the GPS service is selected by the user, then the function of the GPS or a simulator is referred to, and the specific role server (R) 213, to which the specific role server (G) 214 for performing the function for the GPS service is connected, is connected to the specific role server (A) 212.

Then, the partially-recognizing function for the feature constraint amount is realized by the specific role server (R) 213 through the identification by the selected feature 207. That is, the specific role server (A) 212 specifies the necessity of the function of the specific role server (R) 213, and the specific role server (G) 214 is regulated as the supporting role function satisfying the specification. For example, a person can be specified as an appropriate visually-recognizing function.

As described above, to concrete a generic strategy and tactics for an intention achieving process, an expert determines or a learning function of an intention executing user stores experiences. If an expert determines, a method and a structure are determined in a top-down method. If a learning function stores experiences, they are determined in a bottom-up method.

Figure 35:
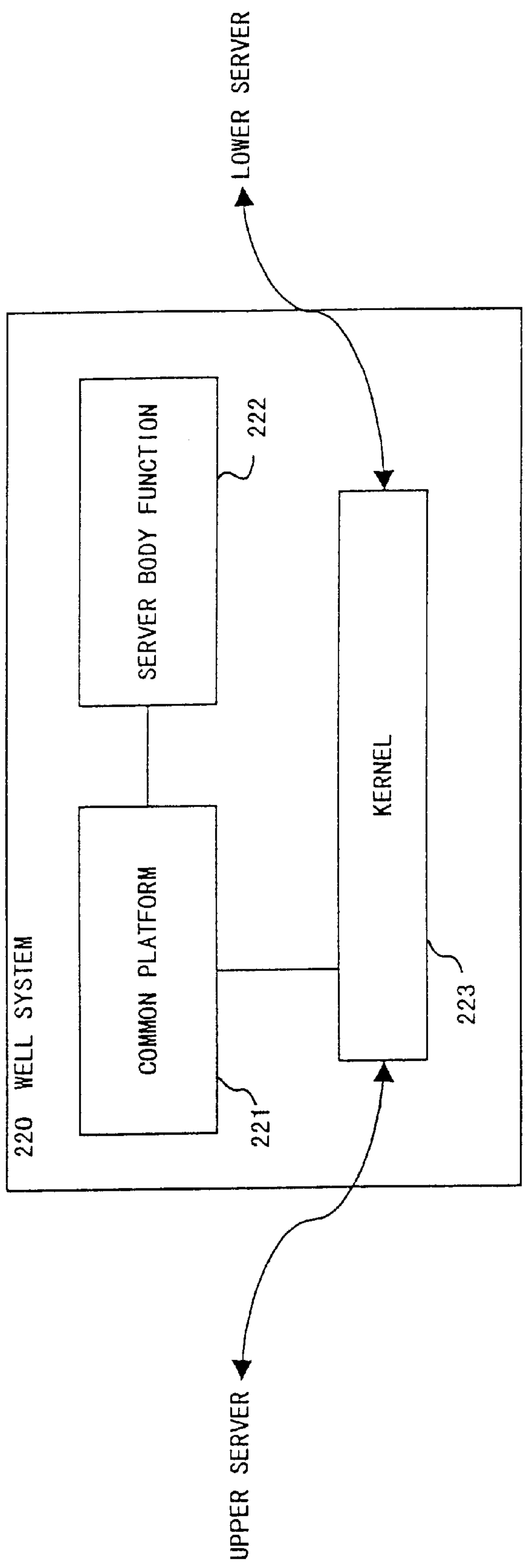
FIG. 35 shows the communications system between servers shown in FIG. 34.

FIG. 35 is a block diagram showing the configuration of the agent role server 211 or the three specific role servers 212 through 214 shown in FIG. 34. Each server is designed as a WELL system 220, and comprises a common platform 221, a server body function 222, and a kernel 223. If the kernel 223 is, for example, the agent role server 211 connected to both sides of the present server, then the communications with the user and with the specific role server (A) 212 are controlled. In the communications, only the data in the format defined by the common platform 221 is used. For example, with the user, the communications are established in the above described user-friendly data format. With the specific role server (A) 212, the data format appropriate for the communications between servers is used.

The cooperative intention achieving process relating to the above described two cars on a two-way road is described below relating to the object network shown in FIG. 32 by indicating the display state of the common platform.

Figure 36:
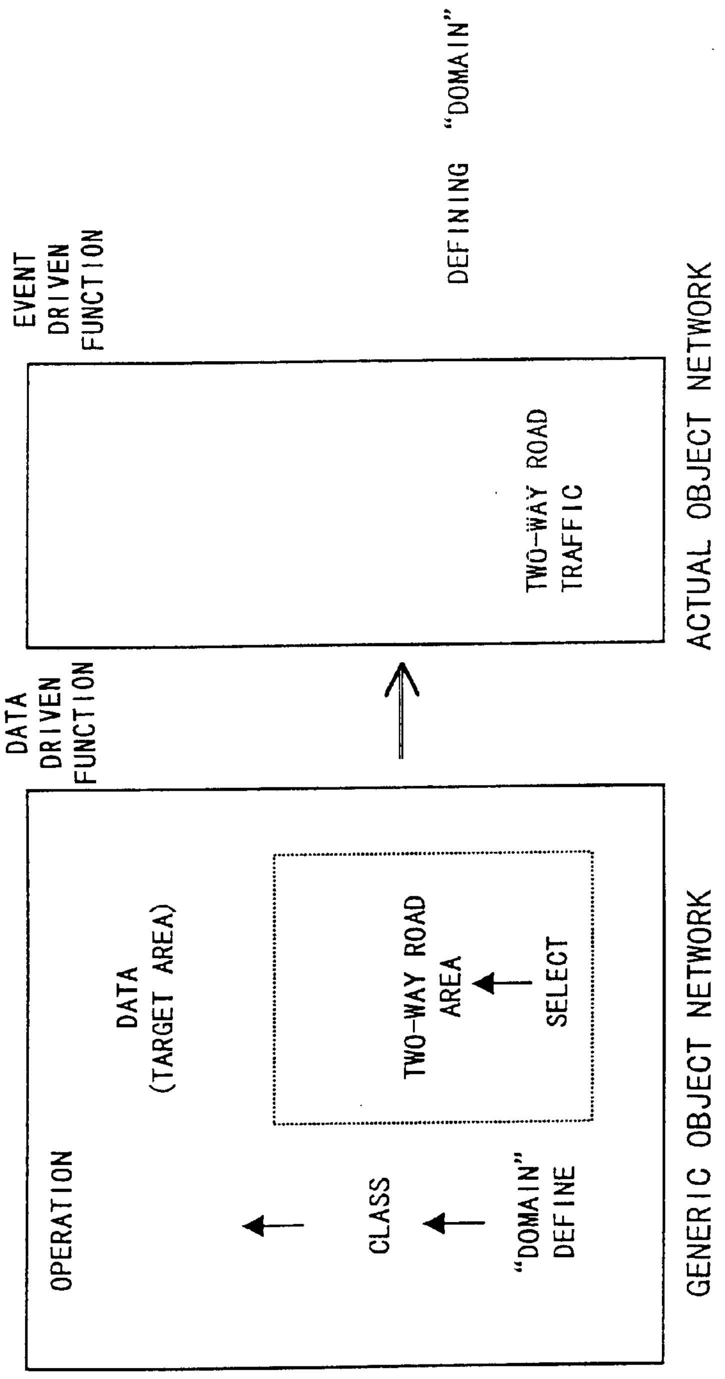
FIG. 36 shows the chart (1) showing the display on the common platform in the interactive process performed by an agent role server.

In FIG. 36, the client (user) specifies the domain 201 to the object network displayed on the common platform. The agent role server 211 shown in FIG. 34 displays a serviceable target area on the common platform. Thus, the interaction between the user and the agent role server 211 starts, and the agent role server 211 requests the client to specify the name of a concrete target area as data driven function. The client specifies the two-way road, and the noun object on the specific object network corresponding to the noun object 'domain' on the generic object network is specified as the 'two-way road'. Thus, a more concrete special object network for an intention achieving process can be obtained by specifying the detailed generic object network. In FIG. 36, the display state of the generic object network on the left in FIG. 36 can be obtained as a result of an instruction issued as event driven function to define a domain from the client to the agent role server 211.

Figure 37:
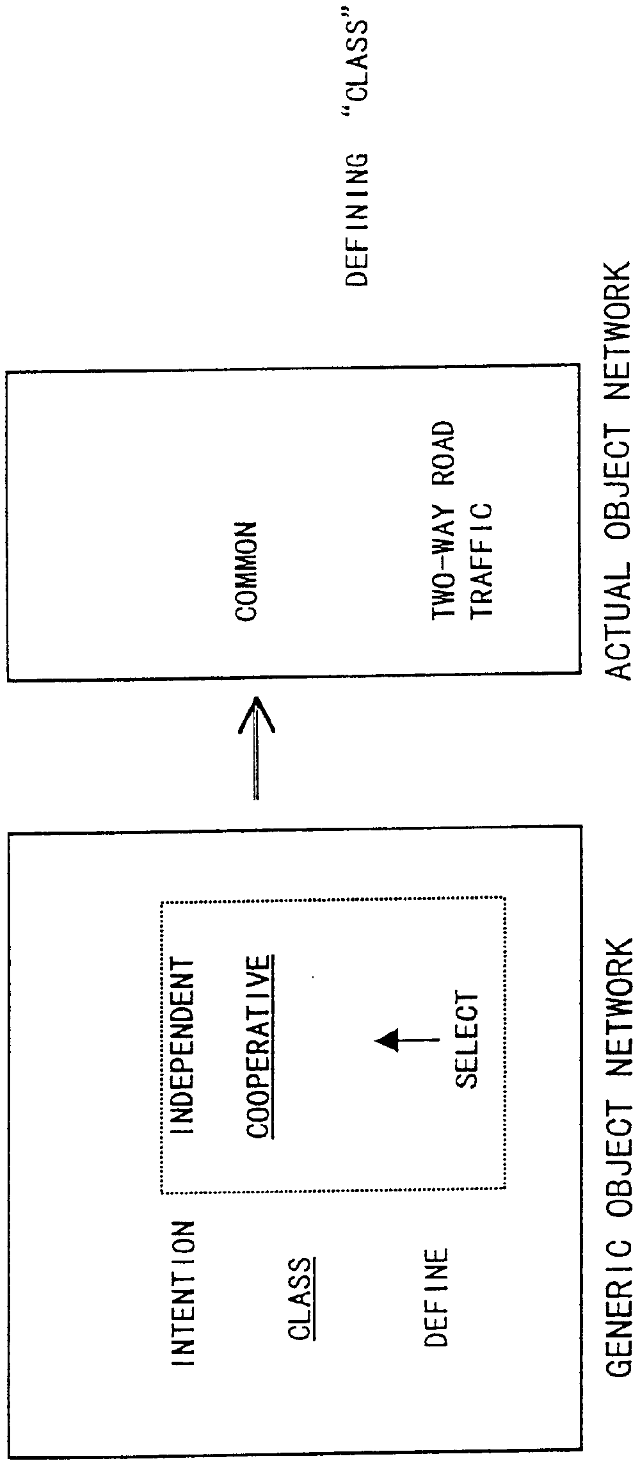
FIG. 37 shows the chart (2) showing the display on the common platform in the interactive process performed by an agent role server.

FIG. 37 shows a result of displaying the intention class 203 shown in FIG. 32 on the common platform, and instructing 'cooperative', that is, a 'cooperative intention' by a client in response to the data driven function from the agent role server 211. This display state can also be obtained as a result of returning an instruction to define a class from the client to the agent role server 211 as the event driven function.

Figure 38:
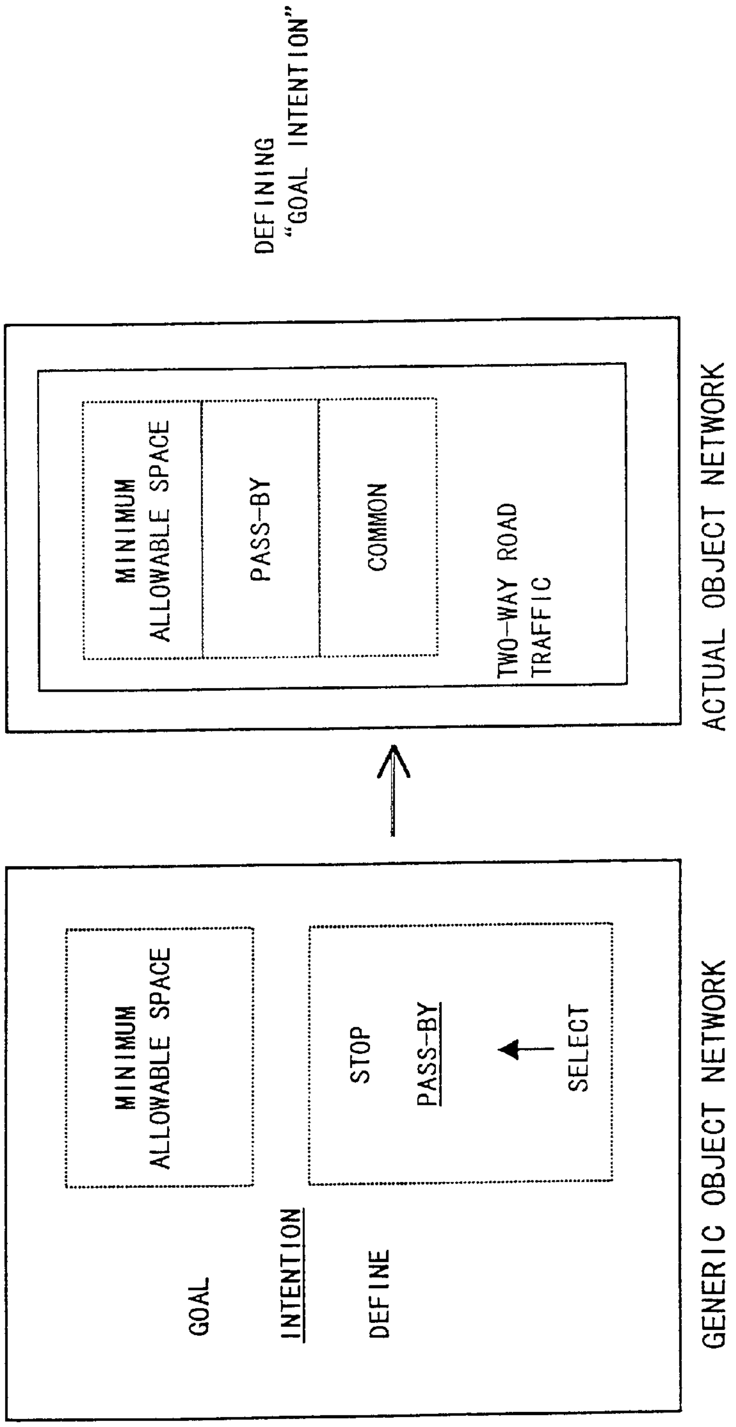
FIG. 38 shows the chart (3) showing the display on the common platform in the interactive process performed by an agent role server.

FIG. 38 shows the state of displaying the goal intention 205. In detail, FIG. 38 shows the definition of a goal intention 'passing by' selected by the client from 'stop' and 'passing by' in response to the data driven function after the noun object of the 'goal intention' is displayed by the instruction, that is the event driven function, from the client to define the goal intention 205. Thus, for example, the strategy and tactics for allowing the two cars to pass by each other with a distance equal to or longer than 1 m is determined.

Similarly, when the structured domain 202 shown in FIG. 32 is identified, the width of a road and a crossing are specified as the road structure of a scene of a two-way road, and the concrete road state, etc. to be regarded is detailed.

In FIG. 38, the client can select 'stop' in response to the data driven function for the goal intention. This relates to whether or not the client is confident in his or her driving technic. When the client is not confident, the 'stop' can be selected instead of the 'passing by'. In relation to the confidence in driving technic, the priority order can be preliminarily entered to allow the client to select the 'stop' in relation to the environment data. Furthermore, the stop can be selected as an absolute priority regardless of other conditions. This can be realized in the format of priority constraint on strategy.

Figure 39:
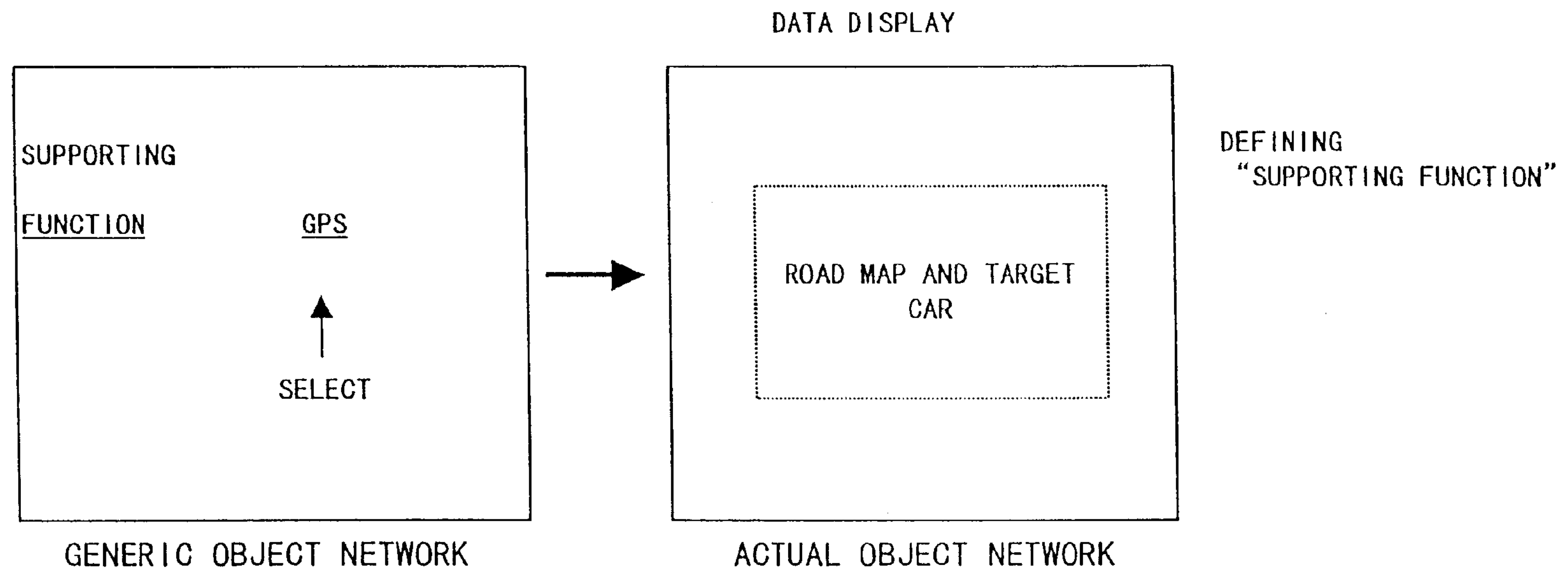
FIG. 39 shows the display result about environment data.

FIG. 39 shows the display state of the common platform when the event driven function is issued from the client as an instruction to define the supporting function 206 on the common platform. In the display state of the supporting function, a method of obtaining data necessary to get environment data about the two-way road is defined. In FIG. 39, a car is displayed as a target of cooperative intentions together with a road map by selecting the GPS by the client. That is, the current specific object network is displayed on the operation window, and the road map and the target car are displayed as the related data on the data window.

As shown in FIGS. 36 through 39, a specific object network can be generated and necessary data can be obtained by concretely and sequentially defining a generic object network. As shown in FIG. 33, the executing process is assigned to a new role function of performing the operations of the generic object networks having the names 'strategy 209' and 'tactics 210' by inputting the goal intention 205, the operation for intention 204, the selected feature 207, and the supporting function 206.

Figure 40:
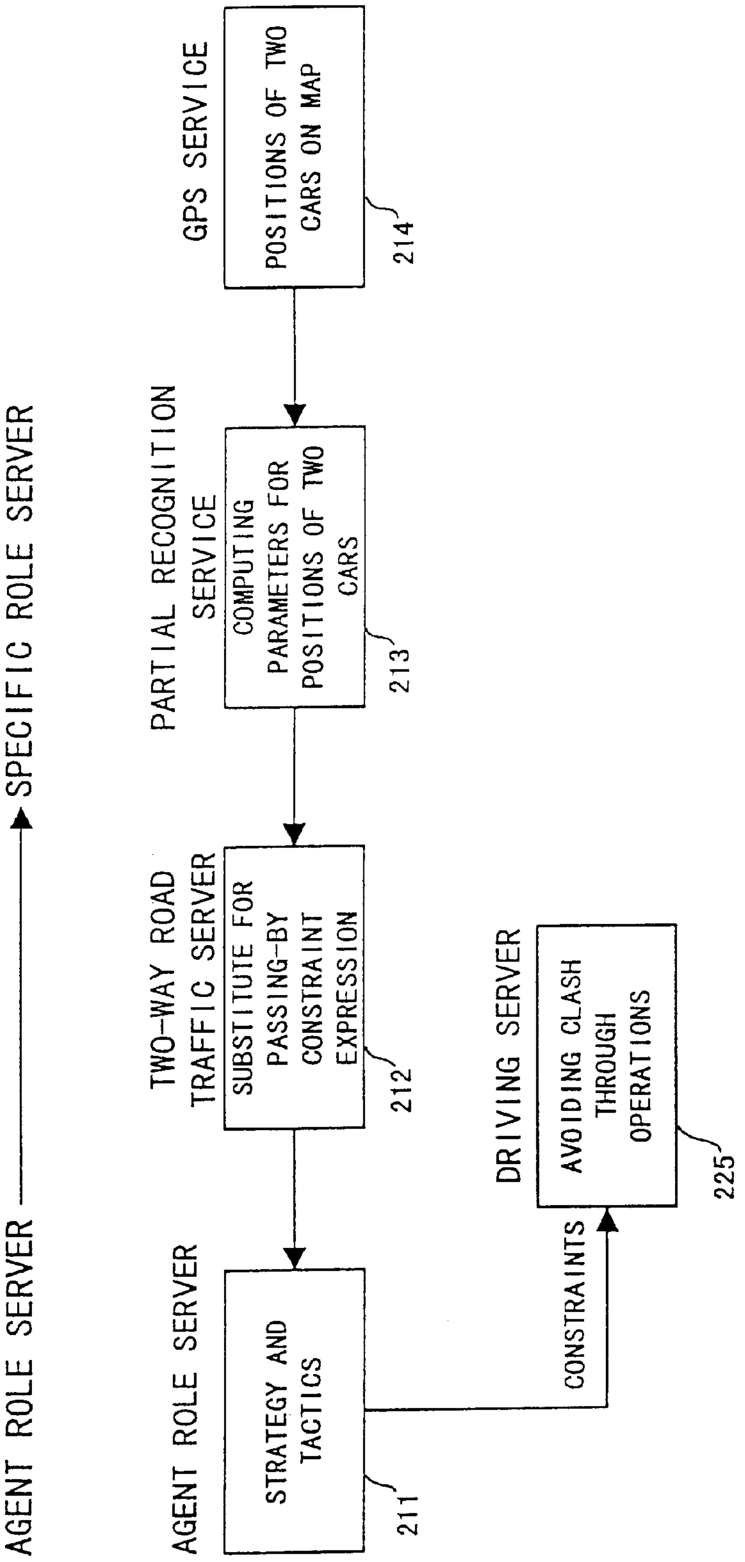
FIG. 40 shows the flow of data in the process of realizing two cars passing each other in the opposite directions.

FIG. 40 shows the flow of data of the operations of the two cars passing by each other by referring to FIG. 34. As described above, the agent role server 211 determines the strategy and tactics for avoiding a crash of two cars as shown in FIG. 34. To attain this, the specific role server (G) 214 for performing the GPS service provides a map and the position of two cars to the specific role server (R) 213 for performing a partial recognition service. The specific role server (R) 213 computes various parameters for realizing the passing-by operation from the result of extracting the positions of the two cars, and provides the result to the specific role server (A) 212 for realizing the two-way road traffic service.

The specific role server (A) 212 substitutes received various parameters for a constraint expression for realizing two cars passing by each other, and provides the result to the agent role server 211. The agent role server 211 determines the strategy and tactics based on the result, and for example, provides tactics including constraints such as a distance equal to or longer than 1 m, etc. to a driving server 225 for automatically driving a car. The driving server 225 avoids a crash by driving a car based on the tactics. For example, when a semi-automatic drive is performed, no driving server 225 exists, the tactics are provided for the client (user), and the client appropriately performs an operation, thereby avoiding a crash.

In FIG. 40, for example, the specific role server (G) 214 for realizing the GPS service provides as data the positions of two cars and a map to the specific role server (R) 213 for realizing a partial recognition service. For example, the data is updated for each sampling interval, and the tactics finally determined by the agent role server 211 are updated from time to time.

In the above described embodiment, two cars pass by each other based on one system. It is also possible to provide the two cars with respective intention achievement information processing apparatuses to perform concurrent operations for achieving cooperative intentions by each information processing apparatus to avoid a crash.

Figure 41:
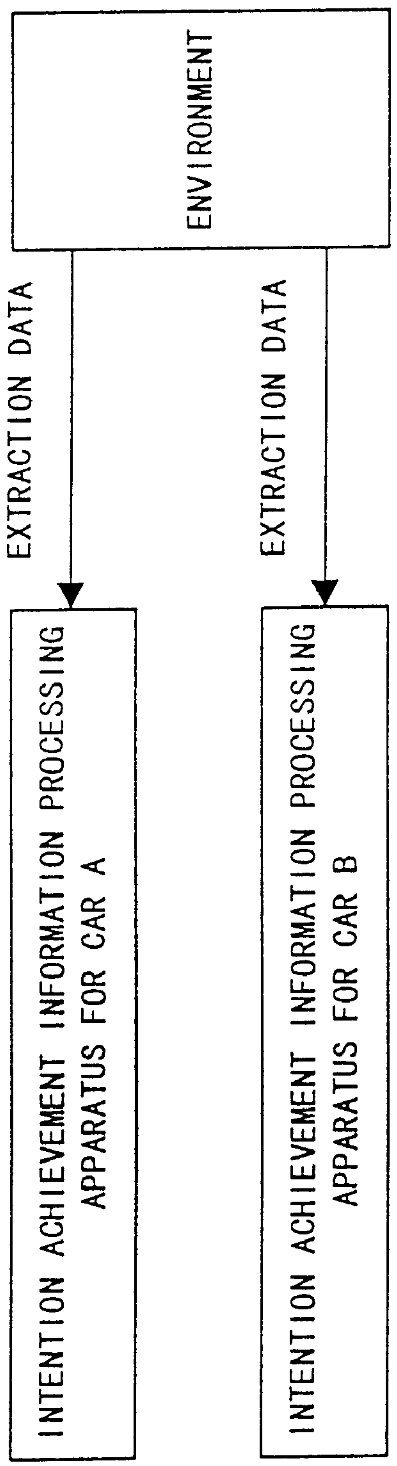
FIG. 41 shows the concurrent operations system in which an intention achievement information processing apparatus is provided for each of the two cars.

FIG. 41 shows the relationship between the systems of the two cars. Each of the systems (intention achievement information processing apparatuses) of cars A and B extracts an environment for achieving an intention from a common environment, and determines the strategy and tactics based on the extraction result, thereby realizing a passing-by operation.

The embodiment of the present invention is described below further in detail assuming that a plurality of parties exists based on the object network for the strategy 209 and the object network for the tactics 210 explained by referring to FIG. 33. Each of the parties has his or her own intention to realize the entire intention, that is, the primary intention. The intention of each of the parties can be a partial intention as a part of the primary intention, or a subordinate intention when an intention is formed in a hierarchical structure.

When there are a plurality of parties as described above, it is necessary to clearly design an intention for issuing an execution request to a role function corresponding to each party. The operation of a role function is performed to satisfy an intention. A target area relating to the operation of which the role function takes charge, and the attributes (structure of the attribute, operable structure, and target of an intention) of an intention are defined. Then, the environment relating to the attainment of an intention of the role function should be described. The environment is described by a role function as a support structure for attaining an intention.

An expert will design the support structure together with the role function to make them consistent with the target area. The relationship between the expert and the user (client) refers to generating a plan in cooperation with each other so that the role function can attain an intention about the target area. The expert designs a system to generate a system satisfying the intention so that the user can be satisfied with the use of the system. On the other hand, the user sets a target under a given environment about the target area of the user, and acts to attain his or her own intention.

Thus, when a role function is generally associated with a number of parties, it is necessary for a number of target areas to be available as basic tools. Especially, a role function for performing a process on an intention through a generic object network shown in FIG. 32 regardless of the target areas is a basic function required to process an intention. A role function for executing a strategy and tactics requires the generality corresponding to the variety for each target area.

The supporting function 206 as a supporting function depends on the environment. That is, the supporting function 206 provides the strategy and tactics 208 with the selected feature 207 as data required to control the operation amount for attaining an intention, and the operation for intention 204 in relation to the data about the environment as an attribute structure about a target area as the structured domain 202. The strategy and tactics 208 are activated by the AND constraints indicating that all of the goal intention 205, the operation for intention 204, and selected feature 207 have been prepared, and then perform the process.

In the process of executing, for example, a subordinate intention of a plurality of parties, the generic object network shown in FIG. 32 is prepared in advance in the WELL system, and the contents of the subordinate intention are sequentially defined from the domain as a target area. The process of practically defining the contents is performed as the definition of the structured target area environment and the party's intention environment in the interaction process shown in FIG. 42. The process is sequentially performed by driving an event and data.

Figure 42:
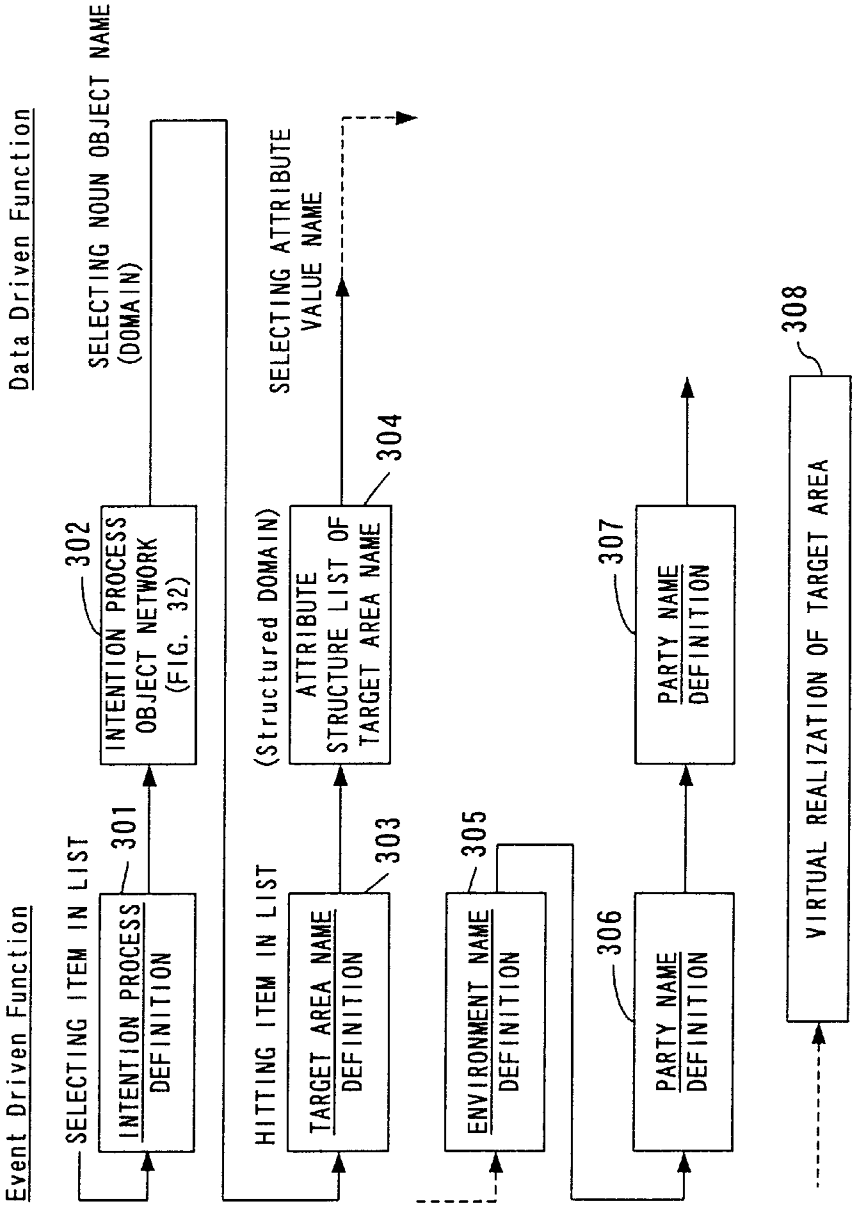
FIG. 42 shows the interaction process as a process of practically defining a subordinate intention.

The process shown in FIG. 42 corresponds to the intention definition process described by referring to FIG. 27. First, a intention process 301 is defined after being selected from the list of service items in the WELL system. A intention process object network 302 shown in FIG. 32 is displayed on the common platform. When the noun object name 'domain' is selected as data driven function on the common platform, a domain which hits an item in the list, and should be defined as a target area name 303 is selected. Then, an attribute structure list 304 of target area names as a structured domain, an environment name 305, party names 306 and 307, etc. are displayed on the message window of the common platform. As described above, for example, if a two-way road is defined as a target area name, and two cars are sequentially defined as a party, then a process of the two-way road is specified.

Thus, an intention is defined by performing the process shown in FIG. 42. As a result, virtual realization 308 is performed on a target area, and data is accumulated in the computer. In addition, the domain 201 shown in FIG. 32 is defined, and the operation for intention 204 and the supporting function 206 are defined including the environment in the parties and corresponding to the structured domain 202 matching environment data. Thus, the supporting function 206 provides the selected feature 207 for the strategy and tactics 208 as input data.

Figure 43:
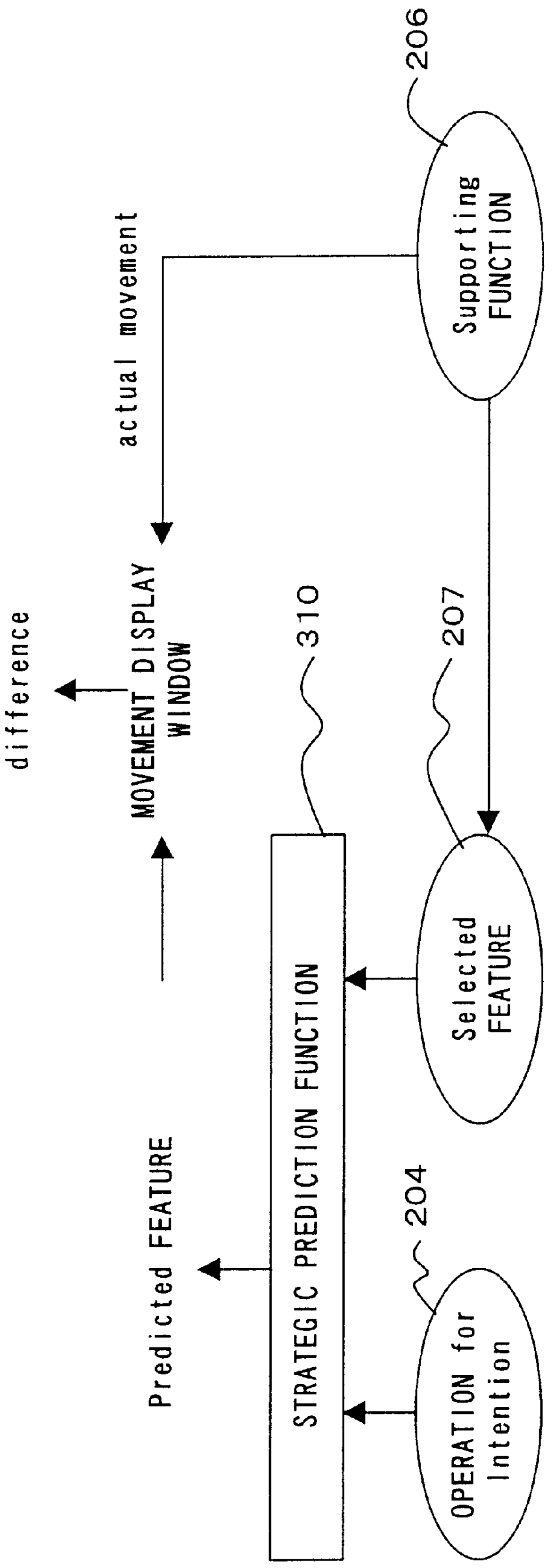
FIG. 43 shows the strategic predicting function for individually predicting the features of the movement of a party.

FIG. 43 shows the strategic prediction function for individually predicting the feature of the movement of the party. In FIG. 43, a strategic prediction function 310 receives the environment data containing the movement of the parties involved as the selected feature 207 through the function of the supporting function 206, or receives the operation for intention 204 as the amount of operations for attaining an intention, and outputs a predicted feature by individually predicting the features of the movement of the party. As described above by referring to FIG. 33, predicted movement is obtained for each party from the predicted feature, and the difference between the result and the actual movement obtained by the supporting function 206 is obtained for each party involved and displayed as a feature extraction result.

Described below is the realization of an intention of a strategy for the movement of acrobatic swings as a practical example to explain the strategic object network and the tactics object network to realize the strategy 209 and the tactics 210 described above by referring to FIG. 33. The process of the performance with the acrobatic swings is described below by referring to FIGS. 44 through 46.

A male acrobat and a female acrobat are the parties in this example. The male acrobat moves an acrobatic swing on his legs while the female acrobat moves another swing on her hands. These swings functions as pendulums.

It is necessary for the male acrobat and the female acrobat of the acrobatic swings to cooperate and succeed their performance by successfully performing the following processes of intentions Sa through Sd.

Figure 44:
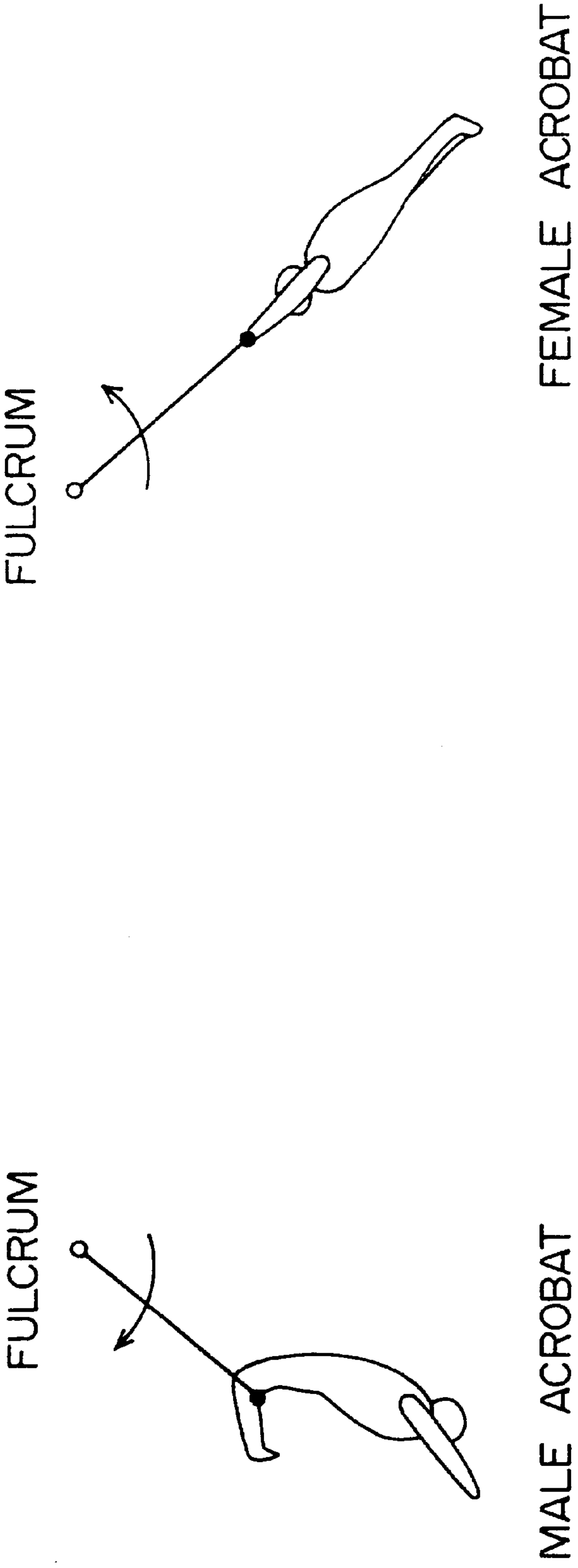
FIG. 44 shows the state of two acrobatic swings swinging off each other.

Sa: The two parties start the performance of acrobatic swings, and move the swings. FIG. 44 shows the state of the two swings moving off each other.

Figure 45:
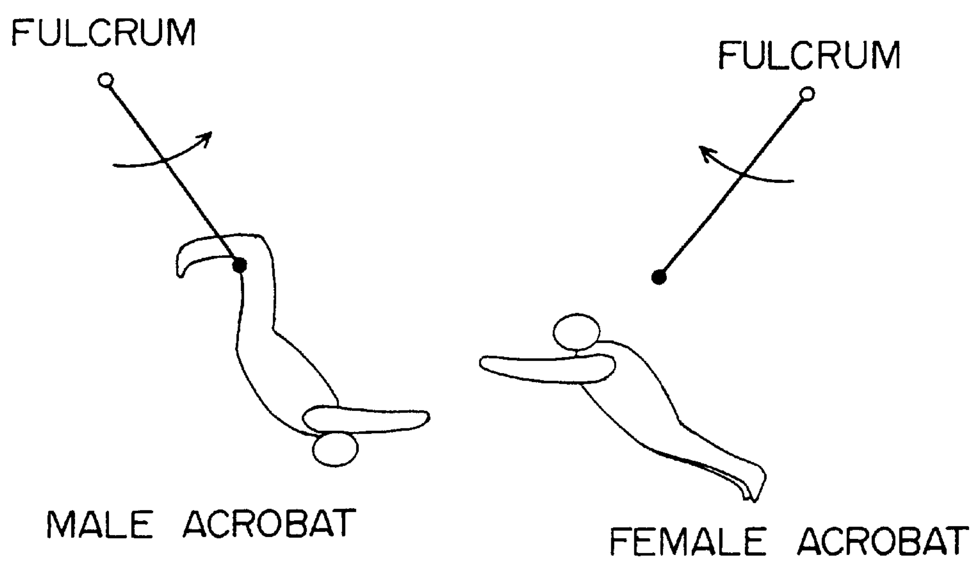
FIG. 45 shows the state of a female acrobat jumping.
Figure 46:
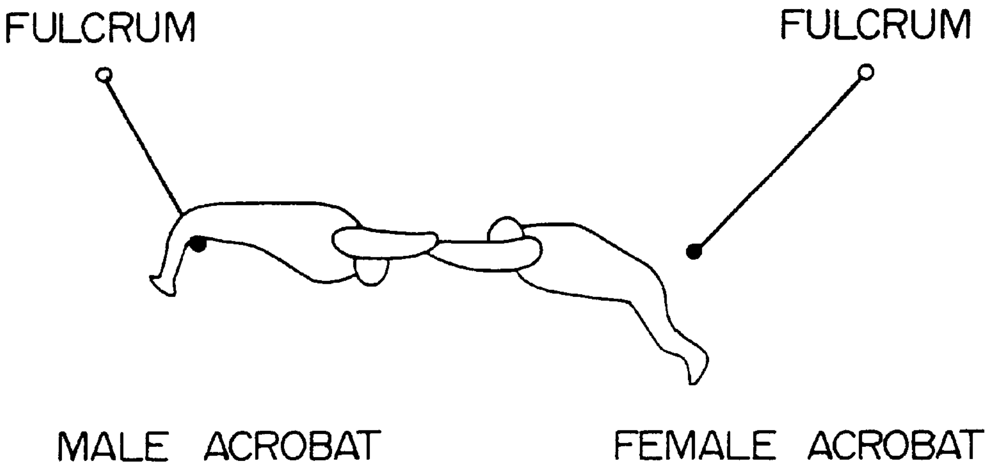
FIG. 46 shows the state of a male acrobat successfully catching a female acrobat.

Sb: The amplitude of the swings become larger. When their amplitude have become synchronous with each other, the female acrobat jumps off her swing, and the male acrobat catches her. FIG. 45 shows this state. The female acrobat jumps when the male acrobat's swing moves to the rightmost point where the male acrobat can successfully catch the female acrobat. FIG. 46 shows the state in which the male acrobat has successfully caught the female acrobat.

Sc: The female acrobat jumps back to her moving swing with the cooperation of an assistant of the female acrobat.

Sd: When the male acrobat and the female acrobat complete their performance, the spectators applaud, and the male acrobat and the female acrobat answer back.

To successfully perform such processes of intentions, it is necessary to make a validation check on a matching constraint item about the integral state including the environment. If the check is not passed, then the performance fails, and the female acrobat fall down on the net.

Matching constraint items should contain at least the following data as the selected feature 207 shown in FIG. 32 in, for example, a template form:

A1: Amplitude of the swings

A2: Synchronization of the amplitude of the two swings

A3: Point of the jump of the female acrobat

A4: Point of the male acrobat's change into a catching posture

A5: Amplitudes of the swings, or the point of the male acrobat holding the female acrobat's hands.

In this case, the conditions of attaining the goal intention 205 are that the intention class 203 shown in FIG. 32 is cooperative, the male acrobat and female acrobat hold each other's hands; the male acrobat successfully catches the female acrobat, the amplitude of the male acrobat's swing is intensified with the cooperation of the male acrobat and the female acrobat, and the female acrobat jumps back to the female acrobat's swing. Therefore, the following matching constraint item is furthermore required to allow the male acrobat and the female acrobat to take actions after they hold each other's hands. This also determines the operation of the assistant as the third party.

B1: An intention to hold each other's hands is confirmed.

B2: The male acrobat and the female acrobat hold each other's hands and cooperate to intensify the amplitude of their swings, and the assistant of the female acrobat catches the female acrobat's swing just jumped off.

B3: The swing on which the male and female acrobats are playing with their hands held tight is synchronized with the swing which is moved by the assistant of the female acrobat.

B4: The female acrobat returns to the female acrobat's swing, thereby terminating the performance.

A strategy and tactics are required to realize an intention, and they are executed according to the amount of operations of the parties, the operation for intention 204, the amount of features about the environment, and the selected feature 207. In the case of acrobatic swings, the male acrobat starts with moving the female acrobat's swing, and then catches the female acrobat. The actions of the female acrobat include moving the female acrobat's swing, jumping off her swing, and then successfully coming back to the female acrobat's swing after a jump to the male acrobat.

The above described operations are performed depending on the situation of the processes in the performance of acrobatic swings, that is, environment data. In the case of the acrobatic swings, the first step of the strategy is to determine how the male and female acrobats cooperate. First, both of them move and synchronize their own swings with each other. In this case, the way how to move the swing depends on each acrobat's physical conditions.

If the swings cannot be moved sufficiently, the two acrobats cannot hold each other's hands. Therefore, both acrobats should:

1. sufficiently move their swings,
2. give their performances with the maximum amplitude of their swings, and
3. move their swings in their own way with the difference in amplitude allowed.

In the above case, it is necessary for the acrobats to cooperate with each other about the amplitude of their swings with each other's physical ability taken into account to successfully give their performances. To cooperate with each other, the acrobats have to do practice by trial and error. To generate the realistic contents of the acrobatic swings, it is necessary in the movement process of an operable target to set a link mechanism between the action started by an intention and a natural movement following a natural rule, for example, a physical rule.

In the example of the acrobatic swings, the physical movement is a driving method for controlling the amplitude of a swing as an intention. In relation to the driving method, the movement of the swing activated by the physical movement is linked with the movement of the swing itself based on the center of gravity as a physical rule, thereby obtaining the contents.

The matching constraint item for the operation of moving a swing using the movement of an acrobat is determined by an intention, an operable target, and the amount of features of the environment. At least the following three items are required.

1: Synchronization between a pair of moving acrobatic swings

2: Amplitude of swings

3: Shortest distance between two acrobats

The priority of each matching constraint item to be assigned in performing an operation is given to the above items 1, 2, and 3 in order from the highest. The leader of the two acrobats is determined, for example, a male acrobat, and the speed of the swings is accelerated or delayed according to the intention of the leader to synchronize the two swings. Then, the two acrobats coordinate with each other such that the items 2 and 3 can be satisfied.

When a female acrobat jumps off her swing, the operation starts at a moment, and then the female acrobat changes the female acrobat's movement based on the natural rule. Finally, the female acrobat cooperates with the male acrobat to hold each other's hands.

There are matching constraints in strategy and tactics. The strategic constraints are represented as generic parameter variables to embody the matching constraint items depending on the environment. The matching constraints in tactics are provided as execution constraints having practical values.

In the example of the acrobatic swings, there are subordinate intentions segmented by a sequence of the constraint feature items A1 through A5 for a successful primary intention. A strategy refers to designing such a subordinate intention sequence, and the constraint feature is represented for each subordinate intention for a successful primary intention. In the case of acrobatic swings, the subordinate intentions are serial.

As shown in the example of the acrobatic swings, when a plurality of parties have respective partial intentions or subordinate intentions and try to reach a primary intention as a group, the parties have a generic object network as shown in FIG. 32 for realizing each other's intention, performs their operations as associated with each other, and reach the final target, that is, the primary intention, as a group. The target of a party may be satisfied, or the target of another party may not be satisfied. To proceed with such processes, the structure of an intention network is generated.

To perform a process with the relationship between parties effectively maintained, it is necessary to perform an operation corresponding to a strategic matching constraint item based on the cooperation through a broadcast function described by referring to FIG. 30, and the cooperation through the function of partially recognizing environment data described by referring to FIG. 31.

Assuming that these functions are provided for each of the parties, each party realizes the strategy and tactics such that the matching constraint items correlated to each other based on the environment data can be satisfied. There are two matching constraint items to be optimized to satisfy subordinate intentions as follows.

Figure 47:
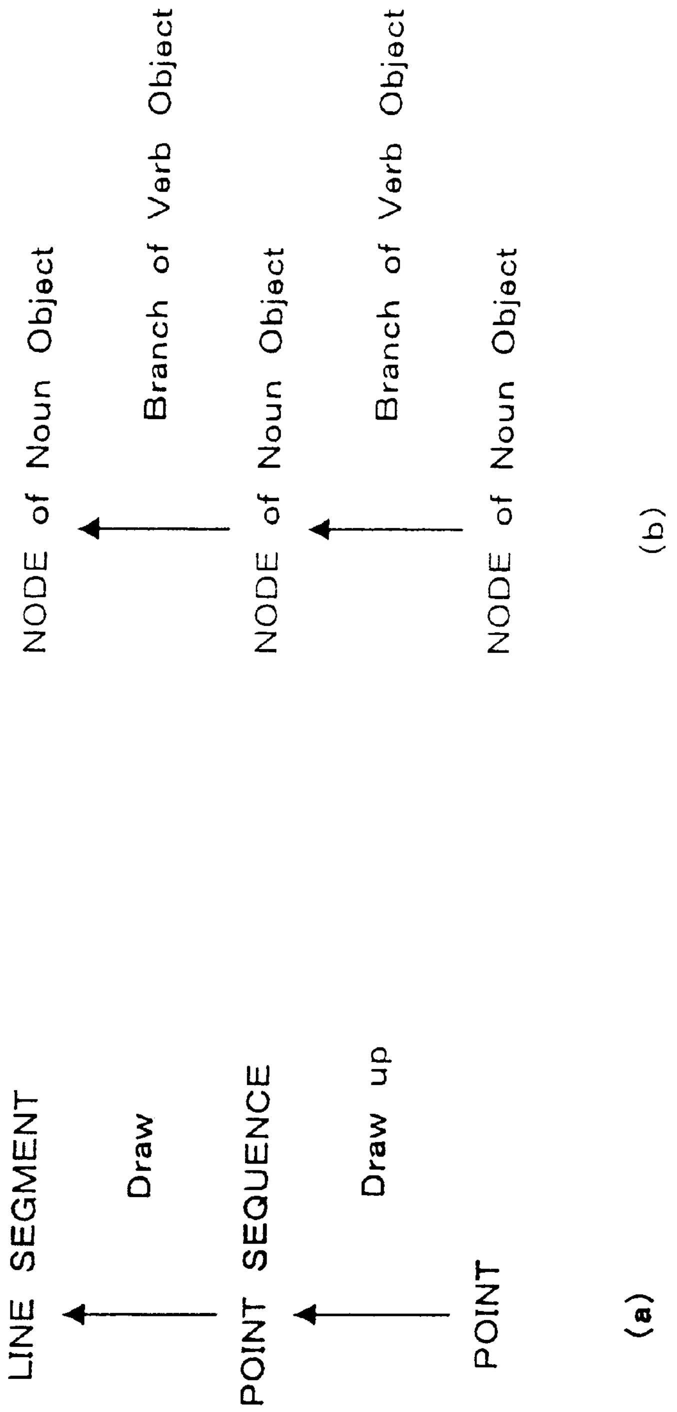
FIG. 47 shows an example (1) of the relationship between a concrete object network and a generic object network.

1. rules of the amount of operation constraints as modal constraints about operable target
2. rules of the temporal constraint as a feature point at which a subordinate intention forming part of an intention sequence should be realized Next, the relationship between a concrete object network and a generic object network is described below by referring to FIGS. 47 and 48. For example, as shown in FIG. 3, an object network is generated by having a verb object as a branch working on a noun object. (b) in FIG. 47 shows an example of a generic object network with the structure for having the branch of a generic verb object on a node of a generic noun object. On the other hand, (a) in FIG. 47 shows an example of a concrete object network, and indicates that a concrete noun object 'point sequence' is obtained by having the concrete verb object 'draw-up' on the concrete noun object 'point'.

Figure 48:
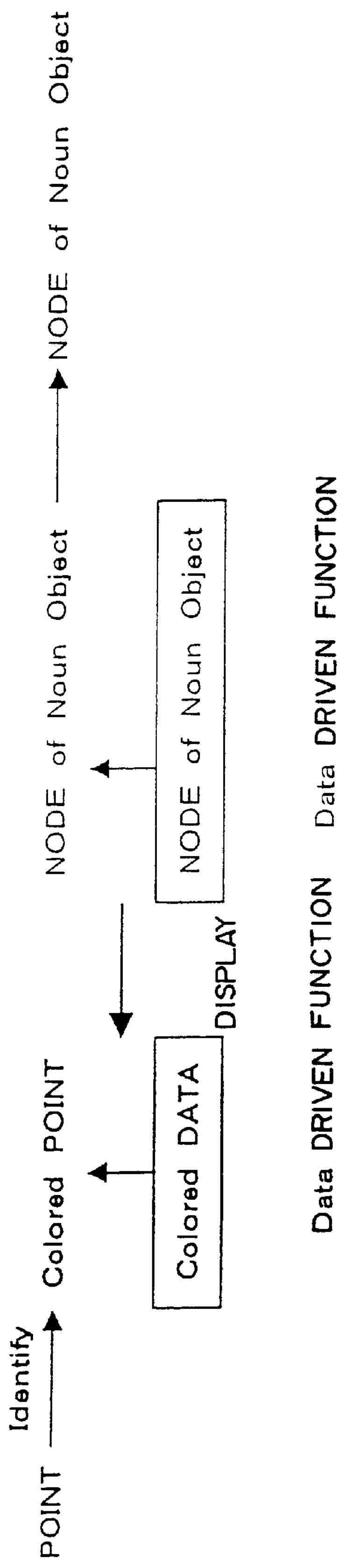
FIG. 48 shows an example (2) of the relationship between a concrete object network and a generic object network.

In FIG. 48, for example, the 'colored data' as a concrete noun object can be added as a constraint operation element to the concrete noun object 'colored point' through data driven function.

As described above, the concrete noun object in the concrete object network corresponds to the generic noun object in the generic object network. An object network comprising such a generic noun object and a generic verb object can be a generic object network for a process of intentions.

Figure 49:
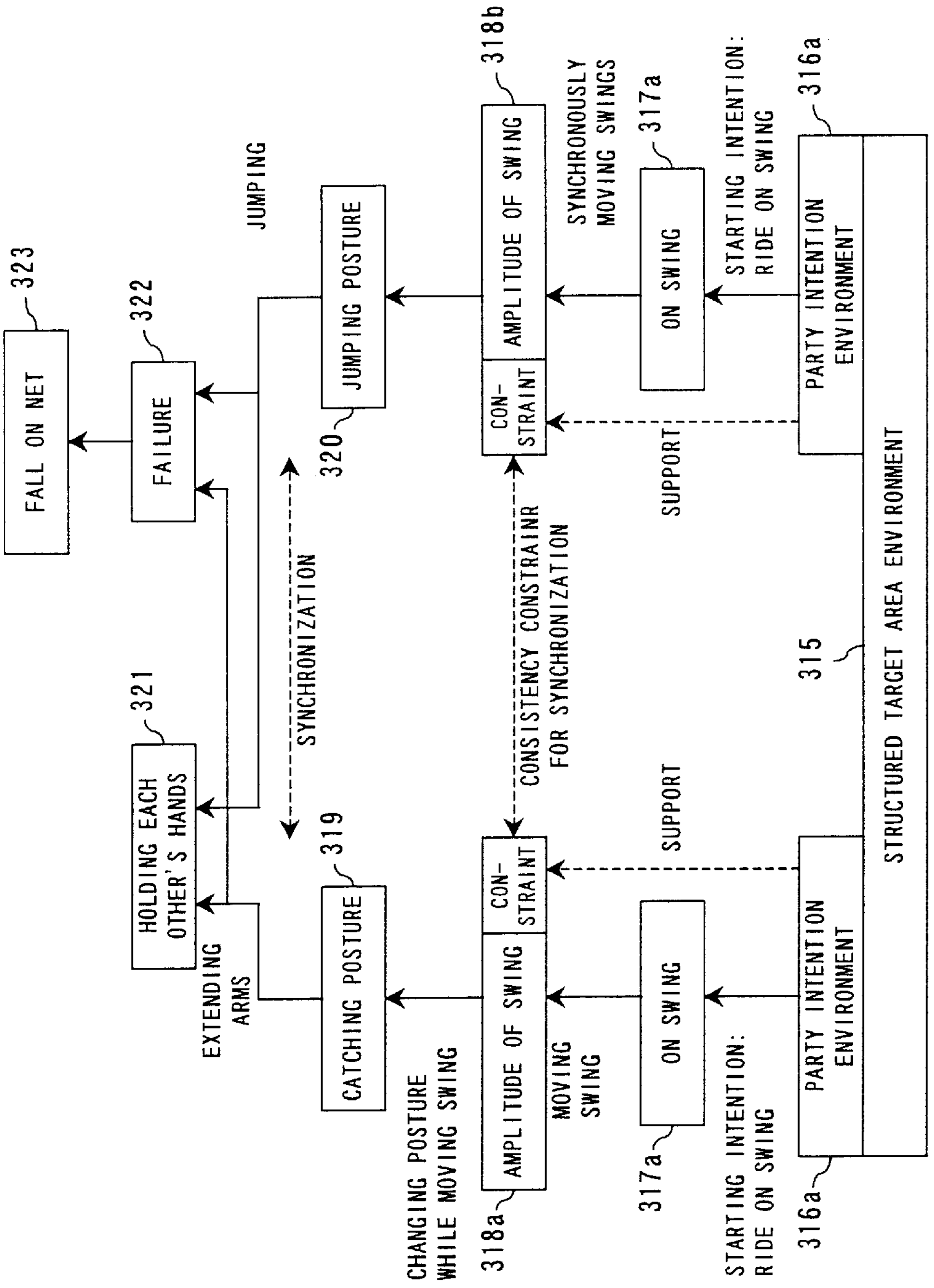
FIG. 49 shows the structure of the strategic generic object network for acrobatic swings.

FIG. 49 shows the structure of a strategic generic object network for acrobatic swings. In FIG. 49, a structured target area environment 315 and a party intention environment 316 at the base are defined by the process described by referring to FIG. 42. In this example, the structured target area environment 315 corresponds to the primary intention of an entire group of a plurality of parties. The party intention environments 316*a* and 316*b* respectively correspond to the parties' partial intentions or subordinate intentions.

In FIG. 49, the units on the left refer to an object network of a male acrobat. On the other hand, the units on the right refer to an object network of a female acrobat. For example, in the left network, the male acrobat makes the verb object 'to ride on a swing' work on the party intention environment 316*a*, thereby setting the state 'on the swing 317*a*'. In addition, the noun object 'amplitude of the swing 318*a*' is obtained by having the generic verb object 'moving the swing' functioning. Furthermore, the noun object 'catching posture' 319 can be obtained by having the verb object 'changing the posture while moving the swing' functioning.

Similarly, in the object network for the female acrobat, the noun object 'jumping posture' 320 is obtained, and the function 'jumping' is added thereto. On the male acrobat side, the verb object 'extending hands for catching the female acrobat' works on the noun object 'catching posture' 319. Thus, the noun object 'holding each other's hands' 321 is obtained when the performance succeeds. When the performance fails, the noun objects 'failure' 322 and 'fall' 323 are obtained.

The matching constrains are placed as constraint conditions for synchronization on the amplitude of the swing of the male acrobat and the amplitude of the amplitude of the female acrobat. To satisfy the constraints, support from each party intention environment is obtained. In addition, to make the 'holding each other's hands' 321 be successfully performed, synchronization is required as constraint conditions between the verb object 'extending hands to catch the female acrobat' for the male acrobat and the verb object 'jumping' for the female acrobat.

To explain about the strategic object network, the execution of a concrete strategy is described below. A concrete strategy is dynamically executed by performing a concrete operation on an operation target for realizing each partial intention or subordinate intention in association with the environment. To obtain the required amplitude of swings by executing the verb object 'moving a swing' or 'synchronously moving swings' shown in FIG. 49, the operation target is the shift of the center of gravity of the acrobats on the swings, and the shift of the gravity-of-gravity positions of the acrobats are made as shown in FIGS. 50A and 50B depending on the state of the swings as environment data.

Figure 50B:
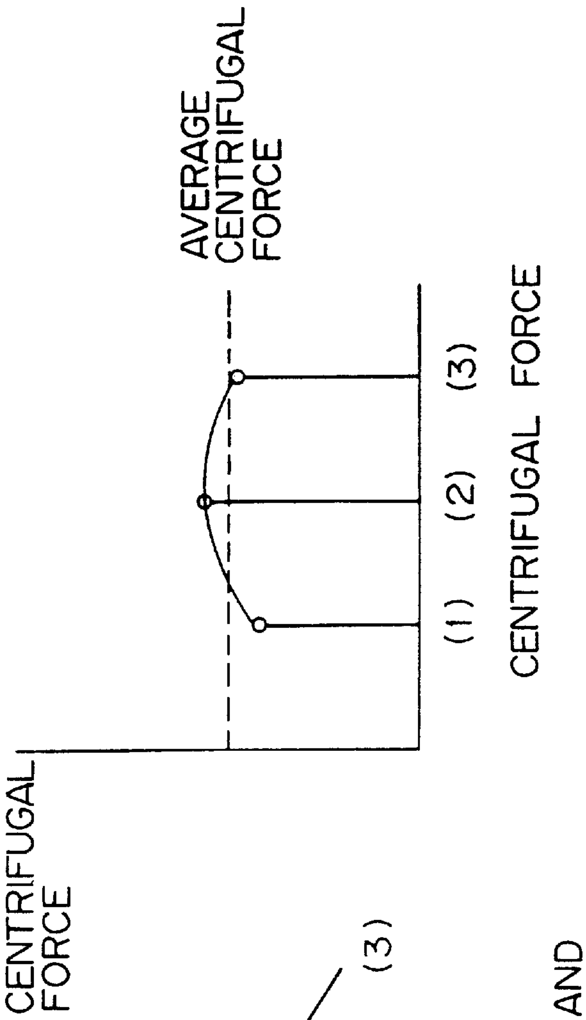
FIG. 50B shows the centrifugal force of the swing shown in FIG. 50A.
Figure 50A:
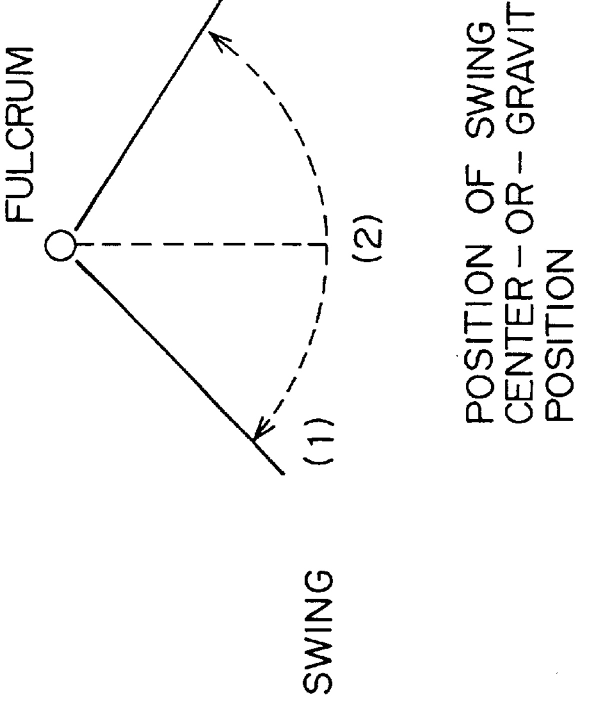
FIG. 50A shows the shift of the position of the center of gravity for executing the tactics for moving a swing.

In FIG. 50A, when the swing is at the position (2), the maximum centrifugal force is obtained as shown in FIG. 50B. When the swing moves from the position (1) to the position (2), the swing is accelerated in the right direction, indicates the maximum amplitude in the right direction at the position (3) from which the movement of the swing changes into left.

As described above, the acrobat realizes the amount of feature, that is, the position of the swing, and moves the swing by shifting the center-of-gravity position by bending and stretching the legs. The amplitude of the swing is increased to reach a predetermined value. Simultaneously, a matching constraint item is assigned to the acrobat to be synchronous with the swing of the other acrobat which is moving in the opposite direction. Actually, a data driven function process is performed by specifying the position of the center of gravity as an operation target in the data window as the data on the common platform.

Figure 51:
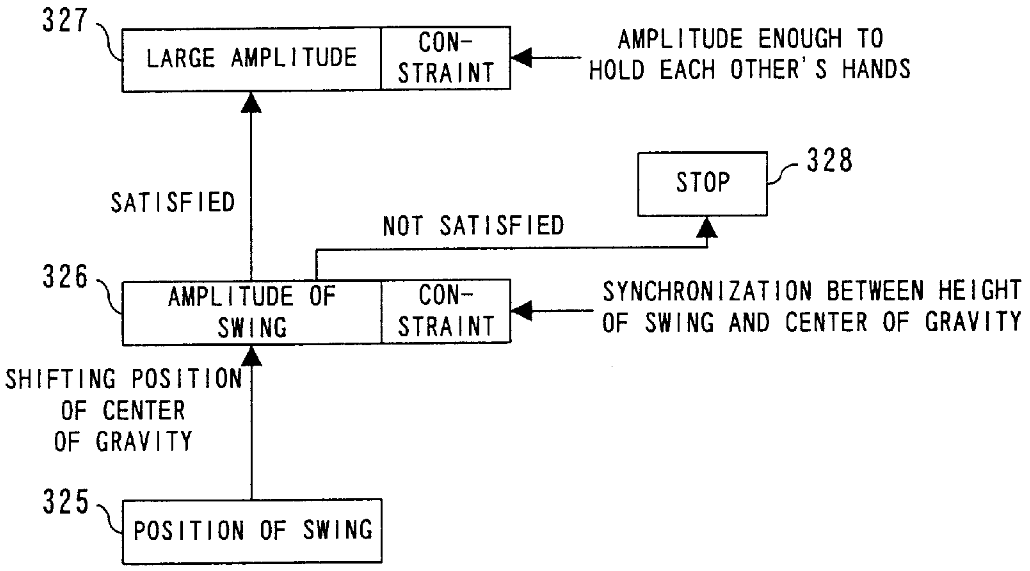
FIG. 51 shows the structure of the generic object network for the tactics for acrobatic swings.

FIG. 51 shows the structure of the strategic generic object network for moving a swing. In FIG. 51, the noun object 'amplitude of the swing' 326 is obtained by having the verb object 'shifting the position of the center of gravity' working on the noun object 'position of the swing' 325. To the movement of the swing, the height of the swing and the synchronization of the position of the center of gravity are assigned as constraints. When the constraints are honored, a noun object 'large amplitude' 327 is obtained. When the constraints are not honored, a noun object 'stop' 328 is obtained. To the noun object 'large amplitude' 327, the matching constraint 'amplitude sufficient for both acrobats' holding each other's hands' is assigned.

Figure 52:
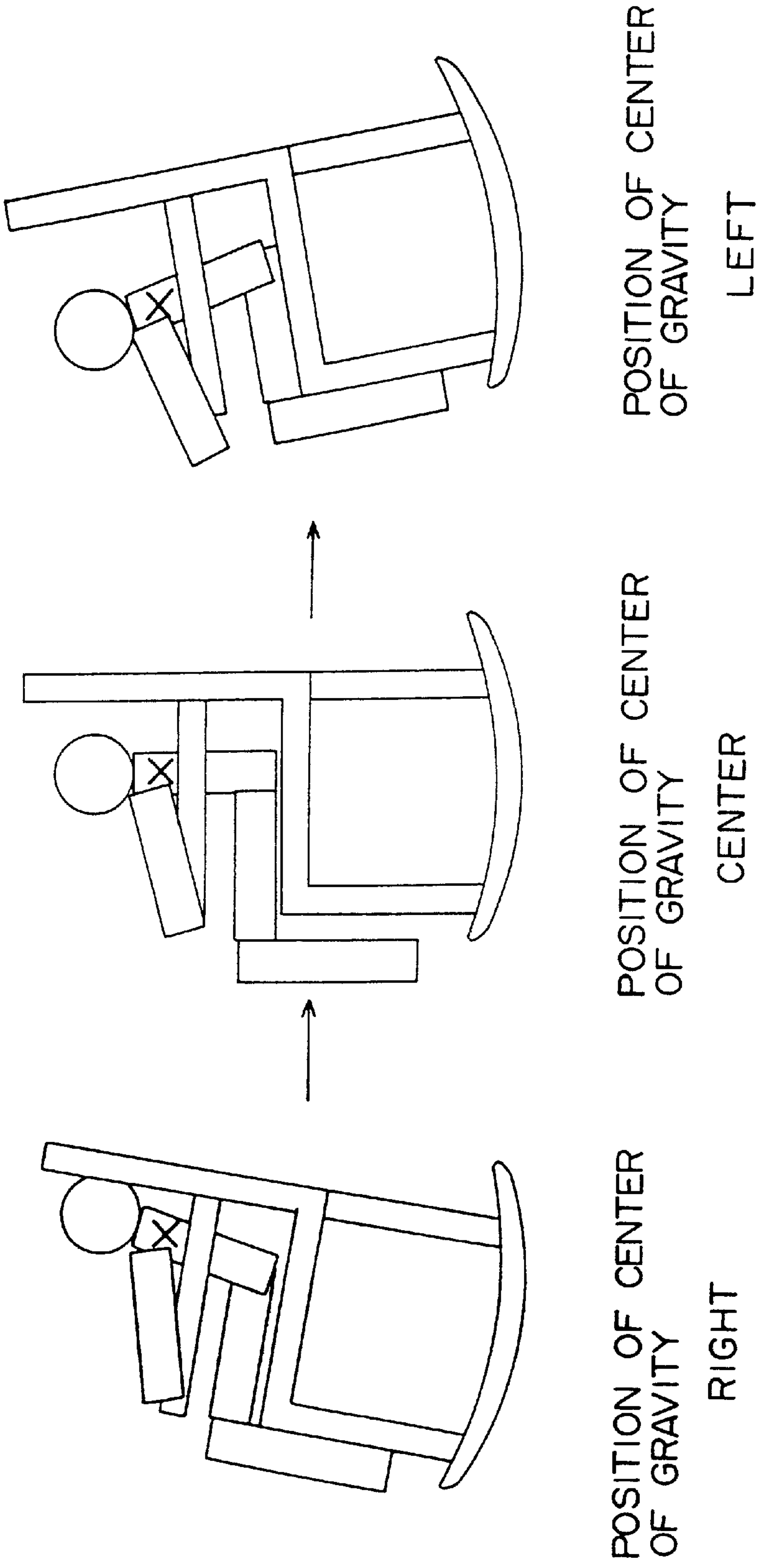
FIG. 52 shows the shift of the position of the center of gravity for executing the tactics for swinging a rocking chair.

The strategy of 'moving something' actually depends on each case, For example, when moving a rocking chair, unlike an acrobatic swing, there is a constraint that an operator is sitting on the chair. Therefore, it is hard to shift the center of gravity up and down. The operation of rocking the chair can only be performed by shifting the center of gravity forward and backward as shown in FIG. 52. In FIG. 52, when a person who is sitting on the chair leans back, the center-of-gravity position is shifted to right. When the person leans forward, the center-of-gravity position is shifted to left. Thus, the rocking chair can be moved by shifting the position of the center of gravity of the chair.

In the case of a group of two hunters and a game, for example, a lion, an eagle, and a squirrel, the lion is strong, and the eagle can fly in the air. The squirrel is caught and eaten by them, but can quickly move away into a small hole and bush.

There are a number of assumptions, for example, among two hunters and a game:

1. a lion catches and eats a squirrel,
2. when a lion holds a squirrel, an eagle whirls in the air and flies down before the eagle knows it, robs the lion of the squirrel, and safely flies away from the lion, and
3. while the lion and the eagle have a fight, the squirrel rushes into a safe area.

In the above described case, three parties appear. Among them, the lion and the eagle have intentions to catch and eat the squirrel, and the squirrel wishes to run away from them before they know it. How they end their fight depends on who takes the advantage in the total environment data including the three parties. By analyzing the situation, the respective strategies of the three parties dynamically change. Therefore, each of the parties has his own feature data for each situation based on which each party acts with his unique partial or subordinate intention.

A strategy in a boxing game depends on the states of a punch and a guard of an opposite, the state of a rush, rules on foul such as butting, etc., and each strategy is determined by the matching constraints based on the final determination in consideration of these conditions.

Figure 53:
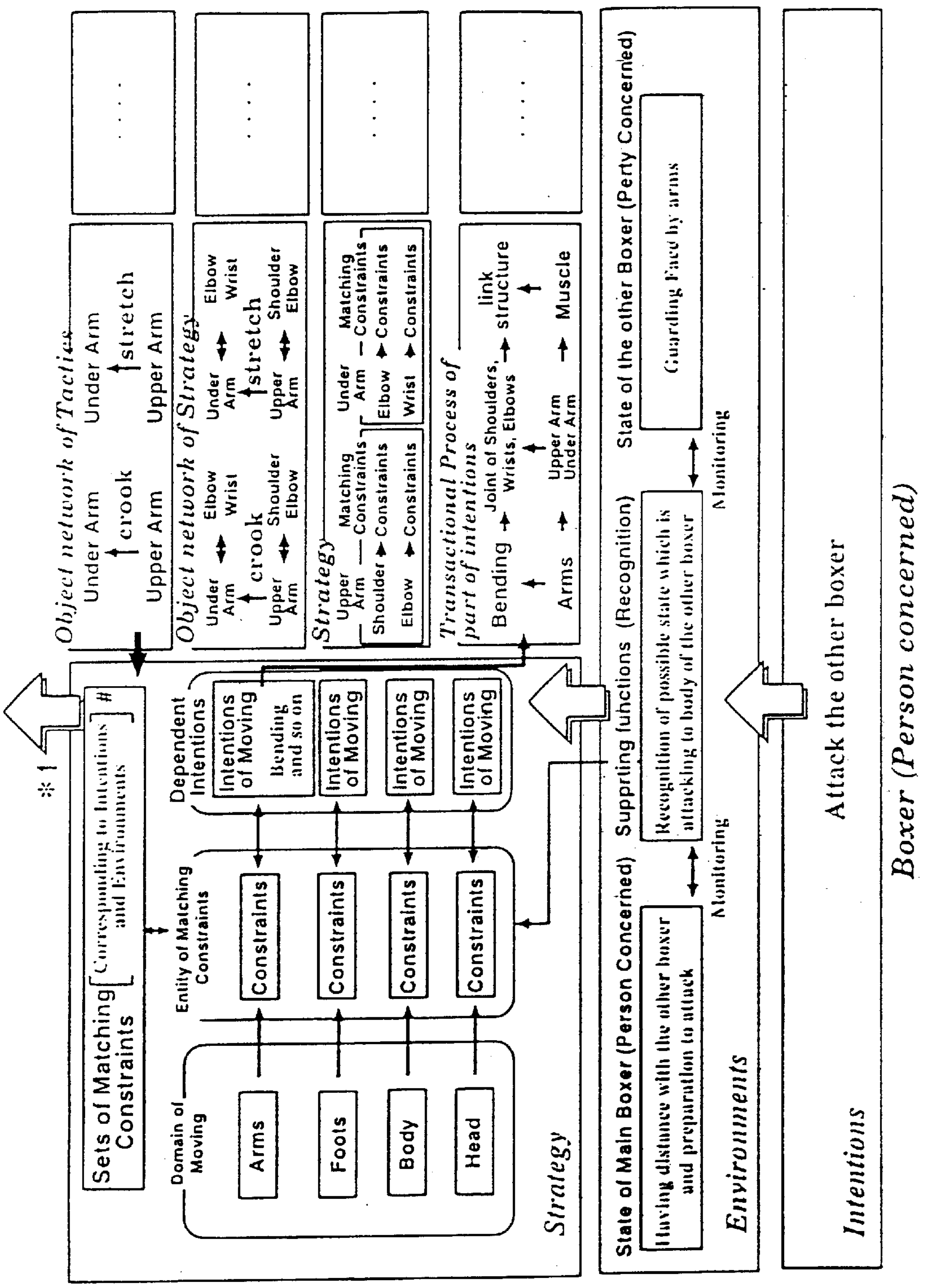
FIG. 53 shows an example (1) of a strategic and tactics object network for generating multimedia contents for boxing.
Figure 54:
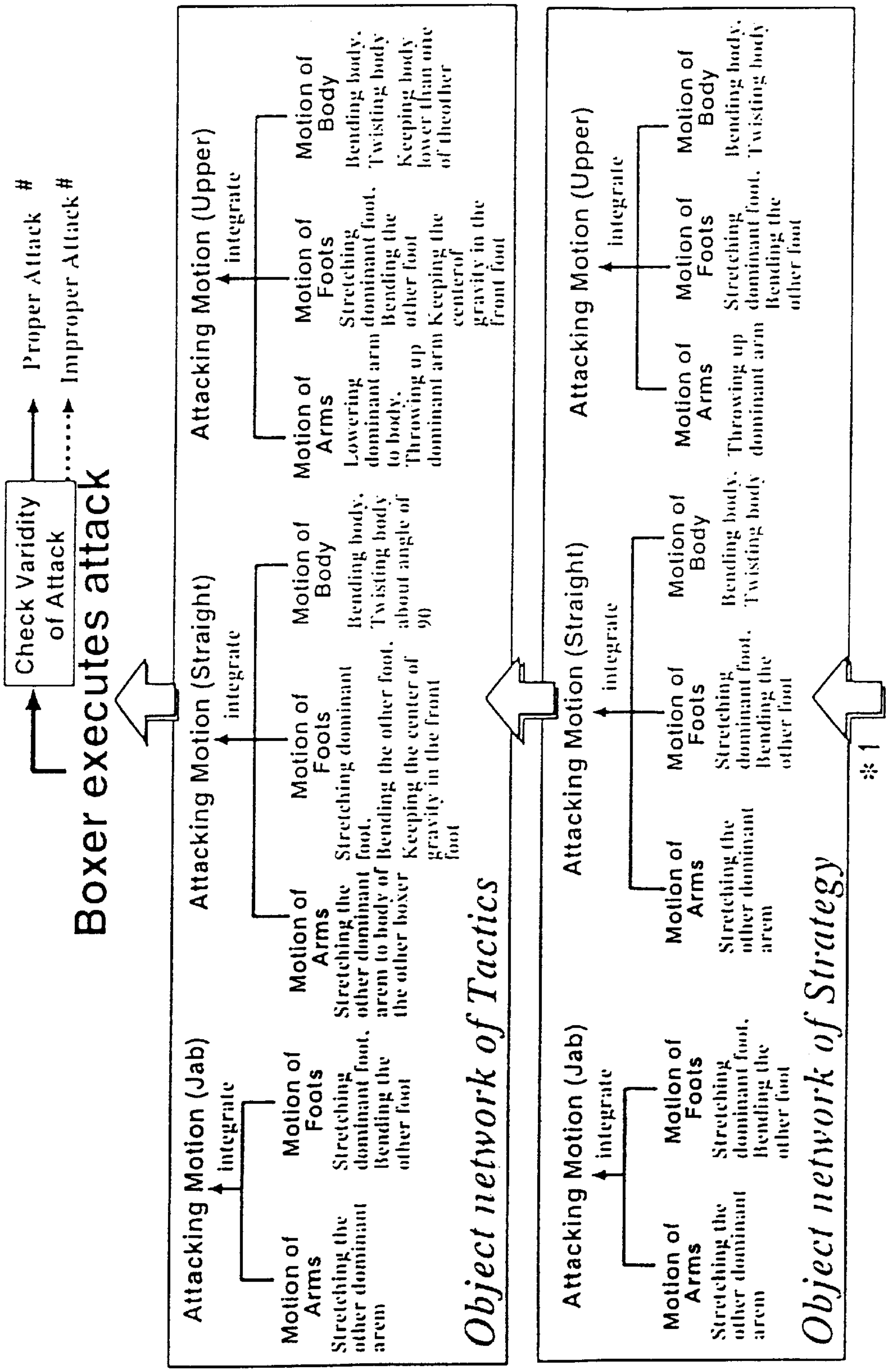
FIG. 54 shows an example (2) of a strategic and tactics object network for generating multimedia contents for boxing.

FIGS. 53 and 54 show examples of a strategic object network and a tactics object network for generating multimedia contents for a boxing game.

Figure 55A:
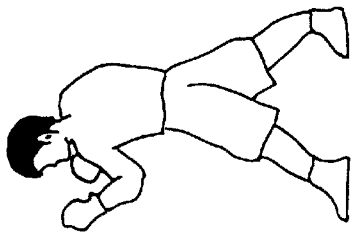
FIG. 55A shows an image (1) of boxing generated based on the object network shown in FIGS. 53 and 54.
Figure 55B:
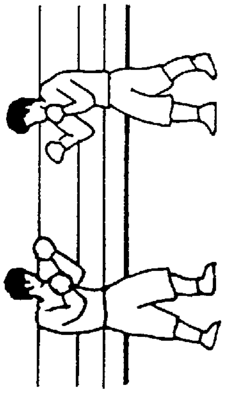
FIG. 55B shows an image (2) of boxing generated based on the object network shown in FIGS. 53 and 54.
Figure 55C:
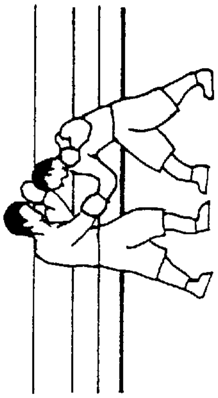
FIG. 55C shows an image (3) of boxing generated based on the object network shown in FIGS. 53 and 54.
Figure 55D:
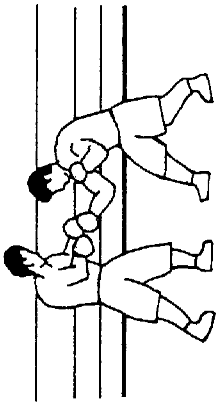
FIG. 55D shows an image (4) of boxing generated based on the object network shown in FIGS. 53 and 54.

FIGS. 55A through 55D show the images generated based on the object networks. FIG. 55A shows a boxer as a partial image. FIG. 55B shows a stage before acting on the offensive. FIG. 55C shows a failure in the offensive. These images are dynamically generated based on the object network shown in FIGS. 53 and 54.

Described below is the intention integrating process. When there are a plurality of parties, an integral intention, for example, a primary intention can be realized by integrating the role functions corresponding to respective parties' unique partial or subordinate intentions. To realize such an integral intention, each party should have common recognition about the environment. For example, in a play, a rehearsal is required to determine how to play an action to make each role be dynamically and realistically performed. Especially in an intention processing system in which an emotional representation should go with an action to deeply impress the spectators a scenario should be prepared based on the original story, and the general action and operations including the parties should be appropriately adjusted and amended.

Figure 56:
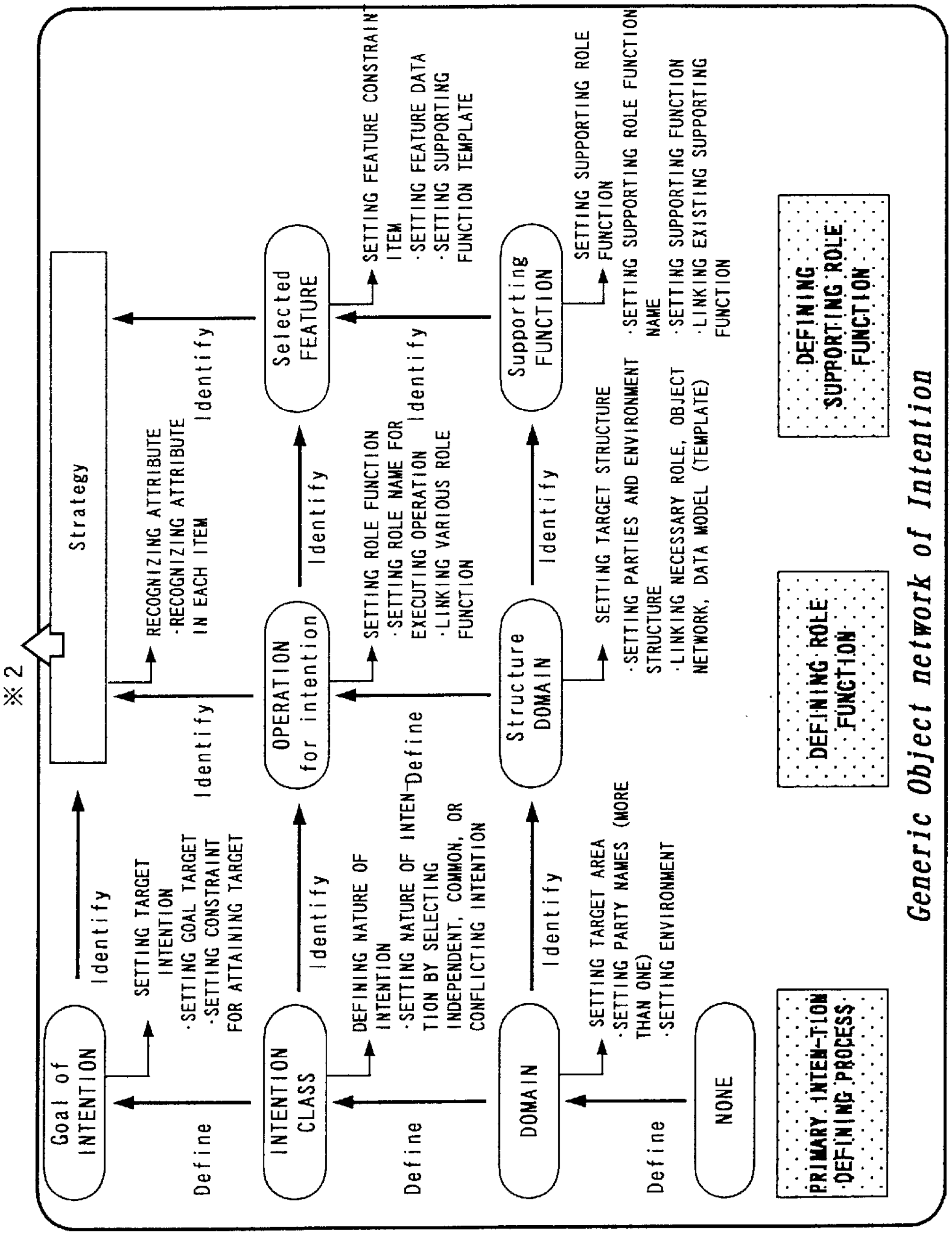
FIG. 56 shows the process (1) of designing and realizing a service for integrating the intentions of a plurality of parties.
Figure 57:
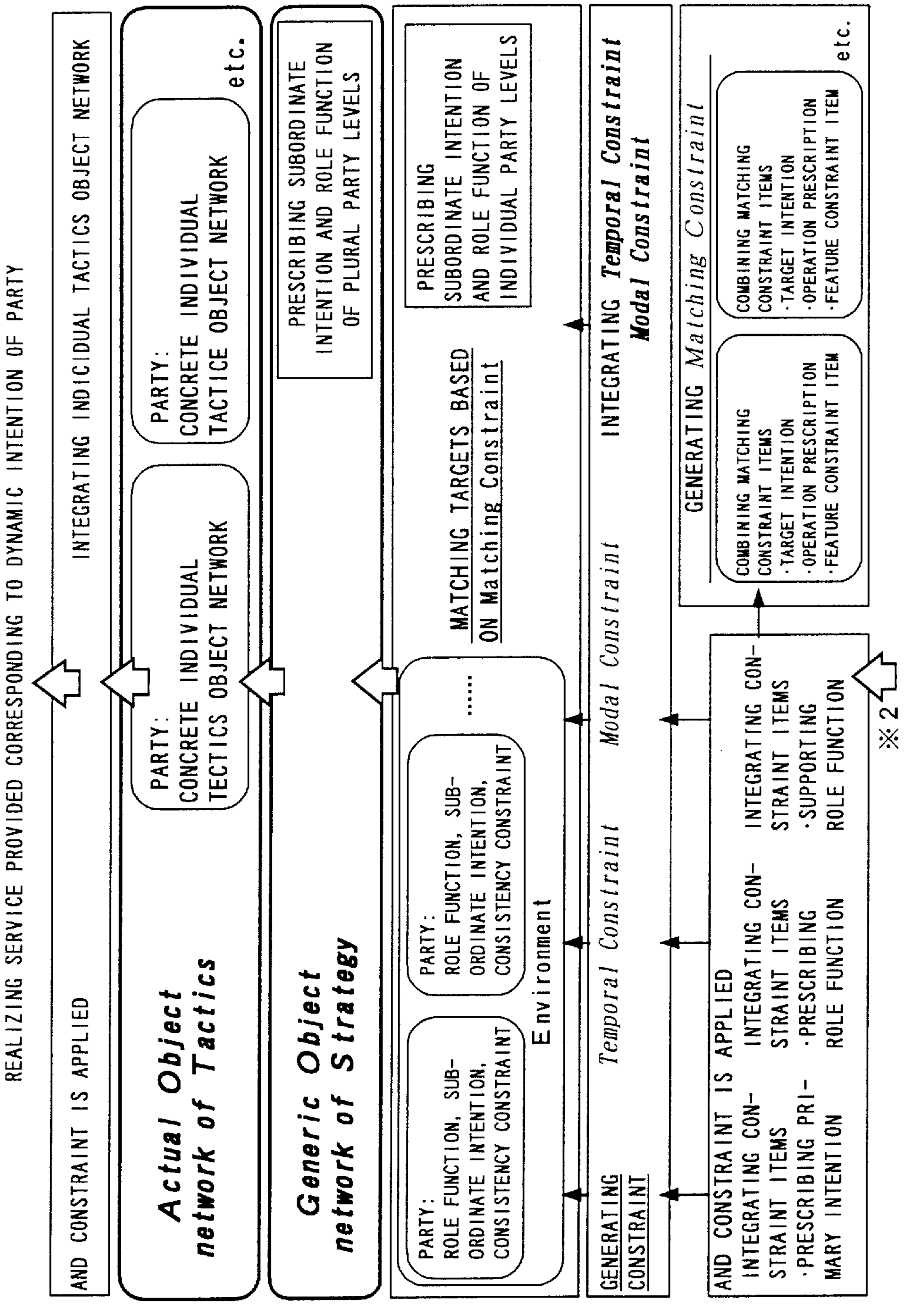
FIG. 57 shows the process (2) of designing and realizing a service for integrating the intentions of a plurality of parties.

FIGS. 56 and 57 show the design and execution process of integrating the intentions of a plurality of parties. In FIG. 56, the structured target area environment and the party intention environment are set as shown in FIG. 49, based on which an intention network is defined.

In FIG. 57, a temporal constraint and a modal constraint are set as matching constraints corresponding to each partial or subordinate intention. Then, each of the strategic concrete object networks is defined for each party, and the defined strategic object networks are integrated, thereby realizing a service corresponding to the integral intention.

The design concept of the above described WELL system is appropriate as a software architecture for performing the process of realizing the above described intention network structure. The language system of a document in the WELL system is based on a natural language. An interface between a client and a system is based on a visible format. As a result, bugs can be avoided as much as possible in designing software. This is an important merit for an expert involved in designing a scenario, and even for a user to realize his or her intention for easier use and quick response.

Figure 58:
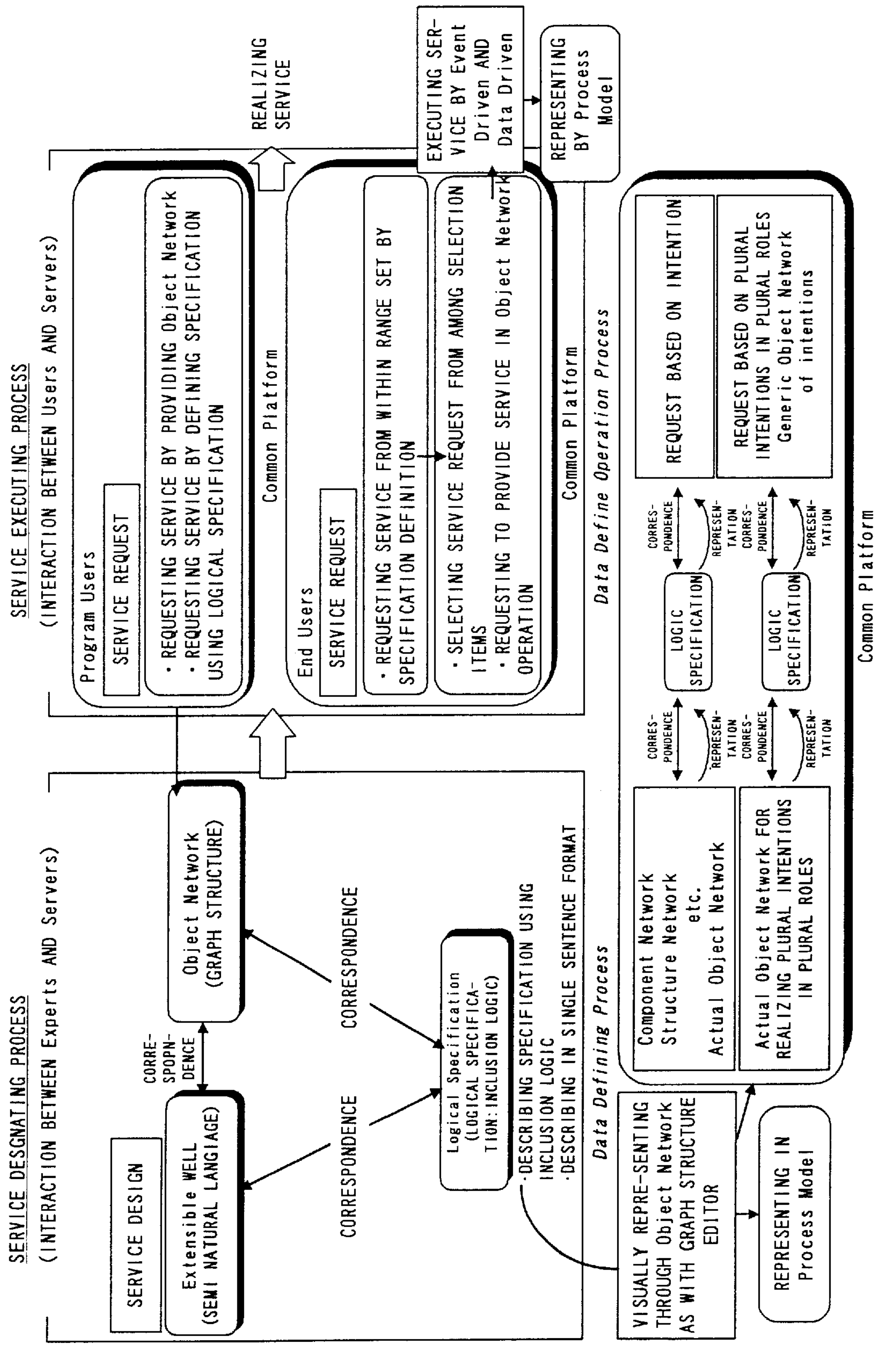
FIG. 58 shows the language system of an extensible WELL system.

FIG. 58 shows the language system of an extensible WELL system. As shown in FIG. 58, in the service designing process, that is, the interaction between an expert and a server, any of a semi-natural language, a graph structure, and a logic specification can be used. It is an outstanding feature that these three items are clearly associated.

FIGS. 59 and 60 show examples of source code in the definition of a domain using a semi-natural language and a logic specification.

Figure 61:
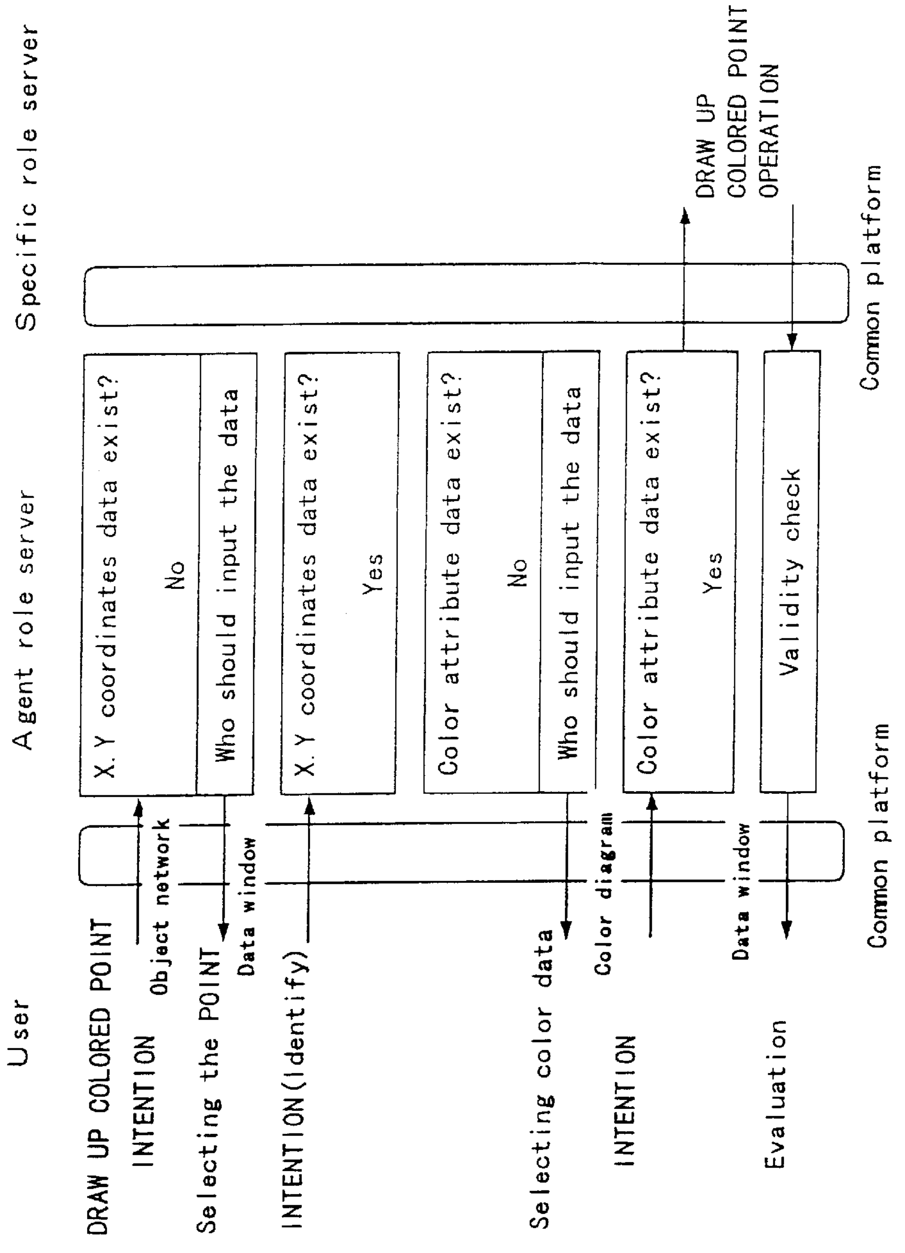
FIG. 61 shows the integration interaction structure between a user and an agent role server and a specific role server.

As an example of software architecture of a WELL system, a hierarchical structure of an agent role server and a specific role server is adopted as described above. FIG. 61 shows an integral interaction structure among a user, an agent role server, and a specific role server based on the hierarchical structure. Using the hierarchical structure, an integral constraint process can be performed at each level of data, objects, roles, and process models. Furthermore, the generic concept can be easily used. The constraint can be classified into a modal constraint and a temporal constraint as described above.

Figure 62:
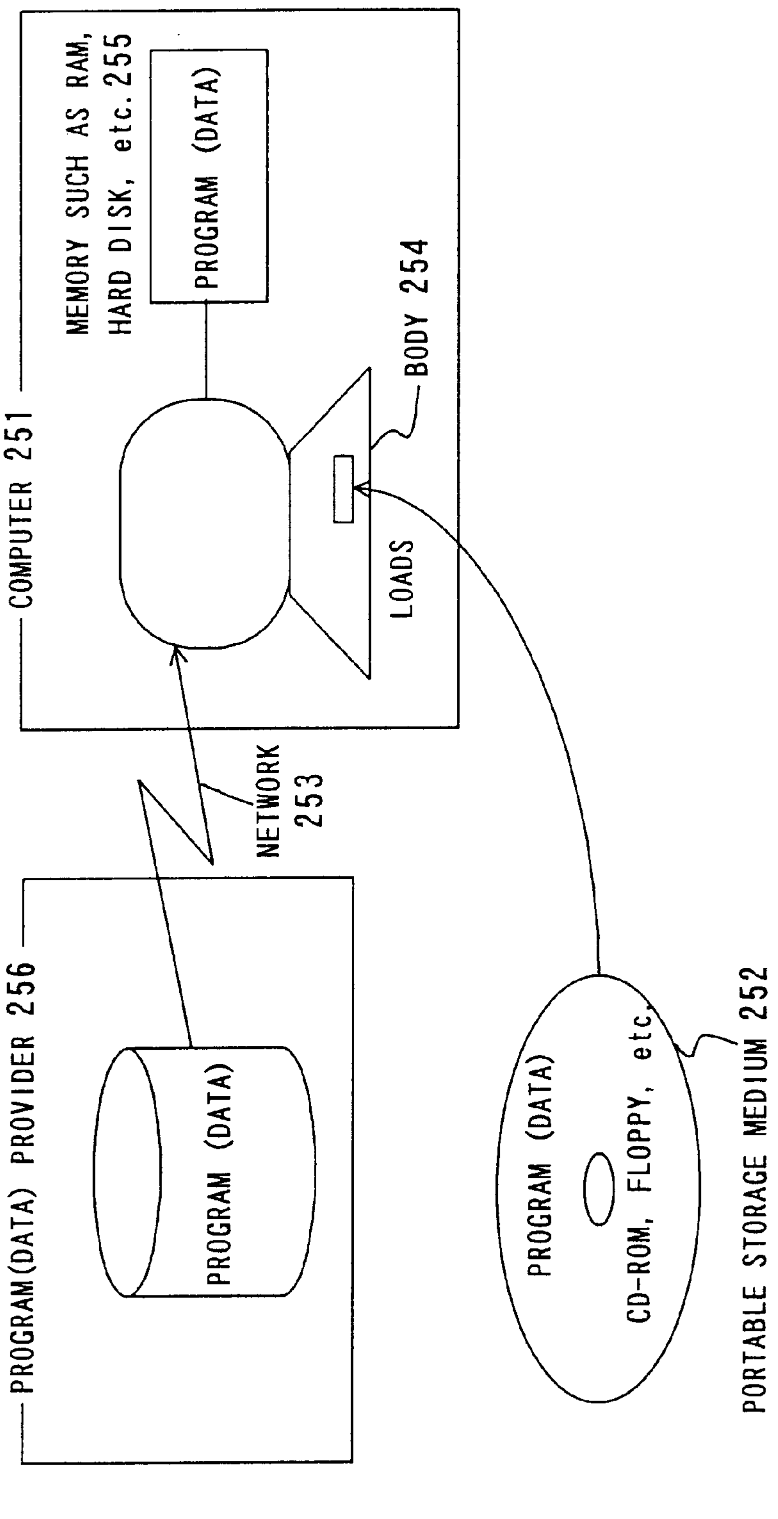
FIG. 62 is a block diagram showing the computer network and the storage medium storing a program.

FIG. 62 shows the storage medium for storing a program according to the present invention. In FIG. 62, a computer 251 comprises a body 254 and memory 255, and can load a program stored in the portable storage medium 252 to the body 254, or load a program from a program provider 256 through a network 253.

The program according to the present invention is stored in the memory 255, and the program is executed by the body 254. The memory 255 can be, for example, random access memory (RAM), a hard disk, etc.

Furthermore, a program according to the present invention can be distributed as stored in a portable storage medium 252. The portable storage medium 252 can be any of a memory card, a floppy disk, CD-ROM (compact disk read-only memory), an optical disk, an optical magnetic disk, etc. on the market.

As described above in detail, for example, a software architecture can be generated to achieve an intention of a client, and there can be applications in various fields, thus realizing a large effect.

What is claimed is:

1. An intention achievement information processing apparatus having an object network as a language processing function and a common platform as a function of interfacing with a client, comprising:

target area definition means for defining a target area of an intention of a client and an attribute of the target area;

operable structure definition means for defining an operable structure of the target area whose attribute is defined in relation to the intention;

support structure definition means for defining a supporting function for achieving the intention;

strategy and tactics definition means for determining and defining a strategy and tactics for achieving the intention through the defined operable structure and supporting function; and process performing means for performing a concrete process for achieving an intention of a client based on the determined and defined strategy and tactics.

2. The apparatus according to claim 1, wherein:

an intention of a first client is an independent intention to be achieved independent of an intention of a second client;

said target area definition means extracts an independent intention of the target area from a database in response to a specification of a name of the target area from a client, retrieves an attribute structure, and defines the attribute;

said operable structure definition means displays an object network for the target area on the common platform to define an operable structure for the independent intention, and defines the operable structure in response to an instruction from the client.

3. The apparatus according to claim 1, wherein:

said intention of a first client is a cooperative intention achieved by cooperatively operating with a second client;

said target area definition means defines an attribute related to the second client operating cooperatively;

said support structure definition means defines a supporting function of extracting environment data from time to time including the operation of the second client operating cooperatively; and said strategy and tactics definition means adaptively determines and defines concrete tactics based on features of the environment data extracted from time to time.

4. The apparatus according to claim 3, wherein:

another client server system is provided for each of the first and second clients, and both clients share environment data.

5. The apparatus according to claim 1, wherein:

an intention of a first client is a conflicting intention against an intention of a second client;

said target area definition means defines an attribute related to the second client operating in conflict;

said support structure definition means defines a supporting function of extracting environment data including an operation of the second client operating in conflict; and said strategy and tactics definition means adaptively determines and defines tactics for achieving the intention of the first client based on a feature of the environment data extracted by the supporting function, and suppressing the intention of the second client.

6. The apparatus according to claim 5, wherein:

another client server system is provided for each of the first and second clients, and both clients share environment data.

7. The apparatus according to claim 1, further comprising:

interactive function control means for controlling the displaying an operation item and an operation amount on a display of the common platform with environment data extracted by environment data extracting function as the supporting function when said operable structure definition means defines an operable structure definition means so that said common platform can achieve an intention of clients based on the strategy and tactics determined and defined by said strategy and tactics definition means, and for controlling an interactive function of receiving an instruction from a client on the display, through voice, or through a keyboard.

8. The apparatus according to claim 7, wherein:

said interactive function control means further controls the interactive function through data driven function of requesting a client to define undefined data when necessary data in a process performed by the information processing apparatus is undefined.

9. The apparatus according to claim 1, wherein:

said information processing apparatus is formed in a hierarchical structure by an agent role server for functioning as a primary role to achieve an intention of the client, and by one or more specific role servers for supporting an operation of the agent role server; and said apparatus further comprises hierarchical communications means for establishing communications to integrally achieve the intention among servers of respective hierarchical levels.

10. An intention achievement information concurrently processing system, comprising:

an agent role server for performing a primary role to achieve an intention of a client;

a specific role server for performing a supporting role to support an operation of the agent role server for performing the primary role by partial recognition environment data wherein:

said agent role server comprises:

an object network as a language processing function;

a common platform as a function of interfacing with the client;

target area definition means for defining a target area of an intention of the client and an attribute of the target area;

operable structure definition means for defining an operable structure for the target area whose attribute is defined in association with the intention;

support structure definition means for defining a supporting function of achieving the intention;

strategy and tactics definition means for determining and defining strategy and tactics for achieving the intention using the defined operable structure and supporting function; and process performing means for performing a concrete process of achieving an intention of a client based on the determined and defined strategy and tactics, and said specific role server comprises:

an object network as one or more language process functions; and a common platform as a function of interfacing with a client.

11. The system according to claim 10, wherein:

said specific role server notifies said agent role server of constraint data as a result of extracting a feature through an event driven function when the result of extracting the feature obtained by partially recognizing the environment data corresponds to a constraint item related to contents of the strategy and tactics determined and defined by said strategy and tactics definition means in the agent role server performing the primary role; and said strategy and tactics definition means further determines and defines the strategy and tactics using the constraint data.

12. The system according to claim 10, wherein:

said intention of a first client is a cooperative intention achieved by cooperatively operating with a second client;

said target area definition means defines an attribute related to the second client operating cooperatively;

said support structure definition means defines a supporting function of extracting environment data including the operation of the second client operating cooperatively;

said specific role server notifies said agent role server of constraint data as a result of extracting a feature through event driven function when the result of extracting the feature obtained by the specific role server partially recognizing the environment data corresponds to a constraint item related to contents of the strategy and tactics determined and defined by said strategy and tactics definition means in the agent role server performing the primary role; and said strategy and tactics definition means predicts consistency of an operation of a system of the first client to an operation of a system of the second client having a cooperative intention, and determines and defines tactics by converting a smooth operation as tactics into tactics using the notified constraint data.

13. The system according to claim 10, wherein:

an intention of a first client is a conflicting intention against an intention of a second client;

said target area definition means defines an attribute related to the second client operating in conflict;

said support structure definition means defines a supporting function of extracting environment data including an operation of the second client operating in conflict;

said specific role server notifies said agent role server of constraint data as a result of extracting a feature through an event driven function when the result of extracting the feature obtained by partially recognizing the environment data corresponds to a constraint item related to contents of the strategy and tactics determined and defined by said strategy and tactics definition means in the agent role server performing the primary role; and said strategy and tactics definition means predicts consistency of an operation of a system of the first client to an operation of a system of the second client having a conflicting intention, and determines and defines tactics by converting an action converting operation for suppressing the intention of the second client as tactics into tactics using the notified constraint data.

14. A method of processing intention achievement information processing using an object network as a language processing function and a common platform as a function of interfacing with a client, comprising the steps of:

defining a target area of an intention of a client and an attribute of the target area;

defining an operable structure of the target area whose attribute is defined in relation to the intention;

defining a supporting function for achieving the intention;

determining and defining a strategy and tactics for achieving the intention through the defined operable structure and supporting function; and performing a concrete process for achieving an intention of the client based on the determined and defined strategy and tactics.

15. A method of processing intention achievement information processing using an object network as a language processing function and a common platform as a function of interfacing with a client, comprising the steps of:

defining a target area of an intention of a client and an attribute of the target area;

defining an operable structure of the target area whose attribute is defined in relation to the intention;

defining a supporting function for achieving the intention;

determining and defining a strategy and tactics for achieving the intention through the defined operable structure and supporting function;

performing a concrete process for achieving an intention of the client based on the determined and defined strategy and tactics;

supporting, by a specific role server, having one or more object networks and common platforms, for performing a supporting role, an operation of an agent role server for performing a primary role by partially recognizing environment data.

16. A computer-readable storage medium storing an intention achievement information process program to direct a computer to instruct a system having an object network as a language processing function and a common platform as a function of interfacing with a client to perform the functions of:

defining a target area of an intention of a client and an attribute of the target area;

defining an operable structure of the target area whose attribute is defined in relation to the intention;

defining a supporting function for achieving the intention;

determining and defining a strategy and tactics for achieving the intention through the defined operable structure and supporting function; and performing a concrete process for achieving an intention of the client based on the determined and defined strategy and tactics.

17. A computer-readable storage medium storing an intention achievement information process program to direct a computer to perform the functions of:

providing an object network as a language processing function;

providing a common platform as a function of interfacing with a client;

defining a target area of an intention of a client and an attribute of the target area;

defining an operable structure of the target area whose attribute is defined in relation to the intention;

defining a supporting function for achieving the intention;

determining and defining a strategy and tactics for achieving the intention through the defined operable structure and supporting function;

providing an agent role server for performing a primary function for achieving an intention of a client by comprising process performing means for performing a concrete process for achieving an intention of the client based on the determined and defined strategy and tactics; and providing a specific role server, having one or more object networks and common platforms, for performing a supporting role for supporting an operation of an agent role server for performing a primary role by partially recognizing environment data.

18. An intention achievement information processing system having an interface between a client and a server on a common platform, for processing a language through an object network, comprising:

input means for inputting an intention from the client; and object generation means for generating an object for achieving the intention in the server, and generating a state in which the intention is achieved by converting an initial state based on the generated object, said object generation means including target area generation means for generating a target area to which the intention belongs;

intention specification means for specifying the intention in the target area; and specification means for specifying a concrete object in the intention.

19. The system according to claim 18 wherein:

intentions are independent intentions, cooperative intentions between a first client and a second client, or conflicting intentions between the first client and the second client.

20. The system according to claim 19, further comprising:

strategy and tactics generation means for generating strategy and tactics for achieving the intention from the feature selected from an object and operation of the intention and from the support environment; and wherein said object generation means generates comprises:

attribute structure generation means for generating a structure of an attribute from said target area generation means;

operation generation means for generating an operation for achieving the intention;

support environment generation means for generating a support environment for achieving the intention; and feature generation means for generating a necessary feature from the support environment generated by said support environment generation means.

21. The system according to claim 20, wherein:

said strategy and tactics generation means comprises:

determination means for outputting a feature of an action predicted based on the operation and the selected feature, comparing the feature of the predicted action with environment information, and determining a conversion of an operation target based on a comparison result;

feature constraint input means for inputting an object of the intention, and inputting feature constraints on executing tactics; and environment data input means for inputting environment data whereby:

an amount of operation for the object is specified based on a comparison result between feature constraints and actions.

22. The system according to claim 21, wherein:

said object generation means comprises in a hierarchical structure:

data generation means for generating necessary data for achieving an intention according to a program activated by the intention; and state generation means for converting an initial state and generating a state in which the intention can be achieved by returning concrete data from a lowest level to a highest level by selecting data required in each hierarchical level.

23. An intention achievement information processing apparatus, comprising:

target area definition means for defining a target area of an intention and an attribute of the target area;

operable structure definition means for defining an operable structure of the target area whose attribute is defined in relation to the intention;

support structure definition means for defining a supporting function for achieving the intention;

strategy and tactics definition means for determining and defining a strategy and tactics for achieving the intention through the defined operable structure and supporting function; and process performing means for performing a concrete process for achieving the intention based on the determined and defined strategy and tactics.

24. The apparatus according to claim 23, wherein:

said intention can be achieved using an object network comprising a noun object and a verb object as a language processing function, and a common platform having a visible function as an interface mechanism with a client.

25. The apparatus according to claim 23, wherein:

said strategy and tactics definition means comprises:

a strategic generic object network comprising a generic noun object and a generic verb object working on said generic noun object; and a tactics generic object network comprising a generic noun object and a generic verb object.

26. The apparatus according to claim 25, wherein:

partial or subordinate intentions of a plurality of parties are achieved; and said strategy and tactics determination means defines the strategic generic object network and the tactics generic object network corresponding to each party.

27. The apparatus according to claim 26, wherein:

a matching constraint item is added as an attribute value to said generic noun object in the strategic generic object network and the tactics generic object network corresponding to each party; and an operation of the generic verb object working on a generic noun object before said generic noun object in the network is controlled such that said matching constraint item can be satisfied, and an operation of a generic verb object to work on said generic noun object is performed after said matching constraint item is satisfied.

28. The apparatus according to claim 27, wherein said matching constraint item is a modal constraint item relating to general environment data containing other parties.

29. The apparatus according to claim 28, wherein said matching constraint item is a constraint item relating to feature data extracted by a partially recognizing function for other parties.

30. The apparatus according to claim 25, further comprising:

interaction function control means for controlling an interaction function with a client through data driven function when there is data to be obtained from the client to satisfy a matching constraint item as an attribute value for a generic noun object forming part of the strategic generic object network.

31. The apparatus according to claim 26, wherein one or more of each of the strategic generic object network and the tactics generic object network corresponding to each of the plurality of parties are represented by environment data comprising the plurality of parties, and a matching constraint item corresponding to the parties is added as an attribute value to the environment data.

32. The apparatus according to claim 27, wherein said matching constraint item is a temporal constraint item containing synchronization of operations of the generic noun objects between different parties.

33. The apparatus according to claim 27, wherein matching constraints added to a generic noun object forming part of the strategic generic object network corresponding to each party are compared among a plurality of parties, and an operation of the strategic generic object network corresponding to each party is controlled such that a result of the comparison can be consistent.

34. The apparatus according to claim 27, further comprising in a hierarchical structure:

an agent role server functioning as a primary role for realizing an intention of the client; and one or more specific role servers for supporting an operation of said agent role server, wherein generic data representing said matching constraint item is converted into concrete data between said agent role server and said specific role server.

35. A method of processing intention achievement information, comprising the steps of:

defining a target area of an intention and an attribute of the area;

defining an operable structure for the target area whose attribute is defined in relation to the intention;

defining a supporting function to achieve the intention;

determining and defining a strategy and tactics for achieving the intention using the defined operable structure and supporting function; and performing a concrete process for achieving the intention according to the determined and defined strategy and tactics.

36. A computer-readable storage medium storing an intention achievement information processing program used to direct a computer to perform the functions of defining a target area of an intention and an attribute of the area;

defining an operable structure for the target area whose attribute is defined in relation to the intention;

defining a supporting function to achieve the intention;

determining and defining a strategy and tactics for achieving the intention using the defined operable structure and supporting function; and performing a concrete process for achieving the intention according to the determined and defined strategy and tactics.

37. A computer-readable storage medium storing intention achievement information processing data obtained by the functions of:

defining a target area of an intention of a client and an attribute of the area;

defining an operable structure for the target area whose attribute is defined in relation to the intention;

defining a supporting function to achieve the intention;

determining and defining a strategy and tactics for achieving the intention using the defined operable structure and supporting function; and performing a concrete process for achieving the intention of the client according to the determined and defined strategy and tactics, wherein data obtained by said function of determining and defining a strategy and tactics is obtained from:

data obtained by a function of defining a strategic generic object network comprising a generic noun object and a generic verb object working on the generic noun object; and data obtained by a function of defining a tactics generic object network comprising a generic noun object and a generic verb object.

* * * * *